(12) United States Patent
Ikeda et al.

(10) Patent No.: US 7,241,533 B1
(45) Date of Patent: *Jul. 10, 2007

(54) ELECTRODE FOR RECHARGEABLE LITHIUM BATTERY AND RECHARGEABLE LITHIUM BATTERY

(75) Inventors: Hiroaki Ikeda, Kobe (JP); Masahisa Fujimoto, Osaka (JP); Shin Fujitani, Kobe (JP); Kenji Asaoka, Sumoto (JP); Shigeki Matsuta, Kobe (JP); Yoichi Domoto, Ikoma (JP); Ryuji Ohshita, Tokushima (JP); Masaki Shima, Kobe (JP); Hiromasa Yagi, Nishinomiya (JP); Hisaki Tarui, Kobe (JP); Hiroshi Kurokawa, Yawata (JP); Yoshio Kato, Kobe (JP); Hiroshi Nakajima, Hirakata (JP); Toshikazu Yoshida, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 256 days.

This patent is subject to a terminal disclaimer.

(21) Appl. No.: 10/111,075

(22) PCT Filed: Oct. 20, 2000

(86) PCT No.: PCT/JP00/07297

§ 371 (c)(1),
(2), (4) Date: Sep. 10, 2002

(87) PCT Pub. No.: WO01/29918

PCT Pub. Date: Apr. 26, 2001

(30) Foreign Application Priority Data

| | | |
|---|---|---|
| Oct. 22, 1999 | (JP) | 11-301646 |
| Dec. 16, 1999 | (JP) | 11-357808 |
| Dec. 22, 1999 | (JP) | 11-365306 |
| Dec. 28, 1999 | (JP) | 11-374512 |
| Feb. 17, 2000 | (JP) | 2000-039454 |
| Feb. 24, 2000 | (JP) | 2000-047675 |
| Mar. 29, 2000 | (JP) | 2000-090583 |
| Apr. 3, 2000 | (JP) | 2000-100405 |
| May 22, 2000 | (JP) | 2000-150496 |
| Jul. 7, 2000 | (JP) | 2000-207274 |

(51) Int. Cl.
*H01M 4/70* (2006.01)
*H01M 4/36* (2006.01)

(52) U.S. Cl. ............. 429/233; 429/245; 429/218.1

(58) Field of Classification Search ........... 429/209, 429/232, 233
See application file for complete search history.

(56) References Cited

U.S. PATENT DOCUMENTS 4,162,202 A * 7/1979 Dey ............... 205/59

(Continued)

FOREIGN PATENT DOCUMENTS

CN 1092208 A 9/1994

(Continued)

OTHER PUBLICATIONS

Bourderau et al. Amorphous silicon as a possible anode material for Li-ion batteries. Sep. 1999. Journal of Power Sources. 81-82. 233-236.*

(Continued)

*Primary Examiner*—Tracy Dove
(74) *Attorney, Agent, or Firm*—Kubovcik & Kubovcik

(57) ABSTRACT

An electrode for a rechargeable lithium battery characterized in that thin films of active material capable of lithium storage and release, i.e., microcrystalline or amorphous silicone thin films are deposited on opposite faces of a plate-form current collector.

44 Claims, 33 Drawing Sheets

U.S. PATENT DOCUMENTS

| | | | |
|---|---|---|---|
| 4,997,732 A * | 3/1991 | Austin et al. | 429/153 |
| 5,108,852 A | 4/1992 | Tomantschger et al. | 429/66 |
| 5,494,762 A | 2/1996 | Isoyama et al. | 429/194 |
| 5,631,100 A | 5/1997 | Yoshino et al. | 429/62 |
| 5,641,591 A * | 6/1997 | Kawakami et al. | 429/231.5 |
| 5,686,203 A * | 11/1997 | Idota et al. | 429/342 |
| 5,888,670 A | 3/1999 | Kawakami | 429/231.4 |
| 6,048,646 A | 4/2000 | Xing et al. | 429/233 |
| 6,402,795 B1 | 6/2002 | Chu et al. | 29/623.5 |
| 6,432,585 B1 | 8/2002 | Kawakami et al. | 429/233 |
| 6,743,369 B2 | 6/2004 | Jito et al. | 216/13 |
| 6,746,802 B2 | 6/2004 | Tamura et al. | 429/245 |
| 2002/0192564 A1 | 12/2002 | Ota et all. | 429/324 |
| 2004/0224231 A1 | 11/2004 | Fujimoto et al. | 429/232 |

FOREIGN PATENT DOCUMENTS

| | | |
|---|---|---|
| EP | 0 854 529 A1 | 7/1998 |
| EP | 0 855 752 A2 | 7/1998 |
| EP | 0 910 131 A1 | 4/1999 |
| HU | P9202646 A | 9/1995 |
| JP | 60-175375 A | 9/1985 |
| JP | 63-314762 A | 12/1988 |
| JP | 5-74479 A | 3/1993 |
| JP | 5-101830 A | 4/1993 |
| JP | 5-226004 A | 9/1993 |
| JP | 6-140045 A | 5/1994 |
| JP | 6-168737 A | 6/1994 |
| JP | 6-187994 A | 7/1994 |
| JP | 7-302588 A | 11/1995 |
| JP | 8-50922 A | 2/1996 |
| JP | 8-255610 A | 10/1996 |
| JP | 9-17441 A | 1/1997 |
| JP | 9-115523 A | 5/1997 |
| JP | 9-147856 A | 6/1997 |
| JP | 9-213339 A | 8/1997 |
| JP | 10-21928 A | 1/1998 |
| JP | 10-199524 A | 7/1998 |
| JP | 10-208740 A | 8/1998 |
| JP | 10-223221 A | 8/1998 |
| JP | 10-294098 A | 11/1998 |
| JP | 10-326628 A | 12/1998 |
| JP | 11-73946 | 3/1999 |
| JP | 11-86854 A | 3/1999 |
| JP | 11-86875 A | 3/1999 |
| JP | 2000-100429 A | 4/1999 |
| JP | 11-135115 A | 5/1999 |
| JP | 11-135130 A | 5/1999 |
| JP | 11-154508 | 6/1999 |
| JP | 11-167930 A | 6/1999 |
| JP | 11-185744 A | 7/1999 |
| JP | 11-233116 A | 8/1999 |
| JP | 11-242954 A | 9/1999 |
| JP | 11-250892 A | 9/1999 |
| JP | 11-273683 A | 10/1999 |
| JP | 11-283628 A | 10/1999 |
| JP | 11-339811 | 12/1999 |
| JP | 2000-11997 A | 1/2000 |
| JP | 2000-012088 * | 1/2000 |
| JP | 2000-12088 A | 1/2000 |
| JP | 2000-12089 A | 1/2000 |
| JP | 2000-12091 A | 1/2000 |
| JP | 2000-149928 A | 1/2000 |
| JP | 2000-133276 A | 5/2000 |
| JP | 2000-182623 A | 6/2000 |
| JP | 2000-208136 A | 7/2000 |
| JP | 2000-228187 A | 8/2000 |
| JP | 2000-294249 A | 10/2000 |
| JP | 2000-294250 A | 10/2000 |
| JP | 2000-294251 A | 10/2000 |
| JP | 2001-76710 A | 3/2001 |

OTHER PUBLICATIONS

Bourderau, S. et al.; "Amorphous Silicon as a Possible Anode Material for Li-ion Batteries"; *Journal of Power Sources*; vols. 81-82, pp. 233-236, 1999.

U.S. Appl. No. 10/111,071, filed Apr. 19, 2002, Masahisa Fujimoto et al.

U.S. Appl. No. 10/110,313, filed Apr. 11, 2002, Masahisa Fujimoto et al.

U.S. Appl. No. 10/111,070, filed Apr. 19, 2002, Masahisa Fujimoto et al.

U.S. Appl. No. 10/111,074, filed Aug. 1, 2002, Hiroaki Ideda et al.

U.S. Appl. No. 10/111,073, filed Apr. 19, 2002, Masahisa Fujimoto et al.

*Hawley's Condensed Chemical Dictionary*, 11th edition, pp. 1033 & 1039, 1987.

* cited by examiner

20nm

ELECTRODE FOR RECHARGEABLE LITHIUM BATTERY AND RECHARGEABLE LITHIUM BATTERY

TECHNICAL FIELD

The present invention relates to a novel electrode for a rechargeable lithium battery and also to a rechargeable lithium battery using the same.

BACKGROUND ART

The battery performance of rechargeable lithium batteries recently under intensive research and development, such as charge-discharge voltage, cycle life characteristics or storage characteristics, depends largely upon the types of the electrodes used. This has led to the attempts to better battery performance by improving electrode active materials.

The use of metallic lithium for the negative active material, although possible to construct a battery with high energy density per weight and volume, presents a problem that the lithium deposited on charge grows into dendrite which could cause internal short-circuiting.

Rechargeable lithium batteries are reported (Solid State Ionics, 113–115, p 57 (1998)) which use an electrode consisting of aluminum, silicon, tin or the like that is electrochemically alloyed with lithium on charge. Among these, a silicon electrode provides a particularly high theoretical capacity and is promising as a high-capacity negative electrode. For this reason, various rechargeable batteries using silicon for the negative electrode are proposed (Japanese Patent Laying-Open No. Hei 10-255768). However, such alloying negative electrodes fail to provide sufficient cycle characteristics-since alloys, as electrode active materials, are themselves pulverized on charge and discharge to reduce current-collecting capabilities.

DISCLOSURE OF THE INVENTION

The inventors of this application have found that an electrode including a thin film composed of active material capable of lithium storage and release, such as a microcrystalline or amorphous silicon thin film, deposited on a current collector such as a copper foil can prevent the active material from separating or falling off therefrom during a charge-discharge reaction and, when incorporated in a rechargeable lithium battery, can exhibit a high charge-discharge capacity and improved charge-discharge cycle characteristics.

However, a large strain is occasionally produced in the current collector as a result of a charge-discharge reaction of such a rechargeable lithium battery.

It is an object of the present invention to provide an electrode for a rechargeable lithium battery, which can reduce the strain produced in the current collector during the charge-discharge reaction and also improve the charge-discharge cycle characteristics, a rechargeable lithium battery using the same, and a current collector for an electrode of a rechargeable lithium battery.

The electrode for a rechargeable lithium battery, in accordance with the present invention, is characterized as including a plate-form current collector having opposite faces and a thin film of active material capable of lithium storage and release deposited on each face of the plate-form current collector.

In the present invention, any active material can be used if it can be deposited, in the form of a thin film that is capable of lithium storage and release, on the current collector. Examples of active materials include one or more materials capable of producing compounds or solid solutions with lithium, e.g. at least one selected from elements from Groups IIB, IIIB, IVB and VB of the periodic table and oxides and sulfides of transition metal elements from Periods 4, 5 and 6 of the periodic table. Preferred among the above-listed elements is at least one selected from carbon, silicon, germanium, tin, lead, aluminum, indium, zinc, cadmium, bismuth and mercury. In view of the ability to provide a high electrode capacity, the use of a silicon thin film, germanium thin film and silicon-germanium alloy thin film is particularly preferred.

Among various silicon thin films, a microcrystalline or amorphous silicon thin film is particularly preferred. The silicon thin film is identified as having a microcrystalline structure when Raman spectroscopy detects the substantial presence of a peak around 520 $cm^{-1}$ which corresponds to a crystalline region and a peak around 480 $cm^{-1}$ corresponding to an amorphous region, and as having an amorphous structure when Raman spectroscopy detects the substantial absence of a peak around 520 $cm^{-1}$ corresponding to the crystal region and substantial presence of a peak around 480 $cm^{-1}$ corresponding to the amorphous region.

Among various germanium thin films, a microcrystalline or amorphous germanium thin film is preferred. The silicon-germanium alloy thin film is preferably in the amorphous or microcrystalline form. The use of silicon and germanium provides good results as evidenced by Examples which will be described hereinafter. Since silicon and germanium can be mixed with each other in arbitrary proportions to produce solid solutions, similar results are expected for the silicon-germanium alloy.

In the present invention, a CVD, sputtering, vapor evaporation or spraying technique can be utilized to deposit the thin film of active material from a gas phase. Alternatively, a plating technique can be utilized.

Preferably, the thin films of active material are formed on opposite faces of the current collector so that they undergo substantially the same degree of charge-discharge reaction with lithium per unit area. It is accordingly preferred that the thin films of active material are formed on opposite faces of the current collector so as to have substantially the same thickness.

In the present invention, a metal foil can be used for the current collector, for example. The metal foil is preferably composed of a metal capable of alloy formation with the active material, which improves adhesion of the metal foil to the thin film of active material. Where the thin film of active material is a silicon or germanium thin film, the use of a copper foil for the current collector is particularly preferred. A preferred copper foil is an electrolytic copper foil which has an increased surface roughness Ra (roughness average). An example of such an electrolytic copper foil is an electrolytic copper foil roughened at its opposite sides by immersing a copper foil, such as a rolled copper foil, in an electrolyte and then allowing copper to deposit on opposite faces of the copper foil by an electrolytic process.

Also, an interlayer may be provided on each face of the current collector so that each thin film of active material overlies the interlayer. In such a case, the interlayer is preferably-composed of a material which has the capability to form an alloy with the active material. The provision of the interlayer enables diffusion of an interlayer component into the thin film of active material.

The current collector, if overlaid by the interlayer, is preferably in the form of a foil composed of a metal or alloy which has a higher mechanical strength than a material constituting the interlayer. For example, if the interlayer is a copper layer, a nickel foil is preferably used for the current collector. The copper layer may be provided on a surface-roughened nickel foil (e.g., electrolytic nickel foil), for example. A nickel foil may be used which is roughened at its surface by depositing copper thereon by an electrolytic process.

In the present invention, the opposite faces of the current collector, on which the respective thin films of active material are to be deposited, preferably have substantially the same level of surface roughness Ra.

In the present invention, a surface roughness Ra of each face of the current collector is preferably 0.01 μm or larger, more preferably in the range of 0.01–1 μm. The surface roughness Ra of the current collector is preferably comparable in level to the surface roughness Ra of the electrolytic copper foil which will be described later. Accordingly, the surface roughness Ra of the current collector is preferably 0.1 μm or larger, more preferably in the range of 0.1–1 μm. It is also preferred that the surface roughness Ra and a mean spacing of local peaks of profile S satisfy the relationship $100Ra \geq S$.

The surface roughness Ra and mean spacing of local peaks of profile S, which are specified in Japanese Industrial Standards (JIS B 0601-1994), can be measured as by a surface roughness meter, for example.

The electrode for a rechargeable lithium battery, in accordance with a preferred embodiment of the present invention, is characterized in that the thin film of active material is divided into columns by gaps formed therein in a manner to extend in its thickness direction and the columnar portions are at their bottoms adhered to the current collector.

Those gaps formed to surround the columnar portions can accommodate the expansion and shrinkage that is caused repeatedly in the thin film of active material by a charge-discharge reaction. This permits the thin film of active material to undergo a repetitive charge-discharge reaction without the tendency to separate or fall off from the current collector.

Preferably, a thickness portion of the thin film that occupies at least a half of its thickness is divided into columns by such gaps.

Preferably, the gaps are formed as a results of the expansion and shrinkage of the thin film of active material.

The gaps may be formed by the charge-discharge reaction either after or before the battery is assembled.

In the present invention, irregularities are preferably formed on a surface of the thin film of active material. The gaps are preferably formed in the thin film to extend in its thickness direction from valleys of the irregularities on the thin film surface toward the current collector.

Preferably, the irregularities on the thin film surface may conform in shape to those on the current collector surface. Also preferably, the shape of the projections of the irregularities on the current collector surface is a substantially conical form.

It is further preferred that the columnar portions of the thin film have a round top.

In a further embodiment in accordance with the present invention, the thin film of active material before the gaps are formed therein has low-density regions which are connected to each other like a network in a planar direction and extend in the thickness direction toward the current collector, and along which the gaps are later formed to extend in the thickness direction.

In the present invention, it is preferred that a current collector constituent is diffused into the thin film of active material. The diffusion of the current collector constituent into the thin film of active material not only improves adhesion between the current collector and the thin film of active material but also effectively prevents separation or falling-off of the thin film from the current collector. As a result, charge-discharge characteristics can be further improved.

In the case where the thin film is composed of active material capable of alloy formation with lithium and the current collector is composed of material incapable of alloy formation with lithium, the diffusion of the current collector constituent lessens expansion and shrinkage of a thin film portion in the vicinity of the current collector during storage and release of lithium. Thus, the thin film of active material can be kept adhered more effectively to the current collector.

Preferably, the concentration of the current collector constituent in the thin film is higher in the vicinity of the current collector and is lower at a location closer to the surface of the thin film. Due to the presence of such a concentration gradient, the thin film is subjected to less expansion and shrinkage in the vicinity of the current collector so that the thin film can be kept adhered to the current collector, and is permitted to contain a relatively lager amount of active material in the vicinity of its surface so that a high charge-discharge capacity can be retained.

It is preferred that the current collector constituent, when diffused into the thin film, forms a solid solution, instead of an intermetallic compound, with a thin film component. The intermetallic compound, as used herein, refers to a compound which has a specific crystal structure formed via combination of metals in specific proportions. The formation of solid solution, instead of intermetallic compound, between the thin film component and the current collector constituent improves adhesion between the thin film and the current collector, resulting in obtaining the increased charge-discharge capacity.

In the present invention, the thickness of a thin film region into which the current collector constituent is diffused is not particularly specified, but may preferably be 1 μm or greater.

In the afore-stated case where the interlayer is placed between the underlying current collector and the overlying thin film, a component of the interlayer is preferably diffused into the thin film. The concentration of the interlayer component diffused in the thin film is preferably higher in the vicinity of the interlayer and is lower at a location closer to the surface of the thin film. It is also preferred that the interlayer component, when diffused into the thin film, forms a solid solution, instead of an intermetallic compound, with the thin film component. The formation of solid solution, instead of intermetallic compound, between the interlayer and thin film component further improves adhesion between the interlayer and the thin film, resulting in obtaining the further increased charge-discharge capacity.

The current collector for use in the present invention is not particularly specified, so long as it satisfies the above-described conditions of the present invention. More specifically, the current collector may be composed of at least one selected from copper, nickel, stainless steel, molybdenum, tungsten and tantalum, for example.

In the present invention, the thin film of active material may be doped with an impurity. Examples of such impurities include elements of the periodic Groups IIIB, IVB, VB and VIB, such as phosphorus, aluminum, arsenic, antimony, boron, gallium, indium, oxygen and nitrogen.

Also, the thin film of active material in the present invention may be made up of a sequence of superimposed layers. These layers may differ from each other in terms of composition, crystallinity, impurity concentration or the like. Such layers may provide a thin film structure graded in its thickness direction. For example, such layers, if properly arranged, can provide a thin film structure wherein the composition, crystallinity, impurity concentration or the like is varied in its thickness direction.

Preferably, the thin film of active material in the present invention stores lithium via formation of an alloy with lithium.

In the present invention, lithium may be previously stored or incorporated in the thin film of active material. Lithium may be added during the thin film of active material is deposited. That is, lithium may be introduced via formation of a lithium-containing thin film. Alternatively, lithium may be added or stored after formation of the thin film of active material. One method is to use an electro-chemical mechanism whereby lithium is added or stored in the thin film of active material.

In the present invention, the thin film of active material preferably has a thickness of 1 μm or above, for the purpose of obtaining a high charge-discharge capacity.

The rechargeable lithium battery (lithium secondary battery) of the present invention is characterized as including a negative electrode comprised of the above-described electrode of the present invention.

The electrode for a rechargeable lithium battery, in accordance with the present invention, may be used for a positive or negative electrode of the rechargeable lithium battery of the present invention, but is preferably used for the negative electrode since the thin film of active material as described above generally shows a low standard potential to lithium.

In such a case, the material used to form a positive electrode is not particularly specified in type. Those conventionally used for positive electrodes of rechargeable lithium batteries can be used. Examples of positive active materials include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$, and lithium-free metal oxides such as $MnO_2$. Other materials can also be used if they are capable of electrochemical insertion and release of lithium.

An electrolyte solvent for use in the rechargeable battery of the present invention is not particularly limited in type but can be illustrated by a mixed solvent which contains cyclic carbonate such as ethylene carbonate, propylene carbonate or butylene carbonate and also contains chain carbonate such as dimethyl carbonate, methyl ethyl carbonate or diethyl carbonate. Also applicable is a mixed solvent of the above-listed cyclic carbonate and an ether solvent such as 1,2-dimethoxyethane or 1,2-diethoxyethane or a chain ester such as γ-butyrolactone, sulfolane or methyl acetate. Illustrative electrolyte solutes are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. Other applicable electrolytes include a gelled polymer electrolyte comprised of an electrolyte solution impregnated into a polymer electrolyte such as polyethylene oxide, polyacrylonitrile or polyvinylidene fluoride and inorganic solid electrolytes such as LiI and $Li_3N$, for example. The electrolyte for the rechargeable lithium battery of the present invention can be used without limitation, so long as an Li compound as its solute that imparts an ionic conductivity, as well as its solvent that dissolves and retains the Li compound, remain undecomposed at voltages during charge, discharge and storage of the battery.

In the rechargeable lithium battery (lithium secondary battery) of the present invention, the positive and negative electrodes can be combined in any way to provide various electrode structures.

For example, the rechargeable lithium battery of the present invention may have a stacked electrode structure wherein negative electrodes each comprised of the electrode of the present invention for a rechargeable lithium battery are stacked alternately with positive electrodes each including a layer of positive active material provided on both sides of a current collector, with a separator being interposed between them.

Alternatively, it may have an electrode structure wherein the negative electrode comprised of the electrode of the present invention for a rechargeable lithium battery and the positive electrode including a layer of positive active material provided on each face of a current collector are rolled up in a spirally wound configuration with a separator being interposed between them. Cylindrical and prismatic rechargeable lithium batteries are known as having such an electrode structure.

Alternatively, an insertion-type electrode structure may be adopted wherein an electrode is folded in a U-shape to provide a space for insertion of a counter electrode.

As one embodiment of a rechargeable lithium battery having such an insertion-type electrode structure, a rechargeable lithium battery is presented which includes a positive electrode having a current collector folded in a U-shape and a pair of layers of positive active material provided on opposing inner faces of the current collector, a negative electrode having layers of negative active material provided on opposite faces of a current collector and inserted in an inner space of the U-shaped positive electrode, and a separator interposed between the positive active material layer of the positive electrode and the negative active material layer of the negative electrode, and which is characterized in that the negative electrode comprises the electrode for a rechargeable lithium battery in accordance with the present invention.

In the rechargeable lithium battery of the present invention, the current collector having layers of active material provided on opposite faces thereof may be prepared from two current collectors each having a layer of active material on its one face by joining their back faces to each other.

The current collector of the present invention, for use in an electrode of a rechargeable lithium battery, is characterized as having opposite faces on which thin films of active material that store and release lithium are to be deposited to define surfaces.

As stated above, the current collector of the present invention preferably has opposite faces with substantially the same surface roughness Ra. Also, each face preferably has a surface roughness Ra of 0.01 μm or larger, more preferably in the range of 0.01–1 μm.

The current collector of the present invention is preferably in the form of a metal foil. Where the active material is silicon, the current collector is preferably in the form of a copper foil. A preferred copper foil is an electrolytic copper foil having a large value for surface roughness Ra. An example of such an electrolytic copper foil is a copper foil roughened at its both surfaces by depositing copper thereon by an electrolytic process.

BEST MODE FOR CARRYING OUT THE INVENTION

The present invention is below described in more detail by way of examples. It will be recognized that the following examples merely illustrate the practice of the present invention but are not intended to be limiting thereof. Suitable changes and modifications can be effected without departing from the scope of the present invention.

EXAMPLE 1

(Fabrication of Negative Electrode)

Figure 1:
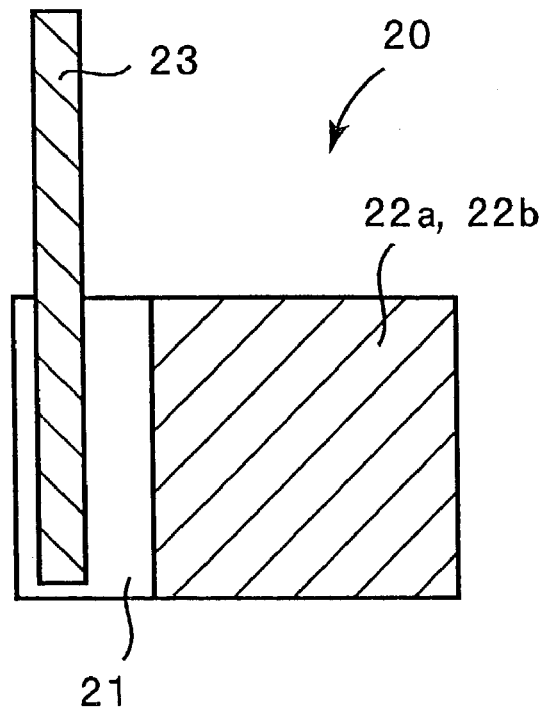
FIG. 1 is a plan view showing a negative electrode fabricated in Example of the present invention.
Figure 3:
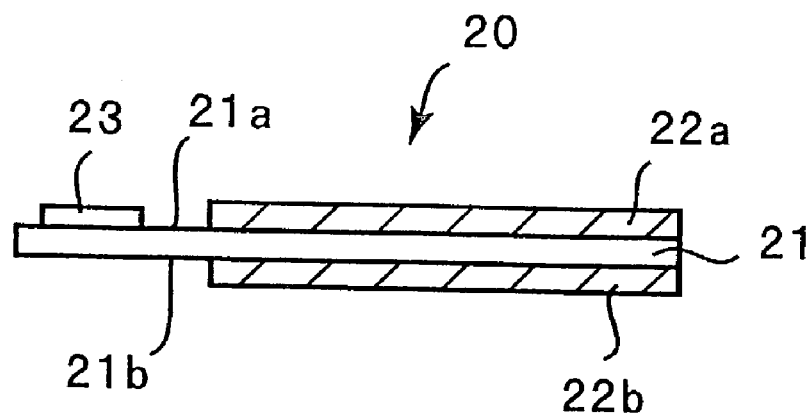
FIG. 3 is a side view showing the negative electrode fabricated in Example of the present invention.

A negative electrode 20 shown in FIGS. 1 and 3 was fabricated. FIGS. 1 and 3 are a plan view and a side view, respectively. As shown in FIG. 3, an electrolytic copper foil 21 carries a microcrystalline silicon thin film 22a on its one face 21a and a microcrystalline silicon thin film 22b on its other face 21b.

The electrolytic copper foil 21 was prepared by immersing a rolled copper foil in an electrolyte solution and then effecting copper deposition on its opposite faces by an electrolytic process so that the copper foil was roughened at its opposite faces. The electrolytic copper foil 21 is 20 mm×30 mm in size and carries the micro-crystalline silicon thin film 22a or 22b on a 20 mm×20 mm region of each face thereof. The electrolytic copper foil 21 is 18 μm thick and the microcrystalline silicon thin films 22a and 22b were both about 5 μm thick. Each surface 21a or 21b of the electrolytic copper foil 21 has a surface roughness Ra of 0.20 μm and a mean spacing of local peaks of profile S of 10 μm.

The microcrystalline silicon thin films 22a and 22b were both deposited by a plasma CVD process. A silane ($SiH_4$) gas was used as a source gas and a hydrogen gas was used as a carrier gas. The thin film forming conditions were as follows: $SiH_4$ flow rate: 10 sccm, hydrogen gas flow rate: 200 sccm, substrate temperature: 180° C., reaction pressure: 40 Pa, RF power: 555 W. The unit of flow rate, sccm, is an abbreviation of standard cubic centimeters per minute and refers to a volumetric flow rate ($cm^3$/min) per minute under 0° C. and 1 atmospheric pressure (101.33 kPa).

As shown in FIGS. 1 and 3, a negative tab 23 was attached to a region on the surface 21a of the electrolytic copper foil 21 that was left uncoated with microcrystalline silicon thin films 22a and 22b to complete a negative electrode.

(Fabrication of Positive Electrode)

Figure 2:
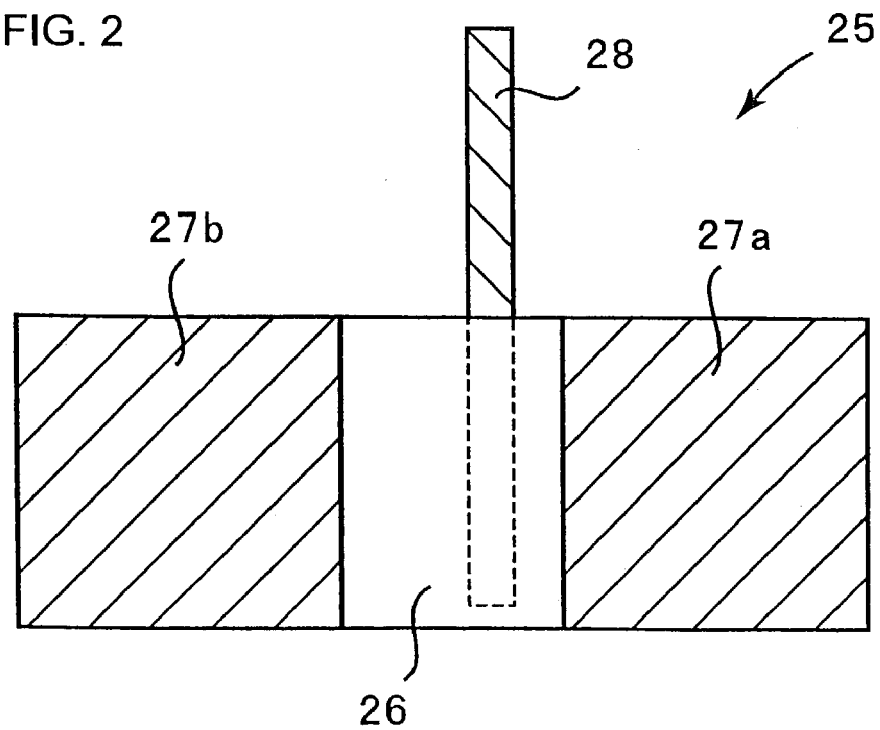
FIG. 2 is a plan view showing a positive electrode fabricated in Example of the present invention.

A positive electrode 25 shown in FIG. 2 was fabricated. As shown in FIG. 2, an $LiCoO_2$ mix slurry for positive electrode was coated on an aluminum foil 26 as a current collector, and then dried to provide layers 27a and 27b of positive active material. The aluminum foil 26 used was 20 mm×60 mm in size. Each of the layers 27a and 27b of positive active material was provided on a 20 mm×20 mm surface area. The following procedure was utilized to prepare the mix slurry for positive electrode.

Starting materials, $Li_2CO_3$ and $CoCO_3$, were weighed such that an atomic ratio of Li and Co, Li:Co, was brought to 1:1, and then mixed in a mortar. The mixture was pressed in a 17 mm diameter mold and calcined in the air at 800° C. for 24 hours to obtain a calcined product consisting of $LiCoO_2$. This product was then ground into particles with a mean particle diameter of 20 μm.

90 parts by weight of the resulting $LiCoO_2$ powder and 5 parts by weight of artificial graphite as electroconductive material were mixed in a 5 wt. % N-methylpyrrolidone aqueous solution containing 5 parts by weight of polytetrafluoroethylene as a binder to provide the mix slurry for positive electrode.

As shown in FIG. 2, an aluminum tab 28 was attached to a back surface of the aluminum foil 26 to complete a positive electrode.

(Preparation of Electrolyte Solution)

1 mole/liter of $LiPF_6$ was dissolved in a mixed solvent containing equi-volumes of ethylene carbonate and diethyl carbonate to prepare an electrolyte solution for use in the following battery construction.

(Construction of Battery)

Figure 4:
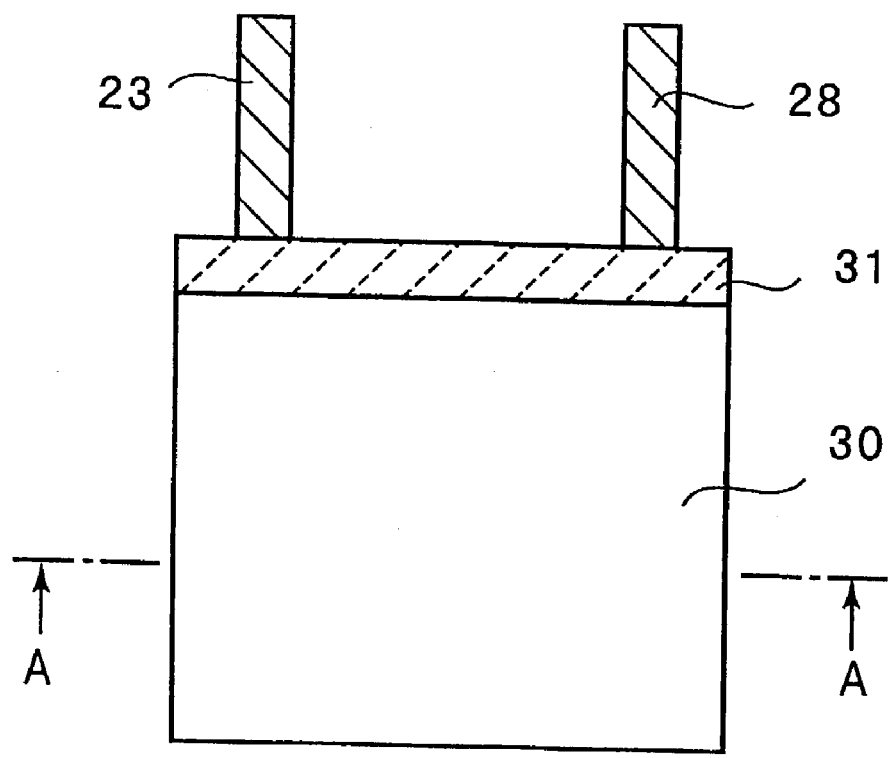
FIG. 4 is a plan view showing a rechargeable lithium battery constructed in Example of the present invention.
Figure 5:
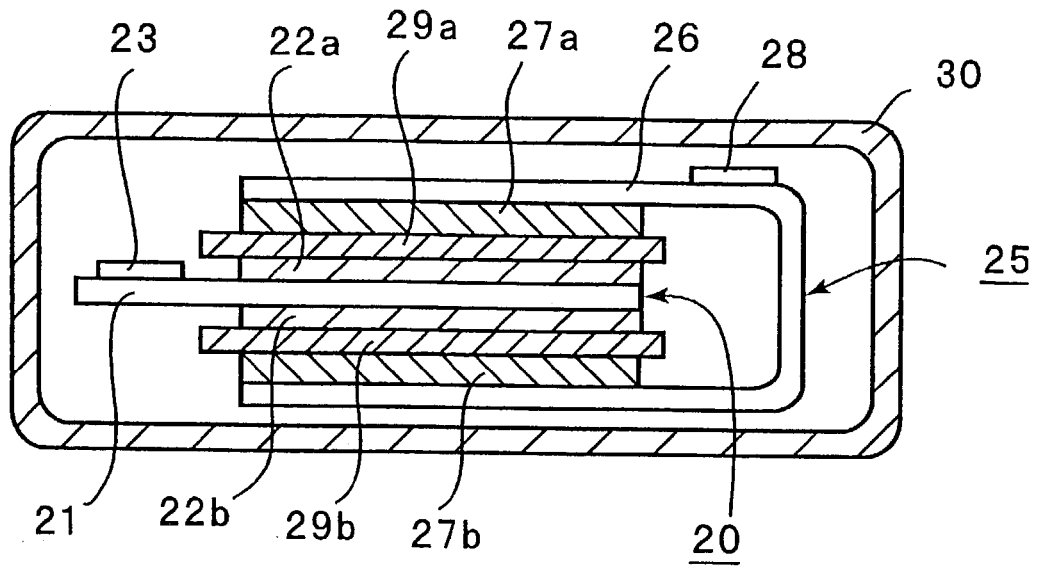
FIG. 5 is a schematic sectional view showing a rechargeable lithium battery constructed in Example of the present invention.

FIG. 4 is a plan view, illustrating a rechargeable lithium battery as assembled. FIG. 5 is a sectional view taken along the line A—A of FIG. 4. As shown in FIG. 5, a battery is assembled by placing the above-fabricated negative electrode 20 and positive electrode 25 within an envelope-form container 30 made of a laminated aluminum film. The positive electrode 25 was folded in such a manner as to direct the layers 27a and 27b of positive active material inwards. The negative electrode 20 is inserted into an inner space of the positive electrode. In the negative electrode 20, the microcrystalline silicon thin film 22a and the positive active material layer 27a are disposed on opposite sides of a separator 29a, while the microcrystalline silicon thin film 22b and the positive active material layer 27b are disposed on opposite sides of a separator 29b. The positive and negative electrodes 25 and 20 in such configurations were inserted into the container 30 and then subjected to a heat treatment under vacuum at 105 for a period of 2 hours. Subsequently, the above-prepared electrolyte solution was introduced into the container 30. Thereafter, the container was sealed at a portion 31 shown in FIG. 4. As a result, a rechargeable lithium battery was constructed.

COMPARATIVE EXAMPLE 1

(Fabrication of Negative Electrode)

The procedure of Example 1 for fabrication of negative electrode was followed, except that the microcrystalline silicon thin film 22a was provided solely on the surface 21a of the electrolytic copper foil 21, to fabricate a negative electrode.

(Fabrication of Positive Electrode)

The procedure of Example 1 for fabrication of positive electrode was followed, except that the layer 27a of positive active material was the only positive active material layer provided on the aluminum foil 26 shown in FIG. 2, to fabricate a positive electrode.

(Construction of Battery)

As practiced in Example 1, the positive electrode 25 was folded in two in such a manner to direct the layer 27a of positive active material inwards and the negative electrode 20 was inserted therebetween. The separator 29a was placed to position between the microcrystalline silicon thin film 22a and the layer 27a of positive active material. The separator 29b was interposed between a surface portion of the electrolytic copper foil 21 that was left uncoated with the microcrystalline silicon thin film 22b and a surface portion of the aluminum foil 26 that was left uncoated with the layer 27b of positive active material. Otherwise, the procedure of Example 1 was followed to construct a rechargeable lithium battery.

(Charge-Discharge Cycle Test)

The rechargeable lithium batteries obtained in Example 1 and Comparative Example 1 were both subjected to a charge-discharge cycle test. Each battery was charged to 4.2 V and then discharged to 2.75 V at 25° C. and a charge-discharge current density of 0.2 mA/cm². This unit charge-discharge cycle was repeated to measure a capacity retention rate on the 15th cycle. The first-cycle discharge capacity was 25 mAh for the battery of Example 1 and 12 mAh for the battery of Comparative Example 1.

The results are given in Table 1.

TABLE 1

| Battery | 15th-Cycle Capacity Retention Rate |
| --- | --- |
| Ex.1 | 99% |
| Comp.Ex.1 | 97% |

As clear from the results given in Table 1, the battery of Example 1 exhibits the increased capacity retention rate compared to the battery of Comparative Example 1. This is believed due to the provision of the microcrystalline silicon thin film on both surfaces of the negative current collector, which reduced the strain resulting from a charge-discharge reaction of the negative current collector and restrained the thin film of active material from separating from the negative current collector.

EXAMPLE 2

Figure 6:
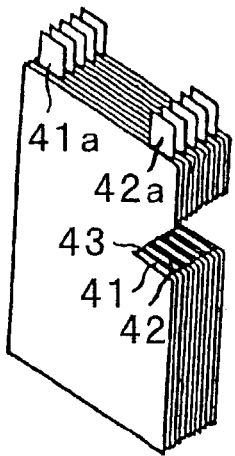
FIG. 6 is a partially cut-away perspective view showing an electrode structure within a stacked rechargeable lithium battery in accordance with the present invention.

In the construction of a rechargeable lithium battery in accordance with the present invention, the positive and negative electrodes were combined into a stacked structure shown in FIG. 6.

(Fabrication of Negative Electrode)

The electrolytic copper foil of Example 1 was used having opposite rough surfaces. An about 5 μm thick, microcrystalline silicon thin film was formed on each face of the electrolytic copper foil in the same manner as in Example 1 to fabricate a negative electrode.

(Fabrication of Positive Electrode)

85 parts by weight of $LiCoO_2$ powder obtained in the same manner as in Example 1, 10 parts by weight of artificial graphite powder as an electroconductive material, and a 5 wt. % N-methylpyrrolidone aqueous solution containing 5 parts by weight of polytetrafluoroethylene as a binder were mixed to provide a mix slurry for positive electrode. This slurry was applied onto both sides of a 20 μm thick aluminum foil and then dried. As a result, a positive electrode was fabricated having a layer of positive active material on each side of the aluminum foil.

(Construction of Battery)

As shown in FIG. 6, negative electrodes 41 each having the microcrystalline silicon thin films on its both sides and fabricated in the manner as described above were stacked alternately with positive electrodes 42 each having the layers of positive active material on its both sides and fabricated in the above-described manner, with a separator 43 between adjacent electrodes, to constitute a stacked electrode structure. Also, a negative tab 41a was attached to an upper end of each negative electrode 41 and a positive tab 42a was attached to an upper end of each positive electrode 42. The numbers of the assembled negative and positive electrodes 41 and 42 were 8, respectively. Eight combinations of the positive and negative electrodes 41 and 42 were stacked one above the other.

Figure 7:
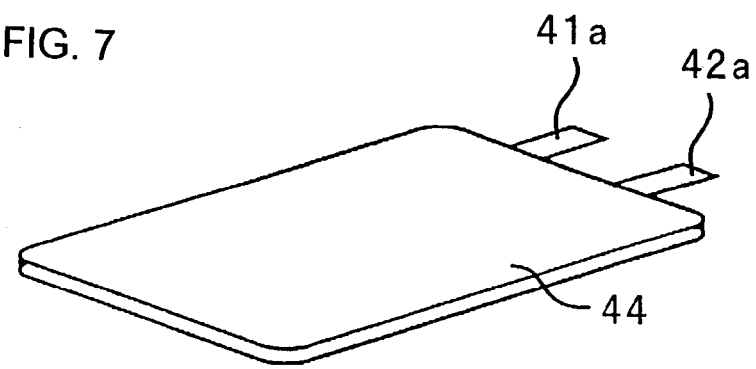
FIG. 7 is a perspective view showing a stacked rechargeable lithium battery of the present invention which encloses the electrode shown in FIG. 6 within a casing.

A series of those electrodes arranged in a stack was inserted into an interior of a casing 44 made of laminated aluminum, as shown in FIG. 7. Thereafter, an electrolyte solution was introduced in the casing which was subsequently sealed such that the negative tabs 41a and positive tabs 42a extended toward an exterior of the casing 44.

The electrolyte solution introduced into the interior of the casing 44 was prepared by allowing 1 mole/liter of $LiPF_6$ to dissolve in a 4:6 mixed solvent of ethylene carbonate and diethyl carbonate.

COMPARATIVE EXAMPLE 2

A negative electrode was fabricated using natural graphite as the active material. More specifically, 95 parts by weight of natural graphite and a 5 wt. % N-methylpyrrolidone aqueous solution containing 5 parts by weight of polytetrafluoroethylene as a binder were mixed to provide a mix slurry for negative electrode. This slurry was applied onto both sides of an 18 μm thick, rolled copper foil and then dried to fabricate a negative electrode.

The procedure of Example 2 was followed, except that the above-fabricated negative electrode was used, to construct a rechargeable lithium battery shown in FIGS. 6 and 7.

Discharge capacities, average discharge voltages, energy densities per unit volume, and energy densities per unit weight of the rechargeable lithium batteries obtained in Example 2 and Comparative Example 2 are listed in Table 2. The initial discharge capacity of the positive active material used in Example 2 is given as 150 mAh/g. The initial discharge capacity of the negative active material used in Example 2 is given as 3,200 mAh/g. The initial discharge capacity of the negative active material used in Comparative Example 2 is given as 370 mAh/g.

TABLE 2

| | Discharge Capacity (mAh) | Average Discharge Voltage (V) | Energy Density Per Unit Volume (Wh/l) | Energy Density Per Unit Weight (Wh/kg) |
|---|---|---|---|---|
| Ex.2 | 690 | 3.5 | 309 | 201 |
| Comp. Ex.2 | 590 | 3.7 | 279 | 156 |

As indicated in Table 2, the battery of Example 2 incorporating the electrode for a rechargeable lithium battery, in accordance with the present invention, exhibits the increased energy density, both per unit volume and per unit weight, compared to the battery of Comparative Example 2 using the conventional graphite negative electrode.

EXAMPLE 3

Figure 8:
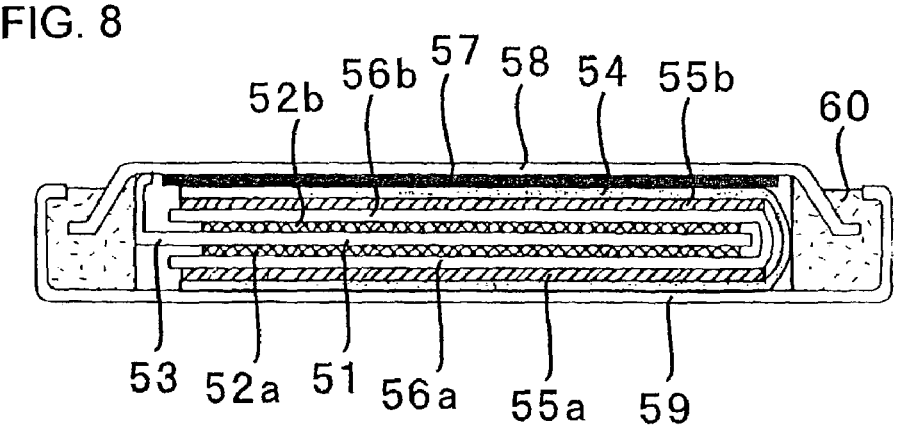
FIG. 8 is a schematic sectional view showing one example of a laminated rechargeable lithium battery in accordance with the present invention.

A coin-type rechargeable lithium battery shown in FIG. 8 was constructed. The microcrystalline silicon thin films 52a and 52b are provided on opposite faces of the current collector 51 to constitute a negative electrode. The negative current collector 51 is the electrolytic copper foil roughened at its both surfaces, which was used in Example 2. Those microcrystalline silicon thin films 52a and 52b were formed in the same manner as in Example 2.

The layers 55a and 55b of positive active material are provided on inner faces of the U-folded positive current collector 54 to constitute a positive electrode. Used for the positive current collector 54 is an aluminum foil which is similar in type to that used in Example 2. The layers 55a and 55b of positive active material are formed in the same manner as in Example 2.

As shown in FIG. 8, the positive current collector 54 is folded in a U-shape to define an inner space into which the negative electrode is inserted. A separator 56a or 56b is placed between the layer of negative active material in the form of silicon thin film 52a or 52b and the layer 55a or 55b of positive active material.

The negative current collector 51 is connected to the negative tab 53 which is in turn connected to a negative case 58. An insulation sheet 57 is disposed between the negative case 58 and the positive current collector 54 adjacent thereto. This insulation sheet 57 establishes electrical insulation between the negative case 58 and the positive current collector 54.

The positive current collector 54 is disposed to come into contact with a positive can 59 to assure electrical connection of the positive current collector 54 to the positive can 59. An insulating packing 60 is interposed between the negative case 58 and the positive can 59 to achieve electrical insulation between them and also close a battery can. An electrolyte solution similar in type to that used in Example 2 is contained in the battery can.

COMPARATIVE EXAMPLE 3

The procedure of Example 3 was followed, except that natural graphite similar in type to that used in Comparative Example 2 was used to form the active material layer of the negative electrode, to construct a coin-type rechargeable lithium battery.

Discharge capacities, average discharge voltages, energy densities per unit volume, and energy densities per unit weight of the coin-type rechargeable lithium batteries obtained in Example 3 and Comparative Example 3 are listed in Table 3.

TABLE 3

| | Discharge Capacity (mAh) | Average Discharge Voltage (V) | Energy Density Per Unit Volume (Wh/l) | Energy Density Per Unit Weight (Wh/kg) |
|---|---|---|---|---|
| Ex.3 | 30 | 3.5 | 210 | 117 |
| Comp. Ex.3 | 25.5 | 3.7 | 189 | 94 |

As indicated in Table 3, the rechargeable lithium battery of Example 3 using, as the negative electrode, the electrode for a rechargeable lithium battery, in accordance with the present invention, exhibits the improved energy density, both per unit volume and per unit weight, compared to the rechargeable lithium battery of Comparative Example 3.

EXAMPLE 4

Figure 9:
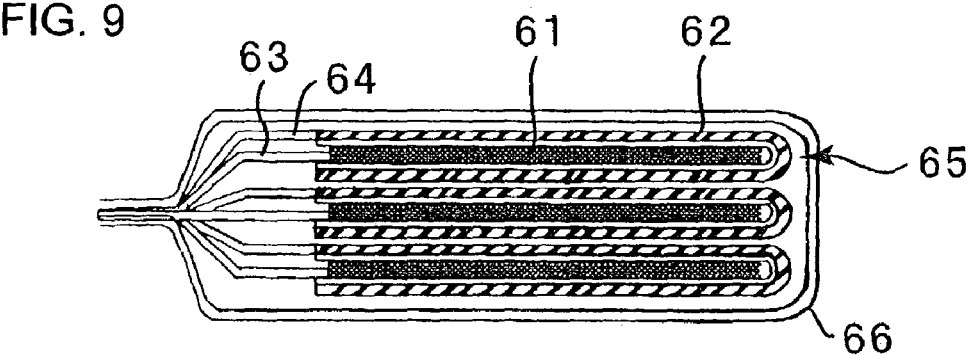
FIG. 9 is a schematic sectional view showing one example of a coin-type rechargeable lithium battery in accordance with the present invention.

A laminate-type rechargeable lithium battery as shown in FIG. 9 was constructed. In FIG. 9, a negative electrode 61 is constituted in a manner similar to that shown in FIG. 8 by providing 5 μm thick microcrystalline silicon thin films on opposite faces of the electrolytic copper foil. A positive electrode 62 is also constituted in a manner similar to that shown in FIG. 8 by providing a pair of layers of positive active material on inner faces of the U-folded aluminum foil which is a positive current collector. A cell 65 is constituted by inserting the negative electrode 61 into an inner space of the U-shaped positive electrode 62. A negative tab 63 extends outwards from the negative electrode 61 and a positive tab 64 extends outwards from the positive electrode 62. Four cells 65 are stacked in a pile and inserted into an interior of a casing 66 made of laminated aluminum. Although only three cells 65 are shown in FIG. 9 to be stacked in a pile, the actual number of cells are four as described above. An electrolyte solution similar in type to that used in Example 2 is introduced in the casing 66.

Figure 10:
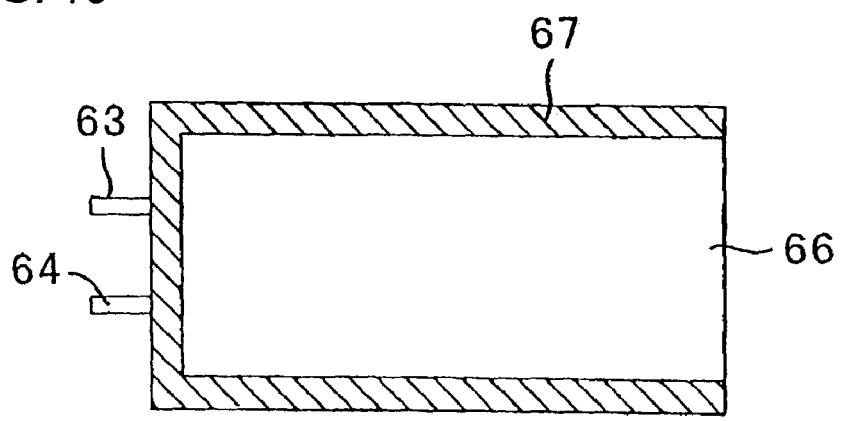
FIG. 10 is a plan view showing one example of a coin-type rechargeable lithium battery in accordance with the present invention.

FIG. 10 is a plan view of the laminate-type rechargeable lithium battery shown in FIG. 9. As shown in FIG. 10, the casing 66 are welded at three sides, so that a welded region 67 is formed. The negative tab 63 and the positive tab 64 both extend toward an exterior of the casing 66.

COMPARATIVE EXAMPLE 4

The procedure of Example 4 was followed, except that graphite similar in type to that used in Comparative Example 2 was used to form the negative electrode, to construct a laminate-type rechargeable lithium battery.

Discharge capacities, average discharge voltages, energy densities per unit volume, and energy densities per unit weight of the coin-type rechargeable lithium batteries obtained in Example 4 and Comparative Example 4 are listed in Table 4.

TABLE 4

|  | Discharge Capacity (mAh) | Average Discharge Voltage (V) | Energy Density Per Unit Volume (Wh/l) | Energy Density Per Unit Weight (Wh/kg) |
| --- | --- | --- | --- | --- |
| Ex.4 | 310 | 3.5 | 250 | 155 |
| Comp. Ex.4 | 260 | 3.7 | 222 | 125 |

As clear from Table 4, the rechargeable lithium battery of Example 4 using, as the negative electrode, the electrode for a rechargeable lithium battery, in accordance with the present invention, exhibits the improved energy density, both per unit volume and per unit weight, compared to the rechargeable lithium battery of Comparative Example 4.

EXAMPLE 5

Figure 11:
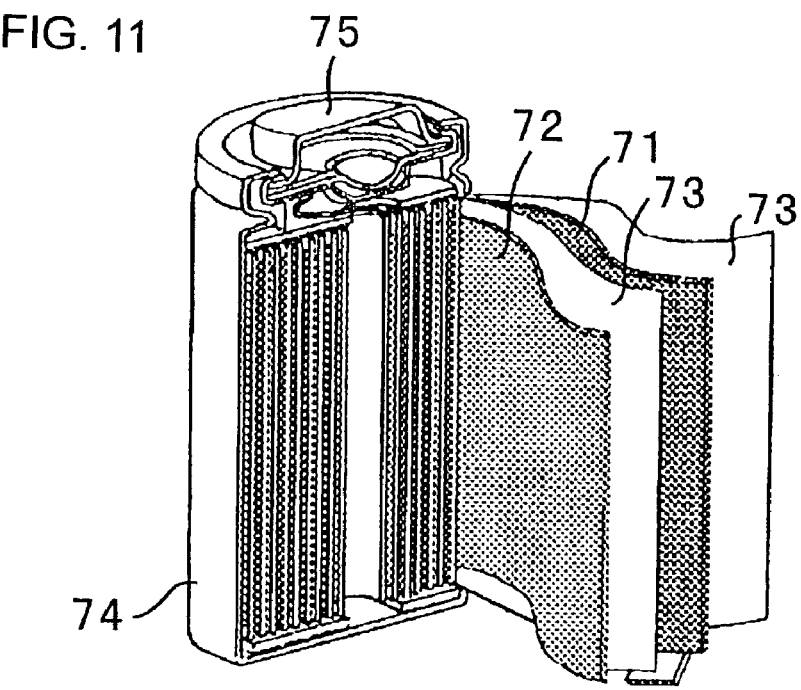
FIG. 11 is an exploded perspective view showing one example of a cylindrical rechargeable lithium battery in accordance with the present invention.

A cylindrical rechargeable lithium battery shown in FIG. 11 was constructed. A separator 73 is interposed between a positive electrode 71 and a negative electrode 73. Another separator 73 is disposed to overlie the positive electrode 71. These are rolled up in a spirally wound configuration and inserted into an interior of a battery can. The positive electrode 71 is similar in construction to that of Example 2, i.e., has layers of positive active material provided on opposite faces of an aluminum foil. The negative electrode 72 is also similar in construction to that of Example 2, i.e., has microcrystalline silicon thin films provided on opposite faces of the electrolytic copper foil. An electrolyte solution similar in type to that used in Example 2 is introduced in the battery can.

The negative electrode 72 is connected to a negative can 74 by a lead. The positive electrode 71 is connected to a positive terminal 75 by a lead.

COMPARATIVE EXAMPLE 5

The procedure of Example 5 was followed, except that graphite active material was used to form the negative electrode similar to that of Comparative Example 2, to construct a cylindrical rechargeable lithium battery.

Discharge capacities, average discharge voltages, energy densities per unit volume, and energy densities per unit weight of the coin-type rechargeable lithium batteries obtained in Example 5 and Comparative Example 5 are listed in Table 5.

TABLE 5

|  | Discharge Capacity (mAh) | Average Discharge Voltage (V) | Energy Density Per Unit Volume (Wh/l) | Energy Density Per Unit Weight (Wh/kg) |
| --- | --- | --- | --- | --- |
| Ex.5 | 770 | 3.5 | 350 | 168 |
| Comp. Ex.5 | 650 | 3.7 | 313 | 127 |

As clear from Table 5, the rechargeable lithium battery of Example 5 using, as the negative electrode, the electrode for a rechargeable lithium battery, in accordance with the present invention, exhibits the improved energy density, both per unit volume and per unit weight, compared to the rechargeable lithium battery of Comparative Example 5.

EXAMPLE 6

Figure 12:
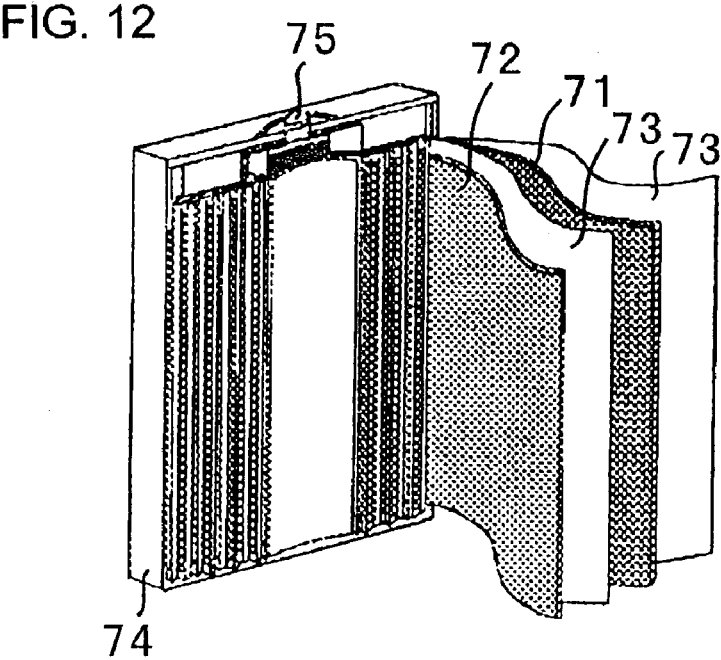
FIG. 12 is an exploded perspective view showing one example of a prismatic rechargeable lithium battery in accordance with the present invention.

A prismatic rechargeable lithium battery shown in FIG. 12 was constructed. A separator 73 is interposed between a positive electrode 71 and a negative electrode 73 and another separator 73 is disposed to overlie the positive electrode 71, as similar to the cylindrical rechargeable lithium battery shown in FIG. 11. These are rolled up in a spirally wound configuration, rendered into a flat form and enclosed within a negative can 74. The negative electrode 72 used is similar in construction to that of Example 2, i.e., it has microcrystalline silicon thin films provided on opposite faces of the electrolytic copper foil.

The negative electrode 72 is electrically connected to a negative can 74 by a lead. The positive electrode 71 is electrically connected to a positive terminal 75 by a lead. An electrolyte solution similar in type to that used in Example 2 is introduced in a battery can.

COMPARATIVE EXAMPLE 6

The procedure of Example 6 was followed, except that graphite active material was used to form the negative electrode similar to that of Comparative Example 2, to construct a prismatic rechargeable lithium battery.

Discharge capacities, average discharge voltages, energy densities per unit volume, and energy densities per unit weight of the coin-type rechargeable lithium batteries obtained in Example 6 and Comparative Example 6 are listed in Table 6.

TABLE 6

|  | Discharge Capacity (mAh) | Average Discharge Voltage (V) | Energy Density Per Unit Volume (Wh/l) | Energy Density Per Unit Weight (Wh/kg) |
| --- | --- | --- | --- | --- |
| Ex.6 | 700 | 3.5 | 309 | 181 |
| Comp. Ex.6 | 600 | 3.7 | 280 | 139 |

As clear from Table 6, the rechargeable lithium battery of Example 6 using, as the negative electrode, the electrode for a rechargeable lithium battery, in accordance with the present invention, exhibits the improved energy density, both per unit volume and per unit weight, compared to the rechargeable lithium battery of Comparative Example 6.

REFERENCE EXPERIMENTS

Next, electrodes were fabricated having a silicon thin film provided on only one face of an electrolytic copper foil and the change in condition of the silicon thin film caused by the charge-discharge reaction was observed.

Reference Experiment 1

(Fabrication of Negative Electrode)

An electrolytic copper foil (18 µm thick, surface roughness Ra=0.188 µm, mean spacing S=11 µm) in which only one surface was roughened was used for a current collector. A microcrystalline silicon thin film (about 10 µm thick) was formed only on the roughened surface of the copper foil by a plasma CVD technique in the same film-forming conditions as in Example 1. Then, a 17 mm diameter piece was punched out from the resulting sample to fabricate an electrode a1.

(Fabrication of Positive Electrode)

80 parts by weight of the LiCoO2 powder obtained in the same manner as in Example 1, 10 parts by weight of acetylene black as a conducting material and 10 parts by weight of polytetrafluoroethylene as a binder were mixed. The mixture was pressed in a 17 mm diameter mold and then an aluminum foil is attached to the obtained compact to fabricate a pellet-form positive electrode.

(Construction of Battery)

A coin type rechargeable lithium battery was constructed using the above-fabricated electrode a1 for the negative electrode, and the above-fabricated positive electrode and the electrolyte solution prepared in the same manner as in Example 1.

Figure 13:
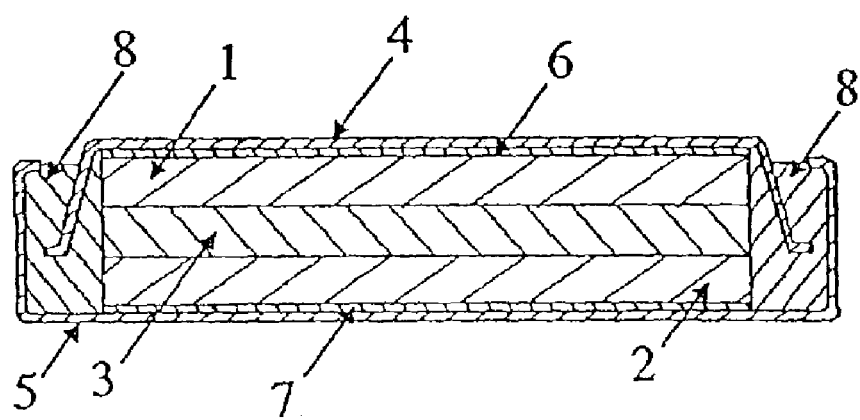
FIG. 13 is a schematic sectional view showing a rechargeable lithium battery constructed in Reference Example.

FIG. 13 is a schematic sectional view, illustrating a such-constructed rechargeable lithium battery which includes a positive electrode 1, a negative electrode 2, a separator 3, a positive can 4, a negative can 5, a positive current collector 6, a negative current collector 7 and an insulating gasket 8 made of polypropylene.

The positive electrode 1 and negative electrode 2 are disposed on opposite sides of the separator 3. These are enclosed in a battery case composed of the positive can 4 and negative can 5. The positive electrode 1 is connected to the positive can 4 by the positive current collector 6. The negative electrode 2 is connected to the negative can 5 by the negative current collector 7. Such construction enables charge and discharge as a secondary battery.

(Measurement of Charge-Discharge Cycle Life Characteristics)

The above battery was charged at a current of 100 µA at 25° C. until a negative electrode capacity reached 2,000 mAh/g, and then discharged. This was recorded as a unit charge-discharge cycle. Cycling was effected to measure a 30th-cycle capacity retention rate.

The 30th-cycle capacity retention rate of the above battery is 97%, which is excellent capacity retention rate.

Figure 14:
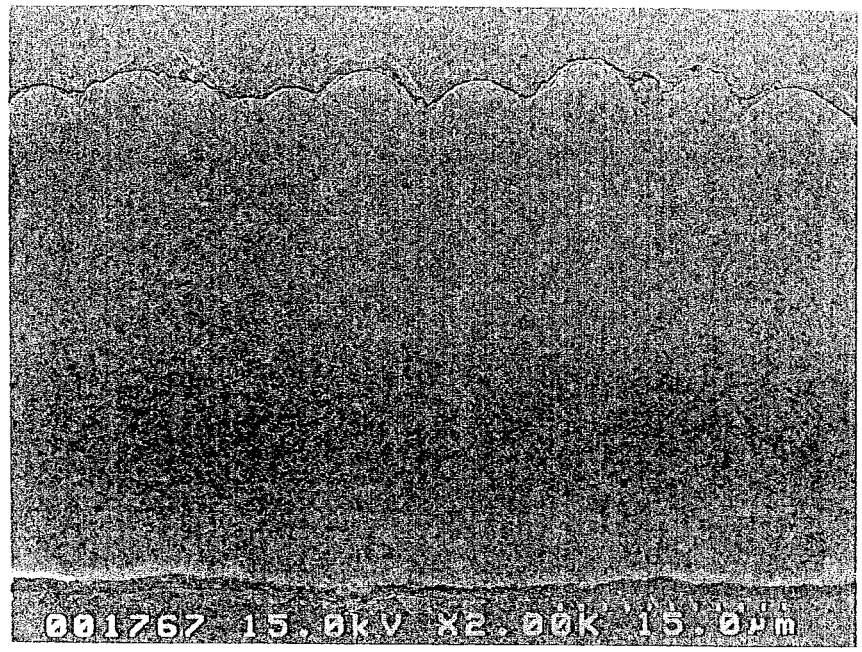
FIG. 14 is a photomicrograph (at a magnification of 2,000×) taken using a scanning electron microscope, showing an electrode in Reference Example in its state before charge and discharge.
Figure 15:
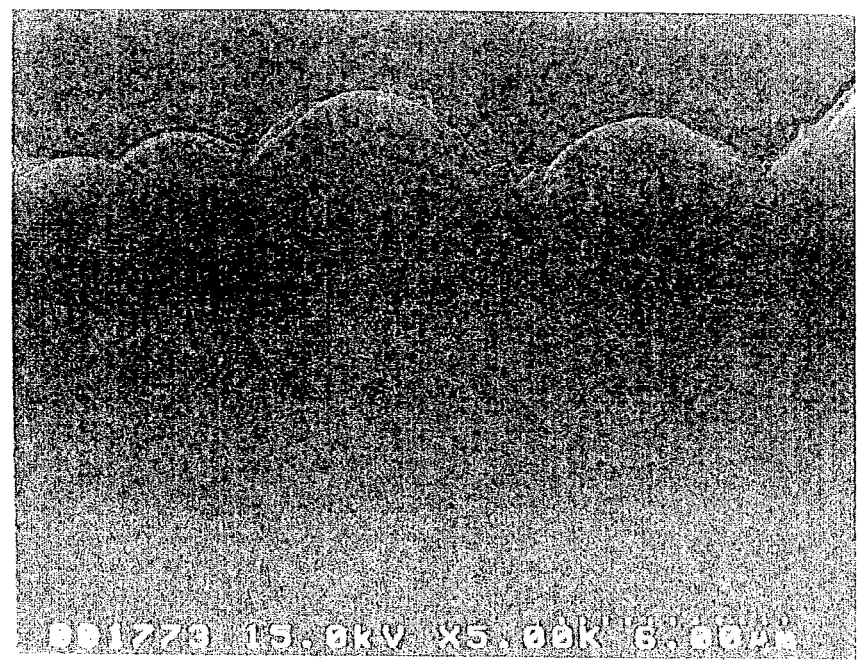
FIG. 15 is a photomicrograph (at a magnification of 5,000×) taken using a scanning electron microscope, showing an electrode in Reference Example in its state before charge and discharge.

The electrode a1 incorporated in the above battery was viewed under an electron microscope to observe a condition of its silicon thin film. First, the electrode a1 in its state prior to being incorporated in the battery, i.e., before charge and discharge, was observed using a scanning electron microscope. FIGS. 14 and 15 are photomicrographs (secondary electron images) taken with a scanning electron microscope, both showing the electrode a1 in its state before charge and discharge. FIGS. 14 and 15 are taken at 2,000× and 5,000× magnifications, respectively.

The electrode was embedded in a resin and then sliced to provide a sample. The layers of the embedding resin are found in upper and lower end portions of FIG. 14 and in an upper end portion of FIG. 15.

In FIGS. 14 and 15, a portion that appears slightly light indicates the copper foil. The deposited silicon thin film (about 10 µm thick) is found as a dark portion on the copper foil. As shown in FIGS. 14 and 15 irregularities are formed on a surface of the copper foil. Particularly, projections have a generally conical shape. Similar irregularities are formed on a surface of the silicon thin film deposited on the copper foil. Accordingly, the surface irregularities of the silicon thin film appear to generally conform in shape to those formed on the copper foil surface.

Next, the electrode a1 was removed from the above battery after 30 cycles, embedded in a resin, and then subjected to observation under a scanning electron microscope in the same manner as described previously. Here, the electrode a1 was removed after discharge. Thus, the observed electrode a1 was in its state after discharge.

Figure 16:
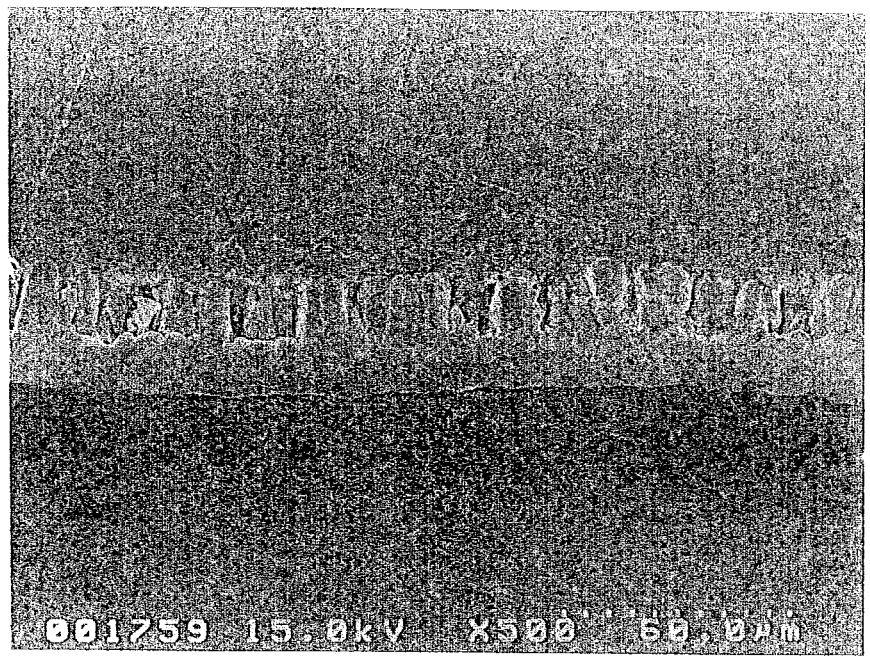
FIG. 16 is a photomicrograph (at a magnification of 500×) taken using a scanning electron microscope, showing an electrode in Reference Example in its state after charges and discharges.
Figure 17:
FIG. 17 is a photomicrograph (at a magnification of 2,500×) taken using a scanning electron microscope, showing an electrode in Reference Example in its state after charges and discharges.

FIGS. 16 and 17 are photomicrographs (secondary electron images) taken with a scanning electron microscope, each showing the electrode a1 after discharge. FIGS. 16 and 17 are taken at 500× and 2,500× magnifications, respectively.

As shown in FIGS. 16 and 17, the silicon thin film has gaps that extend in its thickness direction and divide the silicon thin film into columns. Gaps are barely found to extend in a planar direction. A bottom of each columnar portion is found to adhere well to the copper foil as a current collector. Also, each columnar portion has a round top. It is thus understood that these gaps are formed to originate from the valleys of irregularities that were found on the surface of the silicon thin film in its state before charge and discharge.

Figure 18:
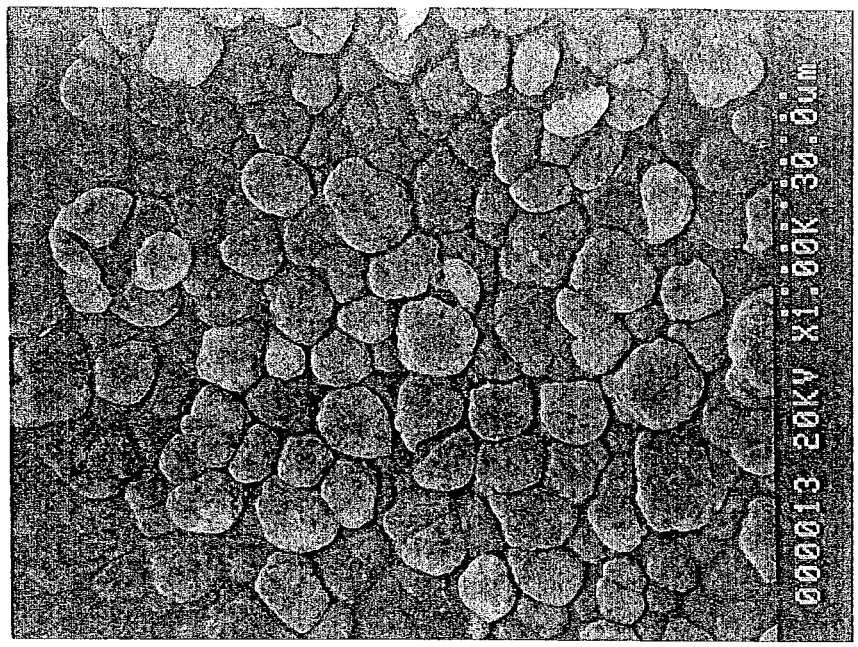
FIG. 18 is a photomicrograph (at a magnification of 1,000×) taken using a scanning electron microscope, showing a silicon thin film of an electrode in Reference Example when viewed from above.
Figure 19:
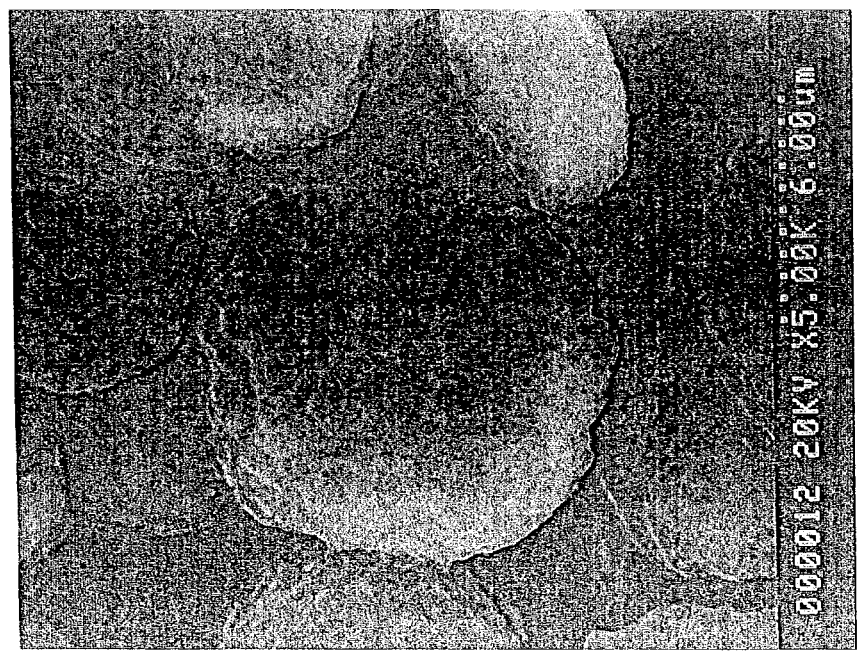
FIG. 19 is a photomicrograph (at a magnification of 5,000×) taken using a scanning electron microscope, showing a silicon thin film of an electrode in Reference Example when viewed from above.
Figure 20:
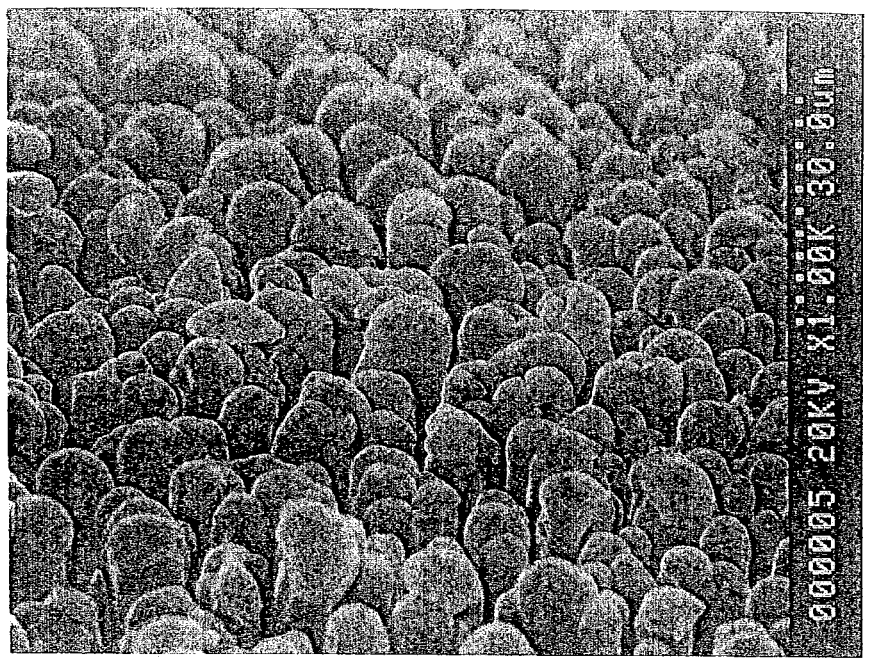
FIG. 20 is a photomicrograph (at a magnification of 1,000×) taken using a scanning electron microscope, showing a silicon thin film of an electrode in Reference Example when viewed from a slight angle.
Figure 21:
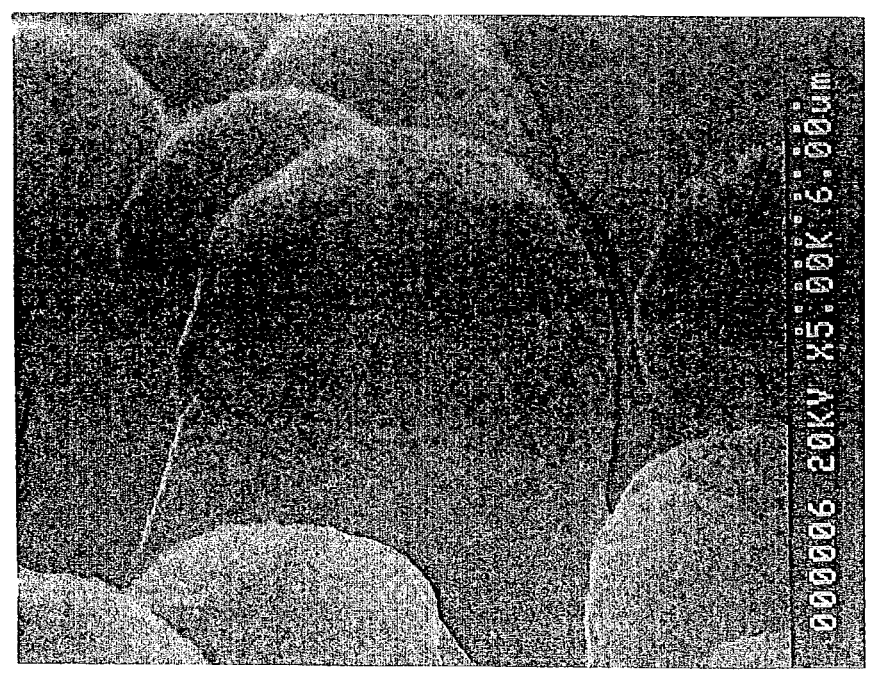
FIG. 21 is a photomicrograph (at a magnification of 5,000×) taken using a scanning electron microscope, showing a silicon thin film of an electrode in Reference Example when viewed from a slight angle.

Further, the surface of the silicon thin film of the electrode a1 after charges and discharges was observed with a scanning electron microscope. FIGS. 18 and 19 are photomicrographs (secondary electron images) taken with a scanning electron microscope, each showing the surface of the silicon thin film when viewed from above. FIGS. 18 and 19 are taken at 1,000× and 5,000× magnifications, respectively. FIGS. 20 and 21 are photomicrographs (secondary electron images) taken with a scanning electron microscope, each showing the surface of the silicon thin film when viewed at a slight angle. FIGS. 20 and 21 are taken at 1,000× and 5,000× magnifications, respectively.

As shown in FIGS. 18–21, the gaps are formed in such a way to surround the columnar portions of the silicon thin film so that spaces are defined between neighboring columnar portions. When the silicon thin film stores lithium on charge, the columnar portions will expand and increase in volume. This increment in volume, however, is believed to be accommodated by those spaces provided around the columnar portions. On discharge, the columnar portions of the silicon thin film release the lithium and shrink to decrease in volume. This decrement in volume is believed to restore the spaces around the columnar portions. Such a columnar structure of the silicon thin film is effective to relax a stress caused by expansion and shrinkage of the active material on charge and discharge.

The formation of the gaps which divide the silicon thin film into columns results in a marked increase in contact area thereof with the electrolyte solution. Also, the columnar portions are almost comparable in size to each other. These are believed to allow efficient occurrence of a charge-discharge reaction accompanying storage and release of lithium in the thin film of active material.

Since the individual columnar portions of the silicon thin film adhere to the current collector, as shown in FIGS. 16 and 17, good electrical connection is provided between the active material and the current collector. This is believed to allow efficient occurrence of the charge-recharge reaction.

As also shown in FIGS. 18–21, each columnar portion has a round top. This provides an electrode structure which prevents localized current concentration and reduces the occurrence such as of a deposition reaction of a lithium metal.

Figure 22:
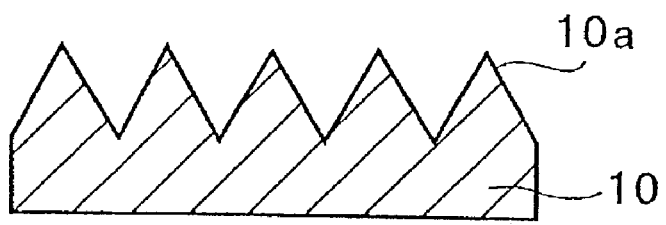
FIG. 22 is a schematic sectional view, showing a silicon thin film in the process of being divided by gaps into columns in Reference Example.
Figure 22:
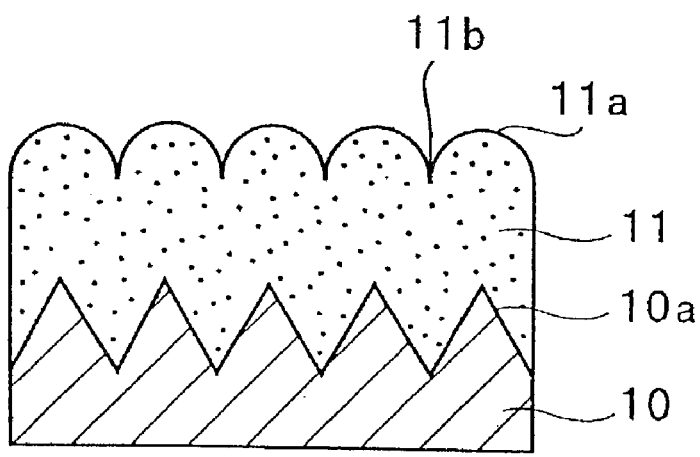
Figure 22:
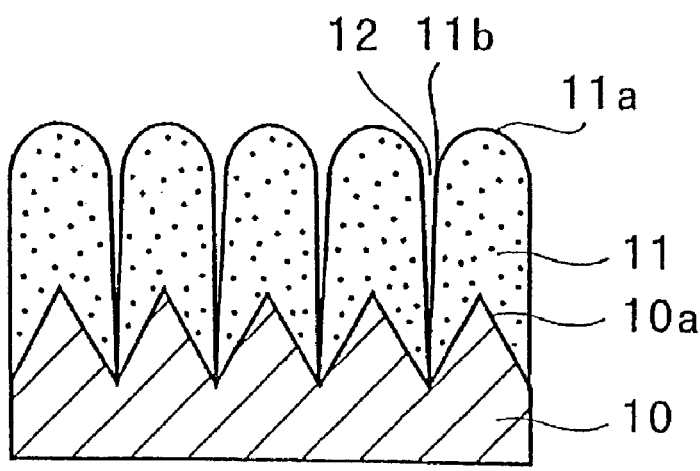

FIG. 22 is a schematic sectional view, illustrating a process whereby the silicon thin film deposited on a copper foil is divided into columns by the gaps formed therein.

As shown in FIG. 22(*a*), the copper foil 10 has irregularities on its surface 10*a*. The copper foil with the increased value for surface roughness Ra has the larger irregularities.

FIG. 22(*b*) illustrates a noncrystalline silicon thin layer 11 deposited on a rough surface 10*a* of the copper foil 10. The surface 11*a* of the silicon thin film 11 is influenced by the irregularities on the surface 10*a* of the copper foil 10 to have similar irregularities. Before charge and discharge, the silicon thin film 11 remains undivided, as shown in FIG. 22(*b*). When charging is effected, the silicon thin film 11 stores lithium therein and expands in volume. During the charge, the silicon thin film 11 appears to expand in both thickness and planar directions of the thin film, although the detail is not clear. During the subsequent discharge reaction, the silicon thin film 11 releases lithium therefrom and shrinks in volume. At this time, a tensile stress is produced in the silicon thin film 11. Probably, such a stress concentrates at valleys 11*b* of the irregularities on the surface 11*a* of the silicon thin film 11 to result in the formation of gaps 12 that originate from the valleys 11*b* and extend in the thickness direction, as shown in FIG. 22(*c*) Conceivably, the gaps 12 such formed relax the stress to allow the silicon thin film 11 to shrink without occurrence of falling-off from the copper foil 10.

In the silicon thin film divided into columns in the fashion as described above, the spaces provided around the columnar portions serve to relax the stress resulting from expansion and shrinkage of the active material during the succeeding charge-discharge cycles. This appears to assure repetitive charge-discharge cycling while preventing falling-off of the active material from the current collector.

Figure 23:
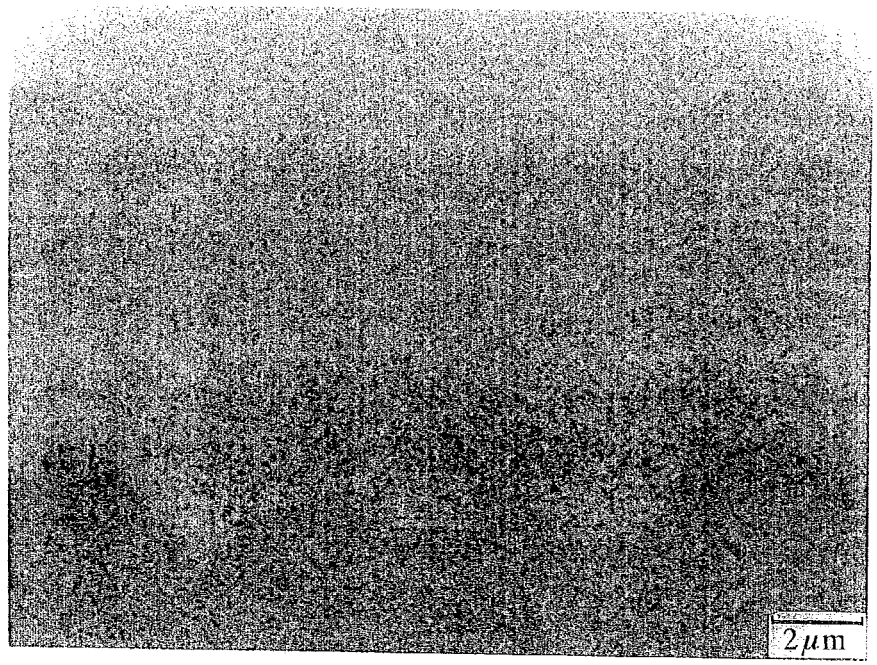
FIG. 23 a photomicrograph (at a magnification of 12,500×) taken using a transmission electron microscope, showing a section of a silicon thin film of an electrode a1 in Reference Example.

Further, the electrode a1 incorporating an about 10 μm thick, microcrystalline silicon thin film deposited on an electrolytic copper foil was observed under a transmission electron microscope to study a mechanism whereby the gaps are formed in the silicon thin film. FIG. 23 is a photomicrograph (at a magnification of 12,500×) taken with a transmission electron microscope, showing a section of the electrode a1 before charge and discharge. The observation sample was prepared by slicing the resin-embedded electrode.

Figure 25:
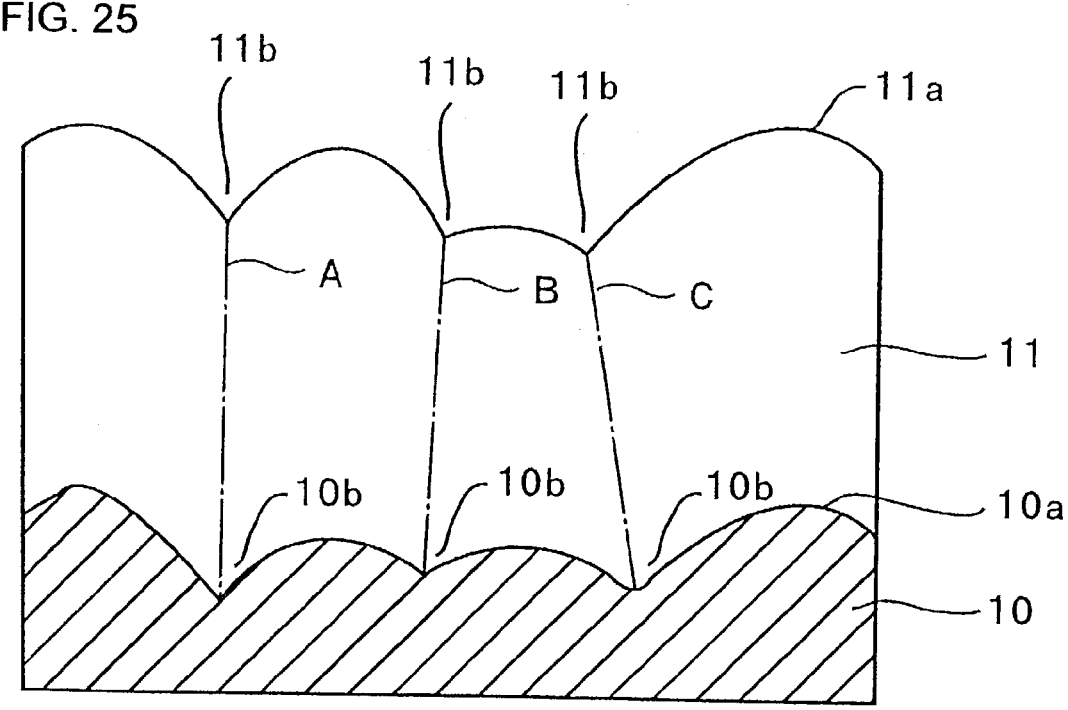
FIG. 25 is a diagrammatic representation of the photomicrograph of FIG. 23.

FIG. 25 is a diagrammatic representation of the photomicrograph of FIG. 23. In the photomicrograph of FIG. 23 taken with a transmission electron microscope, the silicon thin film 11 is deposited on the surface 10*a* of the electrolytic copper foil 10, as diagrammatically shown in FIG. 25. The silicon thin film 11 appears light relative to the copper foil 10 in the photomicrograph taken with a transmission electron microscope. In the silicon thin film shown in FIG. 23, light portions are observed in the regions extending between respective valleys 11*b* and 10*b* of the irregularities on the surfaces 11*a* and 10*a* of the silicon thin film 11 and copper foil 10. These light portions are indicated by single-dotted chain lines A, B and C in FIG. 25. Particularly, the light portion is observed more clearly in the region indicated by A. These regions are considered to be low in density, i.e., low-density regions of the silicon thin film 11. For the purpose of observing such low-density regions in more detail, an electrode a2 was fabricated by depositing an about 2 μm thick, microcrystalline silicon thin film on an electrolytic copper foil under the same conditions as used in the fabrication of the electrode a1.

Figure 24:
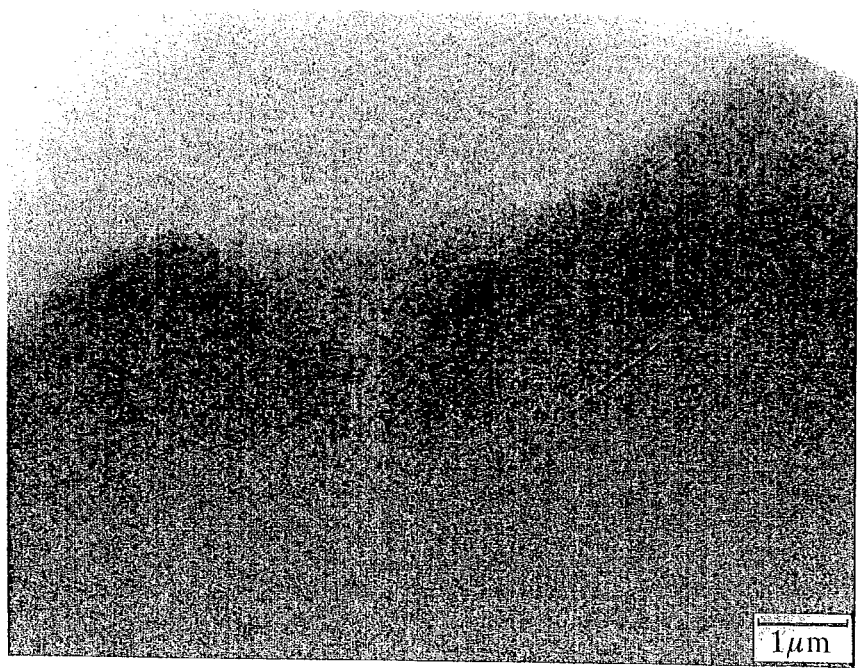
FIG. 24 a photomicrograph (at a magnification of 25,000×) taken using a transmission electron microscope, showing a section of a silicon thin film of an electrode a2 in Reference Example.
Figure 26:
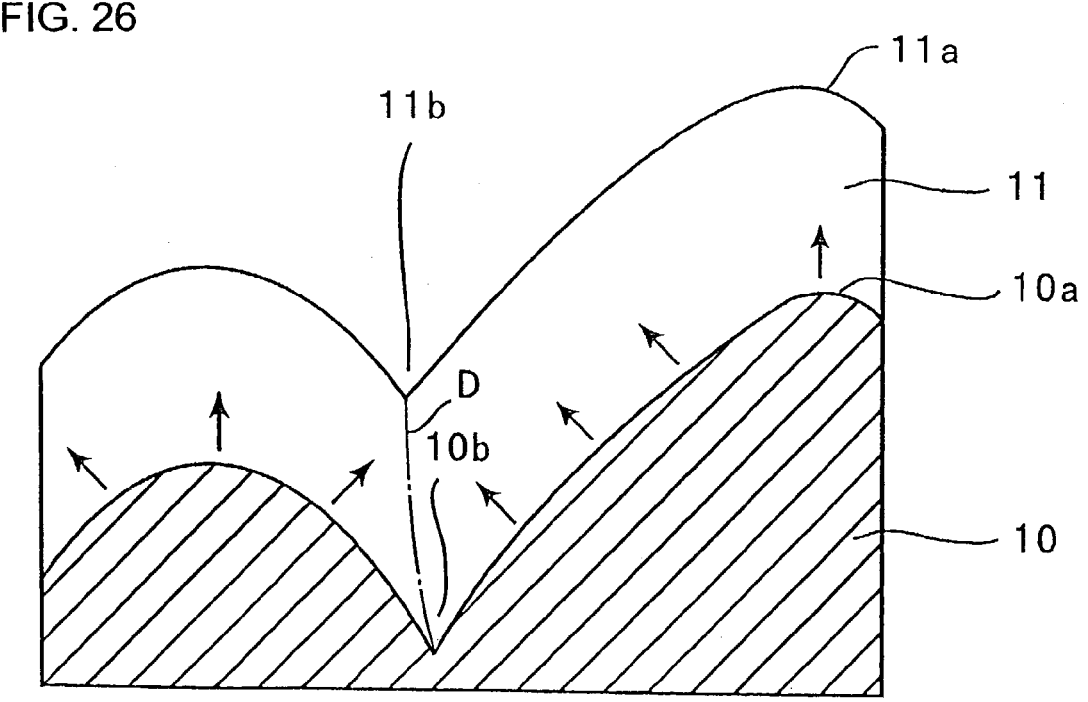
FIG. 26 is a diagrammatic representation of the photomicrograph of FIG. 24.

FIG. 24 is a photomicrograph taken by a transmission electron microscope, showing the electrode a2 when observed in the same manner as described above. FIG. 24 is taken at a magnification of 25,000×. FIG. 26 is a diagrammatic representation of the photomicrograph of FIG. 24. As clear from FIG. 24, a low-density region is also observed in the region D of the electrode a6 that extends between the respective valleys 11*b*, 10*b* of the irregularities on the surfaces 11*a*, 10*a* of the silicon thin film 11 and the copper foil 10. A detailed observation of the photomicrograph of FIG. 24 reveals a number of fine lines extending in directions shown by the arrows in FIG. 26. It seems very likely that such lines are formed as the silicon thin film grows. It accordingly appears that the silicon thin film 11 grows generally perpendicularly to the surface 10*a* of the copper foil 10. It also appears that the silicon thin film layer grows in such a direction to collide at the region D with an adjacent silicon thin film layer being deposited and growing on the adjacent inclined surface of the copper foil. Thus the formation of the low-density region D is very likely to have resulted from such a collision at the region D. It also appears that the collision of the silicon thin film layers with each other is continued till the end of thin film formation, and formation of the low-density region also continues until reaching the surface of the silicon thin film.

Figure 27:
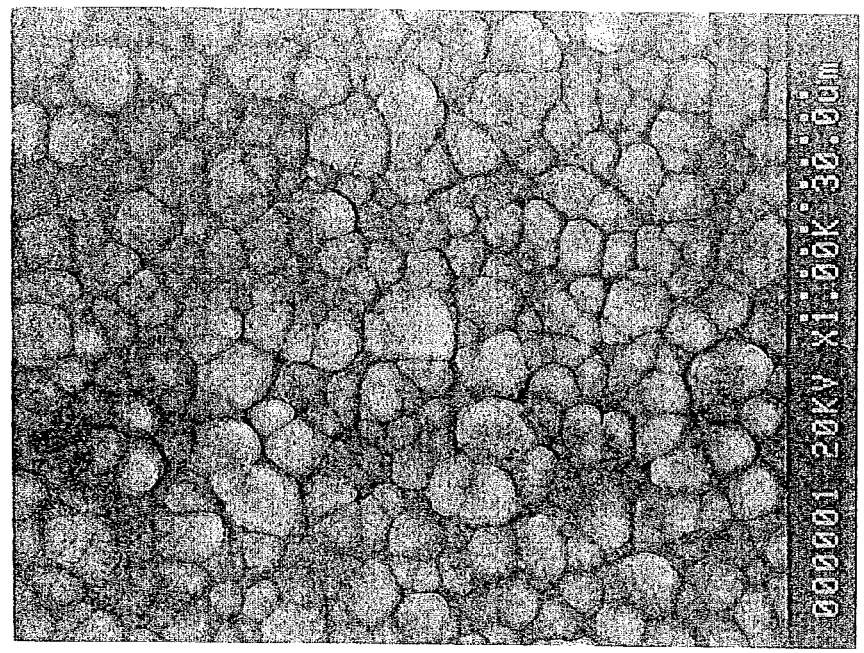
FIG. 27 is a photomicrograph (at a magnification of 1,000×) taken using a scanning electron microscope, showing a silicon thin film surface of an electrode a1 in Reference Example when viewed from above.

FIG. 27 is a photomicrograph (secondary electron image) taken with a scanning electron microscope, showing a surface of a silicon thin film of an electrode a1 when observed from above. The electrode a1 shown in FIG. 27 is in its state before charge and discharge. FIG. 27 is viewed at 1,000× magnification. In FIG. 27, portions appearing lightened indicate projections on a surface of the silicon thin film and the surrounding portions appearing darkened indicate valleys on the surface of the silicon thin film. As shown in FIG. 27, the valleys on the surface of the silicon thin film are connected to each other like a network. It is accordingly found that the low-density regions define a continuous network in a plane of the silicon thin film. As shown in FIGS. 23 and 25, such a reticulated low-density region also extends in a thickness direction toward the current collector.

The dark portions in FIG. 27 do not indicate the gaps (spaces). This is apparent from the fact that no gap (space) is observed which extends in the thickness direction of the thin film in the photomicrographs of FIGS. 14 and 15 taken by a scanning electron microscope.

Figure 28:
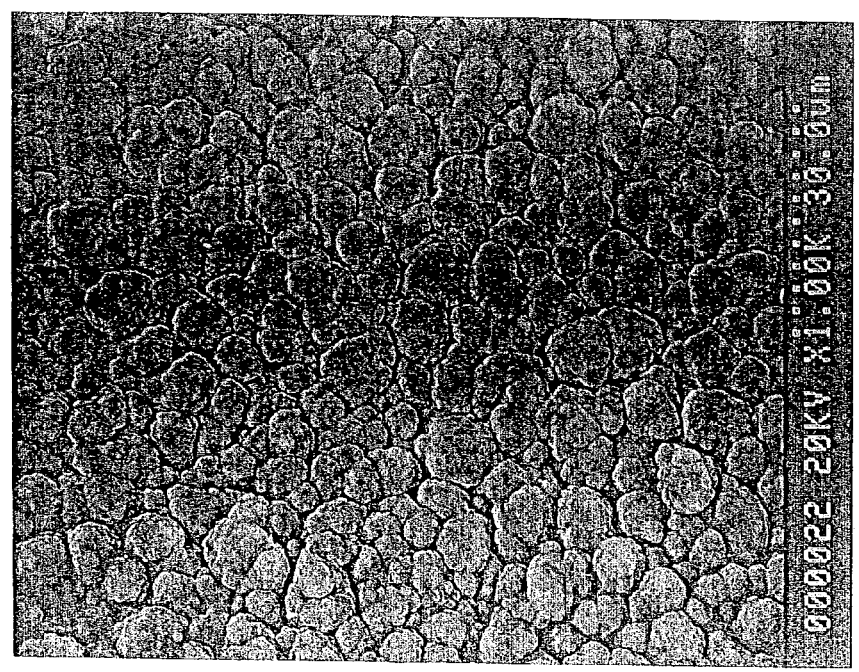
FIG. 28 is a photomicrograph (at a magnification of 1,000×) taken using a scanning electron microscope, showing a silicon thin film surface of an electrode a2 in Reference Example when viewed from above.

FIG. 28 is a photomicrograph (secondary electron image) taken at a magnification of 1,000 using a scanning electron microscope, showing a surface of a silicon thin film, when observed from above, of an electrode a2 in its state before charge and discharge. As apparent from FIG. 28, the valleys in the electrode a2 are also connected to each other like a network. It is accordingly found that the low-density regions are arranged like a network continuous in a planar direction.

Figure 29:
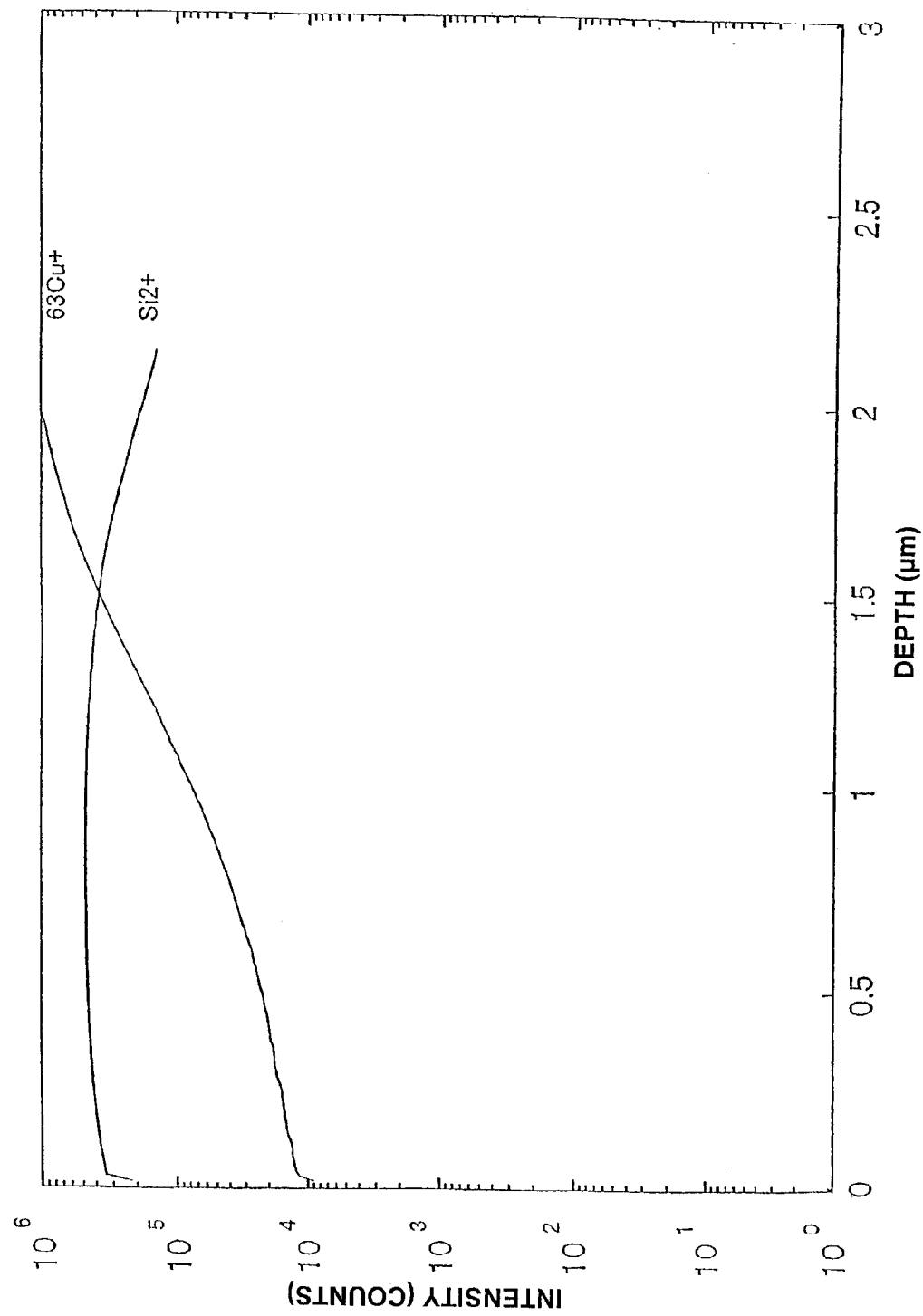
FIG. 29 is a graphical representation illustrating concentration profiles of constituent elements in a silicon thin film of an electrode a2 in Reference Example along the depth of the film.

FIG. 29 is a graph showing concentration profiles of constituent elements along the thickness of the silicon thin film in the electrode a2. The concentration profiles of constituent elements were obtained via measurement of concentrations of copper ($^{63}Cu^+$) and silicon ($Si^{2+}$) by SIMS using $O_2^+$ as a sputtering source. In FIG. 29, the abscissa indicates a depth (μm) from a surface of the silicon thin film and the ordinate indicates an intensity (count) of each constituent element.

As apparent from FIG. 29, a constituent element of the current collector, copper (Cu), is found to diffuse in the silicon thin film at locations adjacent to the current collector. The copper (Cu) concentration decreases at a location closer to the surface of the silicon thin film. The copper (Cu) concentration is also found to vary in a continuous fashion. This demonstrates that a solid solution of silicon and copper, instead of an intermetallic compound thereof, is formed in the copper(Cu)-diffused region.

In view of the previous discussion, the following is very likely to explain a mechanism whereby the gaps are formed in the silicon thin film to extend in its thickness direction as it expands and shrinks during charge and discharge. That is, a stress caused by expansion or shrinkage in volume of the silicon thin film concentrates at valleys of the irregularities on the silicon thin film surface, as previously explained by referring to FIG. 22. Also, in the silicon thin film, there initially exists low-density regions which are relatively low in mechanical strength, extending from the valleys toward the current collector. As the result of the above-mentioned situations, the gaps (spaces) are likely to be formed along these low-density regions.

Also, as shown in FIG. 29, the diffusion of copper, a constituent element of the current collector, into the silicon thin film creates a concentration gradient of copper therein, so that the copper concentration is higher at a location closer to the current collector and lower at a location closer to the surface of the silicon thin film. Accordingly, a higher concentration of copper nonreactive with lithium and a lower concentration of silicon reactive with lithium exist at a location closer to the current collector. In the vicinity of the current collector, the silicon thin film is believed to store and release less lithium, undergo less expansion and shrinkage, and thus produce a lower level of stress which leads to the reduced formation of the gaps (spaces) which may occasion separation or removal of the silicon thin film from the current collector. As a result, the bottoms of the columnar portions of the silicon thin film can be kept adherent to the current collector.

The silicon thin film divided by such gaps into columns keeps a strong adhesion to the current collector even during charge-discharge cycles. Also, the spaces provided to surround the columnar portions serve to relax the stress caused by expansion and shrinkage of the thin film that occur with charge-discharge cycling. These are believed to be contributors to excellent charge-discharge cycle characteristics.

In the above electrodes a1 and a2, it is believed to produce a strain in the current collector due to the provision of a silicon thin film that expands and shrinks by a charge-discharge reaction on only one face of the current collector.

In the electrodes of the above Examples in accordance with the present invention, the thin films of active material are provided on opposite faces of the current collector. It is accordingly believed to reduce a strain produced in the current collector by balancing stresses applied to the current collector from the thin films during a charge-discharge reaction, between the opposite faces. This is also believed to further decrease the possibility of the thin film to separate from the current collector and thereby further improve charge-discharge cycle characteristics.

Reference Experiment 2

(Fabrication of Electrode a7)

An electrolytic copper foil similar to that for use in the fabrication of the electrode a1 in Reference Example 1 was used for a current collector as a substrate. An amorphous germanium thin film (about 2 μm thick) was formed on this copper foil by an RF sputtering technique to fabricate an electrode a7.

The thin film was formed using germanium as a target, at a sputtering gas (Ar) flow rate of 100 sccm, an ambient substrate temperature (not heated), a reaction pressure of 0.1 Pa, and 200 W RF power.

The resulting germanium thin film was analyzed by Raman spectroscopy which detected the presence of a peak around 274 $cm^1$ and the absence of a peak around 300 $cm^{-1}$. This revealed an amorphous nature of the germanium thin film.

(Fabrication of Electrode a8)

An amorphous germanium thin film (about 2 μm thick) was formed on an electrolytic copper foil, similar in type to the current collector of the electrode a7, by using a vapor evaporation technique to fabricate an electrode a8.

Figure 30:
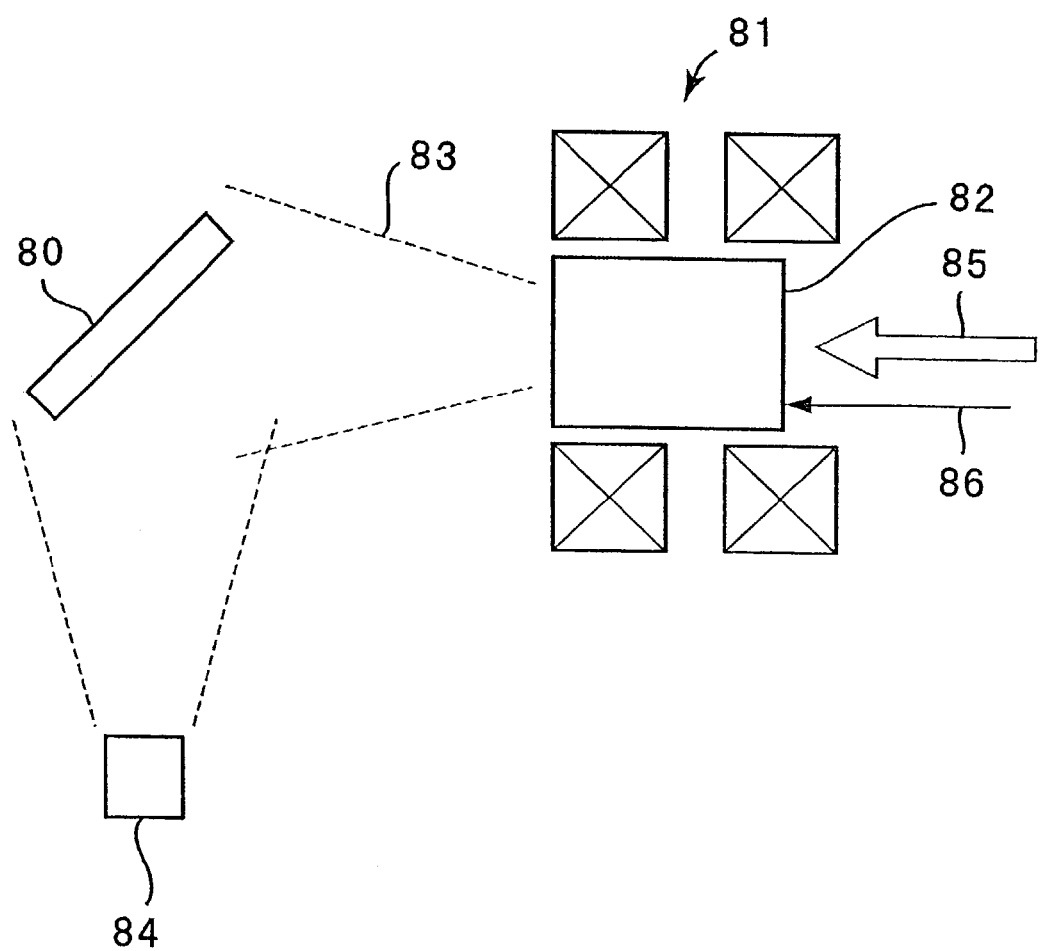
FIG. 30 is a schematic view, showing a construction of an apparatus which is employed when a thin film is formed by a vacuum vapor evaporation technique in Reference Examples.

Specifically, the germanium thin film was deposited on the substrate by utilizing an apparatus of the construction shown in FIG. 30. Referring to FIG. 30, an ECR plasma source 81 includes a plasma generation chamber 82 to which a microwave power 85 and an argon(Ar) gas 86 are supplied. An argon(Ar) plasma is generated when the microwave power 85 is supplied to the plasma generation chamber 82. This argon(Ar) plasma 83 is directed to exit from the plasma generation chamber 82 and bombard a substrate 80. The germanium thin film can be deposited on the substrate 80 by utilizing an electron beam from an electron beam (EB) gun 84 disposed below the substrate 80.

The electrolytic copper foil substrate was pretreated by argon(Ar) plasma irradiation before the germanium thin film was deposited thereon. A degree of vacuum within the reaction chamber was adjusted to about 0.05 Pa (about $5 \times 10^{-4}$ Torr). The substrate was exposed to the argon(Ar) plasma under conditions of an argon(Ar) gas flow rate of 40 sccm and a supplied microwave power of 200 W. During the argon(Ar) plasma irradiation, an bias voltage of −100 V was applied to the substrate. The pretreatment was accomplished by exposing the substrate to the Ar plasma for 15 minutes.

Next, the germanium thin film was deposited at a deposition rate of 1 nm/sec (10 Å/sec) using an electron beam gun. The substrate temperature was ambient temperature (not heated).

The resulting germanium thin film was analyzed by Raman spectroscopy which revealed an amorphous nature of the germanium thin film, as similar to the electrode a7.

(Fabrication of Electrode b2)

80 parts by weight of germanium powder with a mean particle diameter of 10 μm, 10 parts by weight of acetylene black as an electroconductive material, and 10 parts by weight of polytetrafluoroethylene as a binder were mixed. This mixture was pressed in a 17 mm diameter mold to fabricate a pellet-form electrode b2.

(Construction of Batteries)

The procedure of Experiment was repeated, except that the above-fabricated electrodes a7, a8 and b2 were used for the negative electrode, to construct batteries A7, A8 and B2.

(Evaluation of Charge-Discharge Cycle Characteristics)

Each battery was charged at a current of 0.1 mA at 25° C. to 4.2 V, and then discharged to 2.75 V. This standard charge-discharge cycling was repeated to measure a capacity retention rate on the 10th cycle. The measurement results are given in Table 7.

TABLE 7

| Battery | 10th-Cycle Capacity Retention Rate |
|---------|-----------------------------------|
| A7      | 96%                               |
| A8      | 93%                               |
| B2      | 39%                               |

As apparent from Table 7, the batteries A7 and A8 using the electrodes in accordance with this invention, i.e., the electrodes incorporating the germanium thin film formed on the current collector, for the negative electrode exhibit markedly improved capacity retention rates compared to the battery B2 using the germanium powder for the negative electrode.

(Observation With Electron Microscope)

Figure 31:
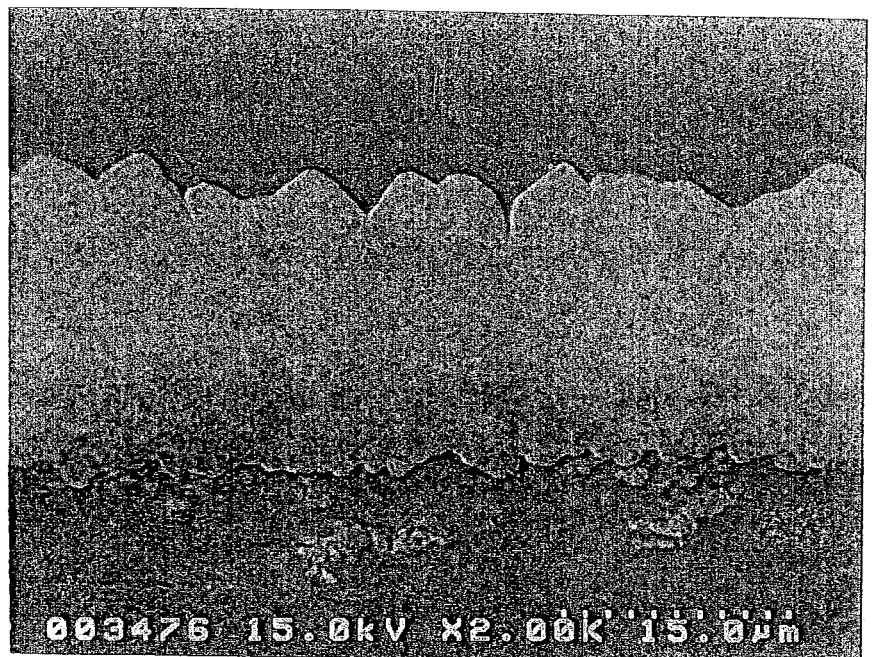
FIG. 31 is a photomicrograph (at a magnification of 2,000×) taken using a scanning electron microscope, showing an electrode a7 in Reference Example in its state before charge and discharge.
Figure 32:
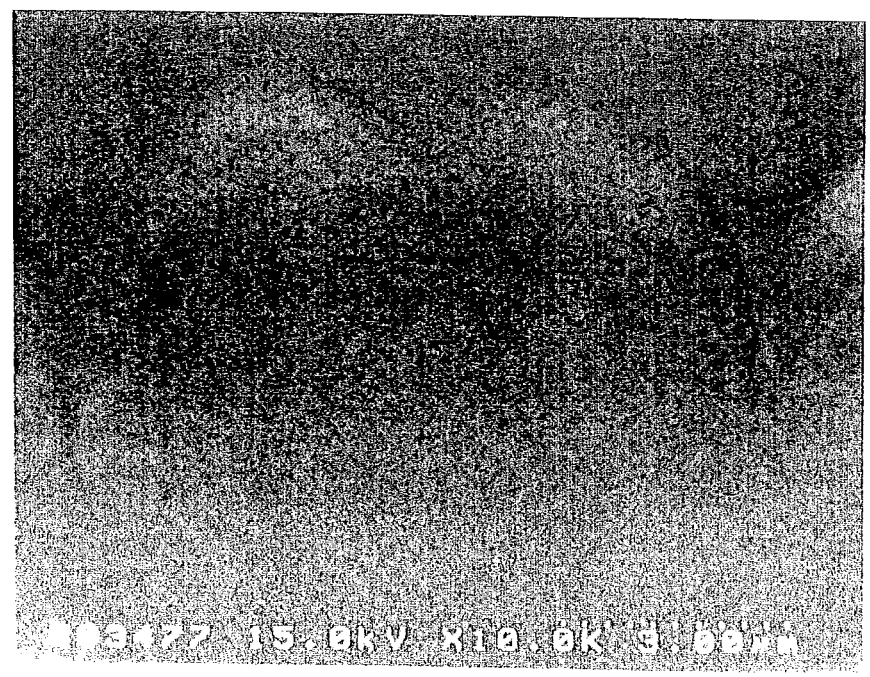
FIG. 32 is a photomicrograph (at a magnification of 10,000×) taken using a scanning electron microscope, showing the electrode a7 in Reference Example in its state before charge and discharge.

FIGS. 31 and 32 are photomicrographs (reflection electron images) taken with a scanning electron microscope, each showing a section of the electrode a7 in its state before being charged and discharged. FIGS. 31 and 32 were taken at magnifications of 2,000× and 10,000×, respectively.

Each electrode was resin embedded and then sliced to provide a sample. The embedding resin is observed as layers located in upper and lower end portions of FIG. 31 and in an upper end portion of FIG. 32.

In FIGS. 31 and 32, the copper foil and the germanium thin film appear lightened relative to the rest. A thin layer overlying the copper foil is the germanium thin film. Irregularities are defined on a surface of the copper foil. Similar irregularities are also found on a surface of the germanium thin film. This suggests that the irregularities on the germanium thin film surface were formed to conform in shape to those defined on the copper foil surface.

In FIG. 32, there is observed a dark portion that is located in a germanium thin film region overlying a leftmost valley of the copper foil and extends in a thickness direction of the thin film. This portion is very likely to indicate a region of low density, i.e., a low-density region of the germanium thin film.

Figure 33:
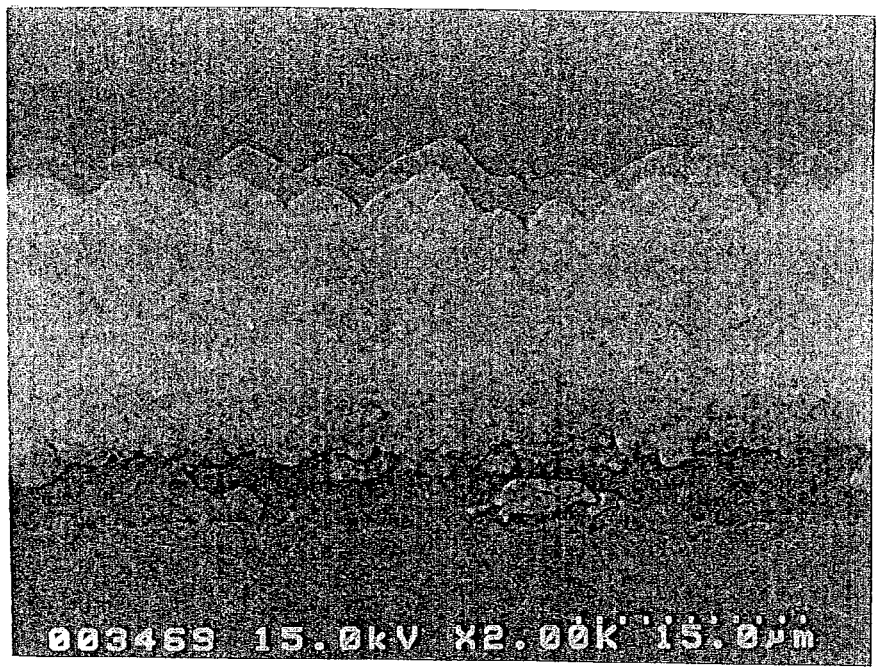
FIG. 33 is a photomicrograph (at a magnification of 2,000×) taken using a scanning electron microscope, showing an electrode a8 in Reference Example in its state before charge and discharge.
Figure 34:
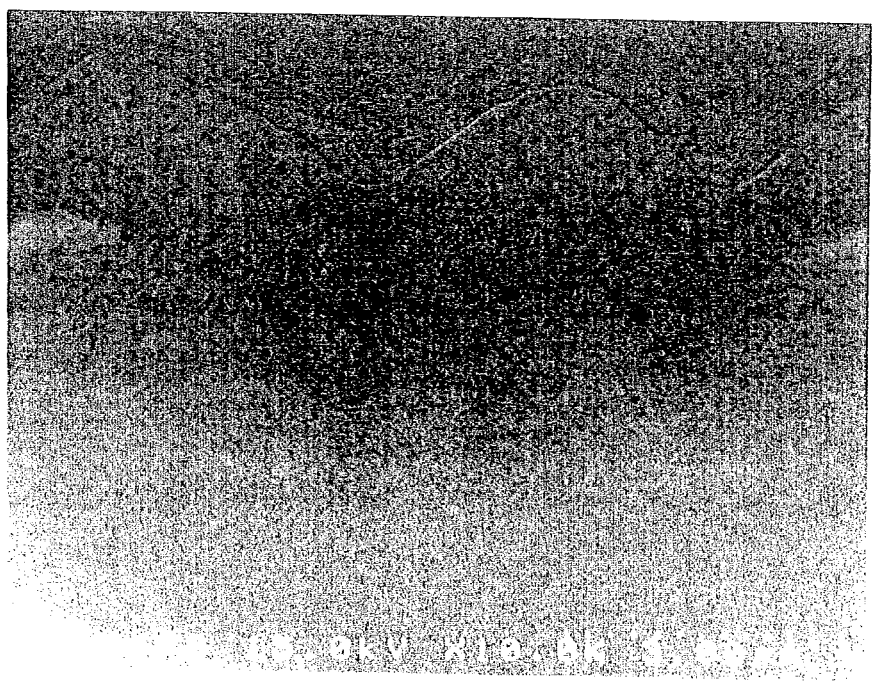
FIG. 34 is a photomicrograph (at a magnification of 10,000×) taken using a scanning electron microscope, showing the electrode a8 in Reference Example in its state before charge and discharge.

FIGS. 33 and 34 are photomicrographs (reflection electron images) taken with a scanning electron microscope, each showing a section of the electrode a8 in its state before being charged and discharged. FIGS. 33 and 34 are taken at magnifications of 2,000× and 10,000×, respectively. Like the electrode a7 shown in FIGS. 31 and 32, a sample of this electrode is embedded in a resin.

In FIGS. 33 and 34, a lightened portion indicates a copper foil and a slightly darker portion carried thereon is a germanium thin film (about 2 μm thick). Irregularities are defined on both surfaces of the germanium thin film and the copper foil of the electrode a8, as analogous to the electrode a7.

Figure 35:
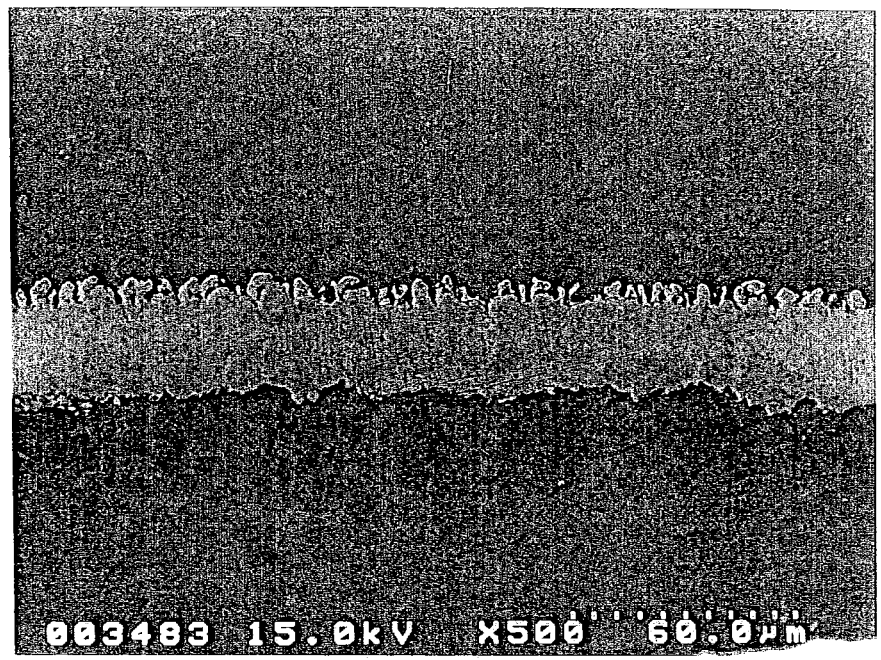
FIG. 35 is a photomicrograph (at a magnification of 500×) taken using a scanning electron microscope, showing the electrode a7 in Reference Example in its state after charges and discharges.
Figure 36:
FIG. 36 is a photomicrograph (at a magnification of 2,500×) taken using a scanning electron microscope, showing the electrode a7 in Reference Example in its state after charges and discharges.
Figure 37:
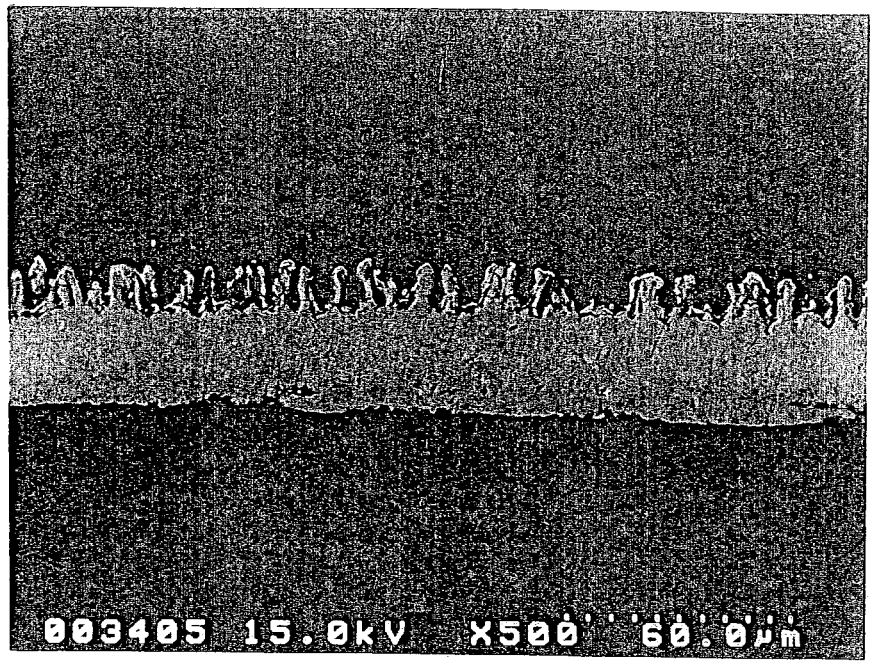
FIG. 37 is a photomicrograph (at a magnification of 500×) taken using a scanning electron microscope, showing the electrode a8 in Reference Example in its state after charges and discharges.
Figure 38:
FIG. 38 is a photomicrograph (at a magnification of 2,500×) taken using a scanning electron microscope, showing the electrode a8 in Reference Example in its state after charges and discharges.

FIGS. 35 and 36 are photomicrographs (reflection electron images) taken with a scanning electron microscope, each showing a section of the electrode a7 removed from the battery A7 after 10 cycles. FIGS. 37 and 38 are photomicrographs (reflection electron images) taken with a scanning electron microscope, each showing a section of the electrode a8 removed from the battery A8 after 10 cycles. In either case, the electrode was resin embedded and then sliced to provide a sample. FIGS. 35 and 37 are both taken at a magnification of 500×. FIGS. 36 and 38 are both taken at a magnification of 2,500×.

In FIGS. 35–38, a portion which appears white on the surface of the germanium thin film is gold coated thereon before it is embedded in a resin. The coating of gold is provided to prevent any reaction which may occur between the germanium thin film and the resin and also define a clear boundary therebetween.

As can be clearly seen from FIGS. 35–38, charge-discharge cycling causes formation of gaps which extend in a thickness direction of the germanium thin film and divide the thin film into columns, as similar to the case of the silicon thin film. Although a small difference in contrast between the copper foil, as a current collector, and the germanium thin film makes it difficult to distinguish a boundary therebetween, the careful observation reveals the presence of columnar portions of the germanium thin film over projections of the current collector and thus good adhesion of the germanium thin film to the current collector.

Unlike the case of silicon thin film, laterally-extending gaps are also observed in the germanium thin film. It is very likely, however, that such gaps were formed when the germanium thin film was polished before proceeding to sectional observation.

Also, the width of a gap (space) between neighboring columnar portions is found to be larger in the germanium thin film than in the silicon thin film. After charge-discharge cycling, the height of the columnar portions measured about 6 μm, which is about three times the initial film thickness of the germanium thin film, 2 μm, before the charge-discharge cycling. This is considered to indicate that when the thin film shrinks on discharge after it has expanded due to storage of lithium during charge, the shrinkage occurs mainly in a lateral direction, i.e., in a planar direction. It is accordingly believed that the wide gaps (spaces) between the columnar portions result from a small percent shrinkage of the germanium thin film in its thickness direction.

Figure 39:
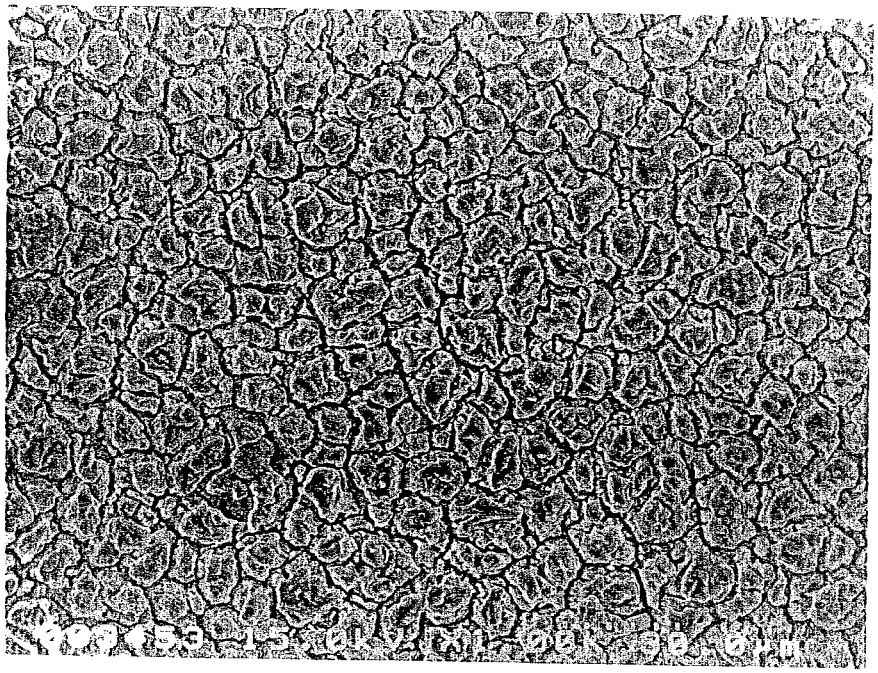
FIG. 39 is a photomicrograph (at a magnification of 1,000×) taken using a scanning electron microscope, showing a germanium thin film of the electrode a7 in Reference Example in its state after charges and discharges, when viewed from above.
Figure 40:
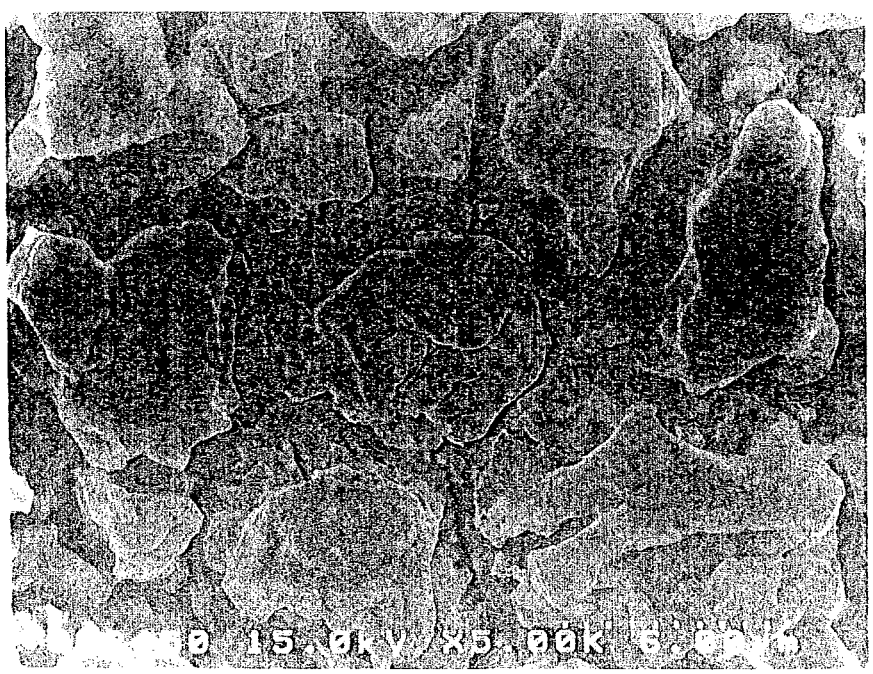
FIG. 40 is a photomicrograph (at a magnification of 5,000×) taken using a scanning electron microscope, showing a germanium thin film of the electrode a7 in accordance with the present invention in its state after charges and discharges, when viewed from above.
Figure 41:
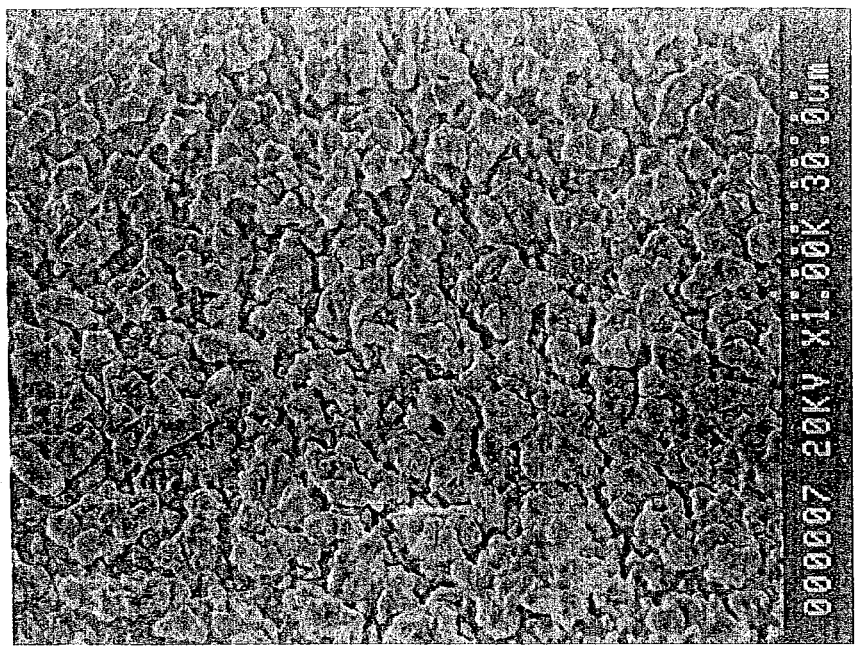
FIG. 41 is a photomicrograph (at a magnification of 1,000×) taken using a scanning electron microscope, showing a germanium thin film of the electrode a7 in Reference Example in its state after charges and discharges, when viewed from a slight angle.
Figure 42:
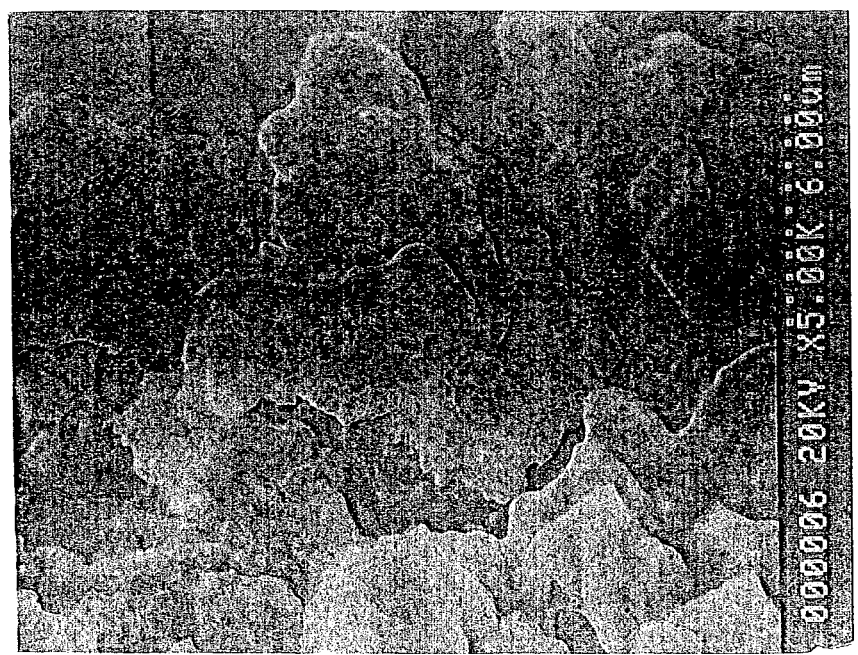
FIG. 42 is a photomicrograph (at a magnification of 5,000×) taken using a scanning electron microscope, showing a germanium thin film of the electrode a7 in Reference Example in its state after charges and discharges, when viewed from a slight angle.

FIGS. 39 and 40 are photomicrographs (secondary electron images) taken with a scanning electron microscope, each showing a germanium thin, film of the electrode a7 in its state after charges and discharges, when observed from above. FIGS. 39 and 40 are taken at magnifications of 1,000× and 5,000×, respectively. FIGS. 41 and 42 are photomicrographs (secondary electron images) taken with a scanning electron microscope, each showing the germanium thin film of the electrode a7 in its state after charges and discharges, when observed at a slight angle. FIGS. 41 and 42 are taken at magnifications of 1,000× and 5,000×, respectively.

Figure 43:
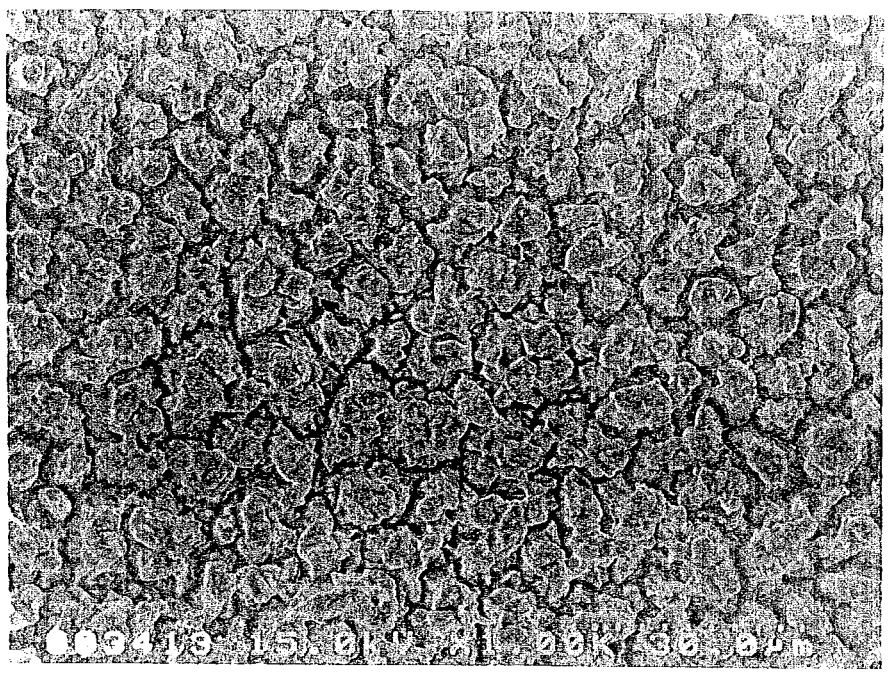
FIG. 43 is a photomicrograph (at a magnification of 1,000×) taken using a scanning electron microscope, showing a germanium thin film of the electrode a8 in Reference Example in its state after charges and discharges, when viewed from above.
Figure 44:
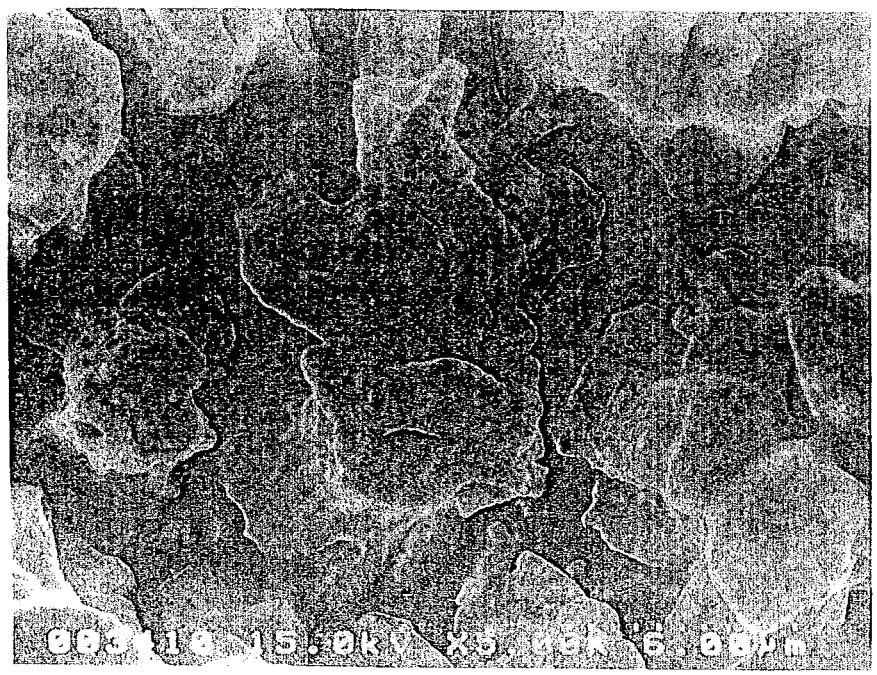
FIG. 44 is a photomicrograph (at a magnification of 5,000×) taken using a scanning electron microscope, showing a germanium thin film of the electrode a8 in Reference Example in its state after charges and discharges, when viewed from above.
Figure 45:
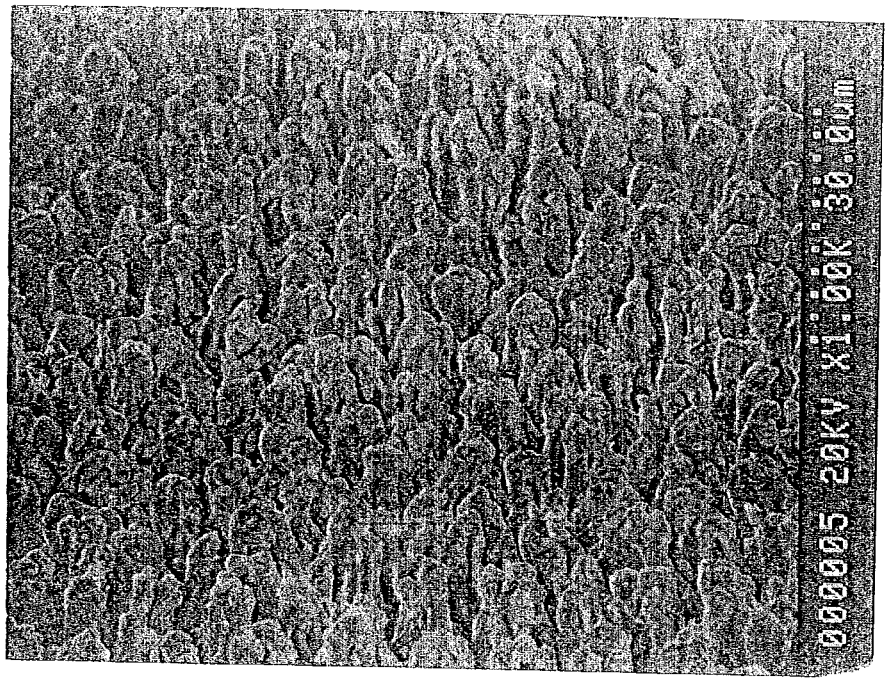
FIG. 45 is a photomicrograph (at a magnification of 1,000×) taken using a scanning electron microscope, showing a germanium thin film of the electrode a8 in Reference Example in its state after charges and discharges, when viewed from a slight angle.
Figure 46:
FIG. 46 is a photomicrograph (at a magnification of 5,000×) taken using a scanning electron microscope, showing a germanium thin film of the electrode a8 in Reference Example in its state after charges and discharges, when viewed from a slight angle.

FIGS. 43 and 44 are photomicrographs (secondary electron images) taken with a scanning electron microscope, each showing a germanium thin film of the electrode a8 in its state after charges and discharges, when observed from above. FIGS. 43 and 44 are taken at magnifications of 1,000× and 5,000×, respectively. FIGS. 45 and 46 are photomicrographs (secondary electron images) taken with a scanning electron microscope, each showing the germanium thin film of the electrode a8 in its state after charges and discharges, when observed at a slight angle. FIGS. 45 and 46 are taken at magnifications of 1,000× and 5,000×, respectively.

As shown in FIGS. 39–46, gaps (spaces) are formed in such a fashion to surround the columnar portions of the germanium thin film to thereby define spaces between the neighboring columnar portions. It is believed that these spaces serve to relax the stress caused by expansion and shrinkage of the active material during charge and discharge, as also described in the previous case of silicon thin film.

Figure 47:
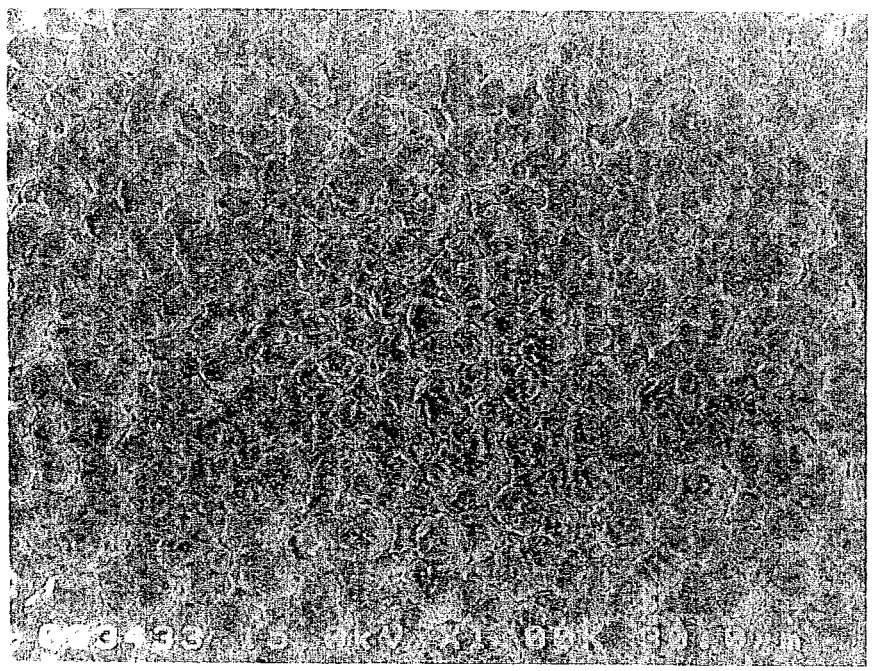
FIG. 47 is a photomicrograph (at a magnification of 1,000×) taken using a scanning electron microscope, showing a germanium thin film of the electrode a7 in Reference Example in its state before charge and discharge, when viewed from above.
Figure 48:
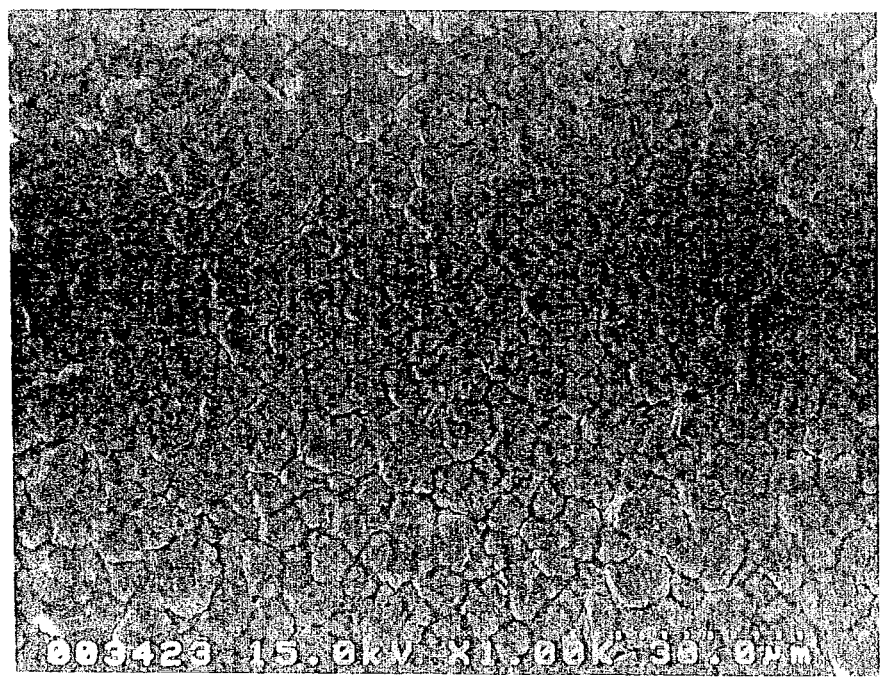
FIG. 48 is a photomicrograph (at a magnification of 1,000×) taken using a scanning electron microscope, showing a germanium thin film of the electrode a8 in Reference Example in its state before charge and discharge, when viewed from above.

FIG. 47 is a photomicrograph (secondary electron images) taken with a scanning electron microscope, showing a surface of the germanium thin film of the electrode a7 in its state before charge and discharge, when observed from above. FIG. 48 is a photomicrograph (secondary electron images) taken with a scanning electron microscope, showing a surface of the germanium thin film of the electrode a8 in its state before charge and discharge, when observed from above. FIGS. 47 and 48 are both taken at a magnification of 1,000×.

As shown in FIGS. 47 and 48, the germanium thin film has irregularities on its surface that follow the profile of those defined on the underlying electrolytic copper foil. The valleys of the germanium thin film are connected to each other like a network. It is understood that the gaps extend along the depth of such valleys to define columnar portions in the germanium thin film.

(SIMS Analysis of Concentration Profile Along Depth)

Figure 49:
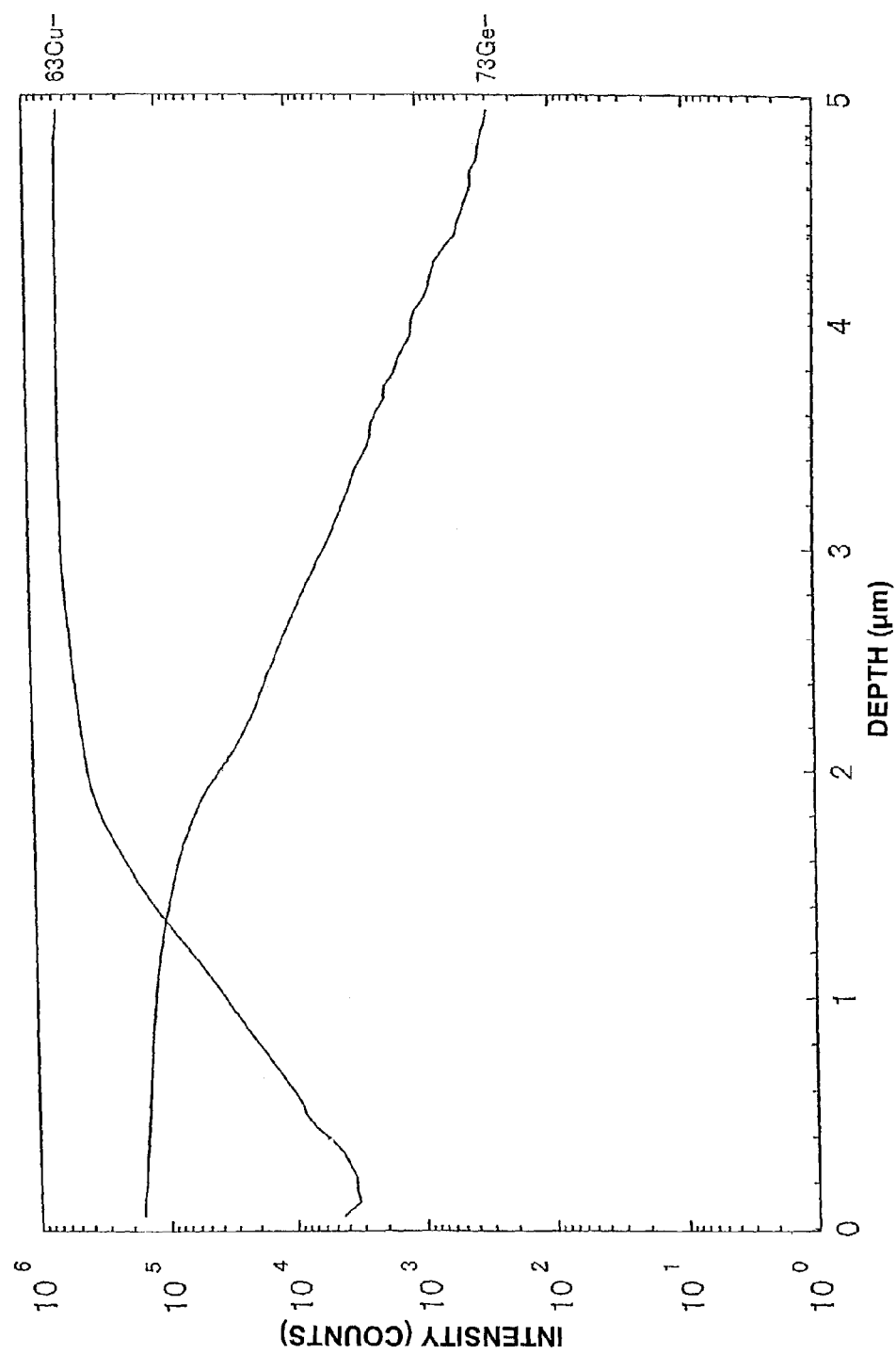
FIG. 49 is a graphical representation illustrating concentration profiles of constituent elements in a germanium thin film of the electrode a7 in Reference Example along the depth of the film.
Figure 50:
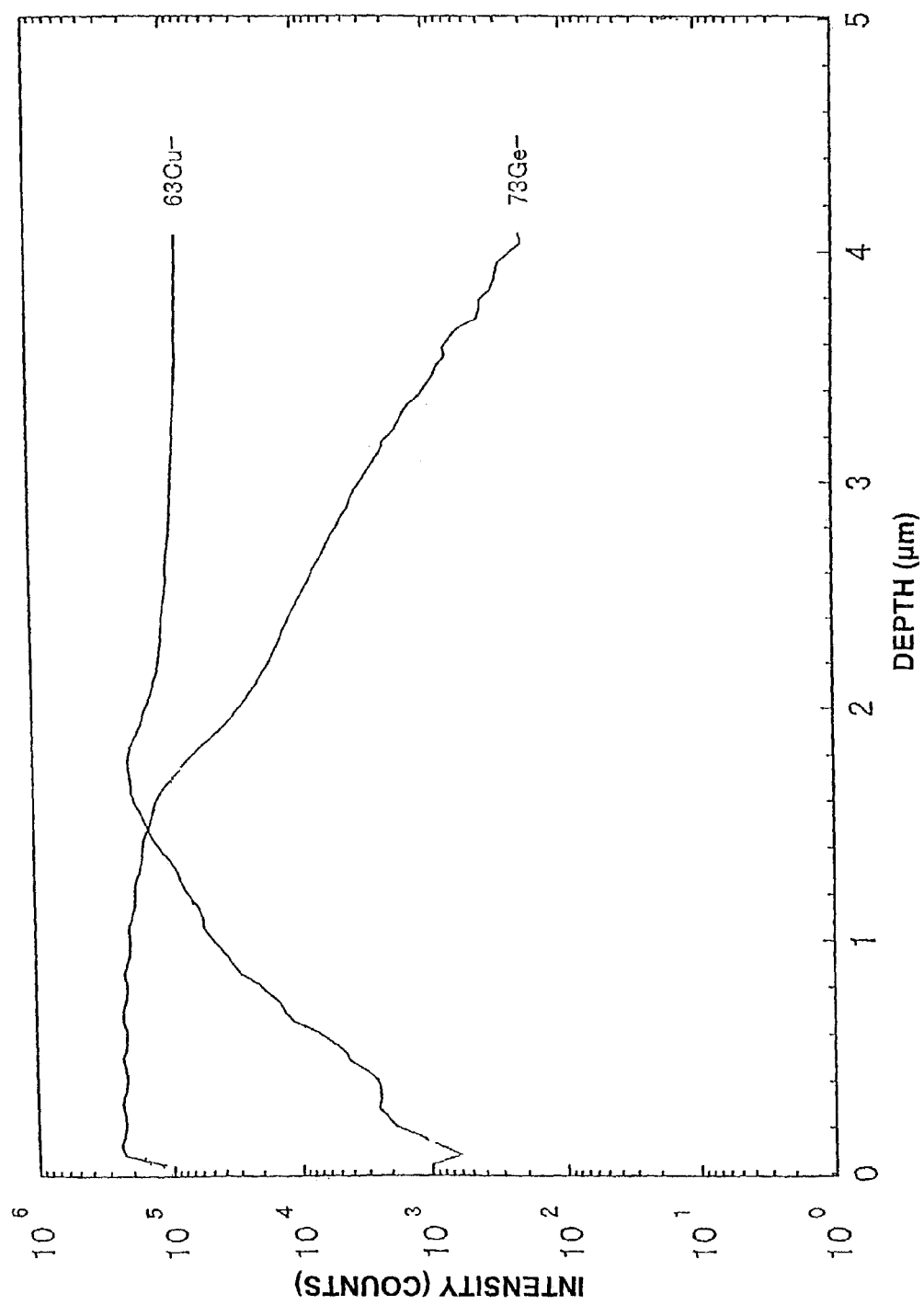
FIG. 50 is a graphical representation, illustrating concentration profiles of constituent elements in a germanium thin film in the electrode a8 in Reference Example along the depth of the film.

FIG. 49 is a graphical representation illustrating concentration profiles of constituent elements in the electrode a7 along its depth before it is incorporated in a battery, i.e., before charge and discharge. FIG. 50 is a graphical representation illustrating concentration profiles of constituent elements in the electrode a8 along its depth before charge and discharge. The concentration profiles of constituent elements were obtained by a secondary ion mass spectrometry (SIMS) wherein copper ($^{63}Cu^-$) and germanium ($^{73}Ge^-$) concentrations were measured along the depth from a surface of the thin film using $O_2^+$ as a sputtering source. The abscissa indicates a depth (μm) from a surface of the germanium thin film and the ordinate indicates an intensity (count) of each constituent element.

As can be clearly seen from FIGS. 49 and 50, copper (Cu), as a current collector constituent, diffuses into the germanium thin film in the vicinity of the current collector and shows a lower concentration at a location closer to the surface of the germanium thin film.

As discussed above, the germanium thin film contains a current collector constituent, copper, diffused therein, has a higher copper concentration in the vicinity of the current collector, and has a concentration gradient such that a copper concentration becomes lower at a location closer to its surface. Hence, the germanium thin film in the vicinity of the current collector contains a higher concentration of copper unreactive with lithium and a lower concentration of germanium reactive with lithium. In the vicinity of the current collector, the germanium thin film is thus believed to store and release less lithium, undergo less expansion and shrinkage, and produce a lower level of stress. This probably results in the reduced formation of gaps (spaces) which may cause separation or removal of the germanium thin film from the current collector, so that the bottoms of the columnar portions of the germanium thin film can be kept adhered to the current collector.

As stated above, the germanium thin film in conditions of being divided in columns maintains strong adhesion to the current collector even during charge-discharge cycling. Also, the gaps formed in a fashion to surround the columnar portions serve to relax the stress caused by expansion and shrinkage during charge-discharge cycles. The excellent charge-discharge cycle characteristics are thus obtained.

Reference Experiment 3

(Fabrication of Electrode a9)

An electrolytic copper foil (18 μm thick) was used for a current collector as a substrate. A silicon thin film was formed on this electrolytic copper foil by an RF sputtering technique. The sputtering was effected at a sputtering gas (Ar) flow rate of 100 sccm, an ambient substrate temperature (not heated), a reaction pressure of 0.1 Pa ($1.0 \times 10^{-3}$ Torr) and a 200 W RF power. The silicon thin film was deposited to a thickness of about 2 μm.

The resulting silicon thin film was analyzed by Raman spectroscopy which detected the presence of a peak around 480 $cm^{-1}$ and the absence of a peak around 520 $cm^{-1}$. This reveals an amorphous nature of the silicon thin film.

The electrolytic copper foil after silicon thin film deposition thereon was cut into a 2 cm×2 cm size to prepare an electrode a9.

The surface roughness Ra and the mean spacing S of the electrolytic copper foil used were measured using a stylus profiler Dektat³ST (available from ULVAC Inc.) with a scanning distance of 2.0 mm. The surface roughness Ra and the mean spacing S were determined to be 0.188 μm and 11 μm, respectively.

(Fabrication of Electrode a10)

An electrolytic copper foil similar to that used in the fabrication of the electrode a9 was used for a current collector as a substrate. A silicon thin film was formed on the electrolytic copper foil under the same conditions as used in the fabrication of the electrode a1 of Experiment 1 to a thickness of about 2 μm. The procedure used to prepare the electrode a9 was followed to prepare an electrode a10.

The resulting silicon thin film was analyzed by Raman spectroscopy which detected the presence of peaks around 480 $cm^{-1}$ and 520 $cm^{-1}$. This reveals a microcrystalline nature of the silicon thin film.

(Fabrication of Comparative Electrode b3)

A rolled copper foil (18 μm thick, surface roughness Ra=0.037 μm, mean spacing S=14 μm) was utilized for a current collector as a substrate. The procedure used to fabricate the electrode a9 was followed to form an amorphous silicon thin film (about 2 μm thick) on the rolled copper foil by an RF sputtering technique.

The resulting amorphous silicon thin film was subjected to one-hour annealing at 650° C. The annealed silicon thin film was then analyzed by Raman spectroscopy which revealed disappearance of a peak around 480 $cm^{-1}$ and detected a sole peak around 520 $cm^{-1}$. This demonstrates that the annealing results in the formation of a polycrystalline silicon thin film.

The procedure used to prepare the electrode a9 was followed to prepare an electrode b3 from the polycrystalline silicon thin film formed on the rolled copper foil.

The above-described procedure was utilized to measure the surface roughness Ra and the mean spacing S for the rolled copper foil. The rolled copper foil exhibited the surface roughness Ra of 0.037 μm and the mean spacing S of 14 μm.

(Measurement of Charge-Discharge Characteristics)

Each of the above-fabricated electrodes a9, a10 and b3 was used as a work electrode. Metallic lithium was used for both a counter electrode and a reference electrode. Using these electrodes, experimental cells were constructed. The electrolyte solution was identical to that used in the above Example 1. In a single electrode cell, reduction of the work electrode is a charge reaction and oxidation thereof is a discharge reaction.

Each experimental cell was charged at a constant current of 0.5 mA at 25° C. until a potential relative to the reference electrode reached 0 V, and then discharged to 2 V. This was recorded as a unit charge-discharge cycle. Cycling was effected to measure 1st- and 5th-cycle discharge capacities and charge-discharge efficiencies. The results are given in Table 8.

TABLE 8

|  |  |  | Electrode a9 | Electrode a10 | Electrode b3 |
|---|---|---|---|---|---|
| Substrate |  |  | Electrolytic Copper Foil | Electrolytic Copper Foil | Rolled Copper Foil |
| Thickness of Silicon Thin Film |  |  | 2 μm | 2 μm | 2 μm |
| Annealing |  |  | Absent | Absent | 650° C., 1 h |
| Crystallinity of Silicon Thin Film |  |  | Amorphous | Microcrystalline | Polycrystalline |
| Charge-Discharge Characteristics | 1st Cycle | Discharge Capacity (mAh/g) | 3980 | 4020 | 1978 |
|  |  | Charge-Discharge Efficiency (%) | 100 | 96 | 83 |
|  | 5th Cycle | Discharge Capacity (mAh/g) | 3990 | 4020 | 731 |
|  |  | Charge-Discharge Efficiency (%) | 100 | 100 | 75 |

As apparent from the results shown in Table 8, the electrode a9 using the amorphous silicon thin film for the electrode active material and the electrode a10 using the microcrystalline silicon thin film for the electrode active material, in accordance with the present invention, exhibit higher discharge capacities and superior charge-discharge efficiencies even on the 5th cycle, relative to the comparative electrode b3.

Reference Experiment 6

Reference Examples 1–7 and Reference Comparative Examples 1–2

(Fabrication of Current Collector)

Samples 1–4 specified in Table 9 were used for a current collector as a substrate. Sample 1 was similar to the rolled copper foil used for the current collector of the electrode b3. Samples 2–4 were prepared in accordance with the following procedure: A rolled copper foil was ground with a #100, #400 or #1000 emery paper to roughen its surface, washed with a purified water and then dried.

TABLE 9

| Sample No. | 1 | 2 | 3 | 4 |
|---|---|---|---|---|
| Copper Foil Thickness (μm) | 18 | 18 | 18 | 18 |
| Surface Roughness Ra (μm) | 0.037 | 0.1 | 0.18 | 1 |

Each of the above copper foils was used as a substrate. A silicon thin film was deposited on the substrate under the conditions specified in Tables 10–12 by means of an RF argon sputtering apparatus. In Reference Comparative Example 2, the deposited thin film was subsequently subjected to a heat treatment (annealing). In Reference Examples 1–7 and Reference Comparative Example 1, each substrate was pretreated prior to thin film deposition. The pretreatment was performed by generating an ECR plasma in a separately-installed plasma generator and directing the plasma to bombard the substrate for 10 minutes at a 200 W microwave power and an argon gas partial pressure of 0.06 Pa.

The nature of each silicon thin film was identified via analysis by Raman spectroscopy. The results are shown in Tables 10–12.

(Measurement of Charge-Discharge Characteristics)

The silicon-deposited copper foils obtained in Reference Examples 1–7 and Reference Comparative Examples 1–2 were cut into 2 cm×2 cm pieces and then utilized to construct experimental cells in the same manner as in the above Reference Experiment 3. For each cell, the charge-discharge test was performed in the same manner as in the above Reference Experiment 3 to measure 1st-, 5th- and 20th-cycle discharge capacities and charge-discharge efficiencies. The results are shown in Tables 10–12.

TABLE 10

|  |  | Ref.Ex.1 | Ref.Ex.2 | Ref.Ex.3 | Ref.Ex.4 |
|---|---|---|---|---|---|
| Substrate | Substrate type | Sample 2 | Sample 3 | Sample 4 | Sample 3 |
|  | Surface Roughness Ra | 0.1 | 0.18 | 1 | 0.18 |
|  | Substrate Thickness | 18 μm | 18 μm | 18 μm | 18 μm |
| Thin Film Forming Conditions | Thickness of Silicon Thin Film | 2 μm | 2 μm | 2 μm | 2 μm |
|  | Film-Forming Process | Sputtering | Sputtering | Sputtering | Sputtering |
|  | Sputtering Gas | Argon | Argon | Argon | Argon |
|  | Ar Flow Rate | 100 sccm | 100 sccm | 100 sccm | 100 sccm |
|  | Target | 99.999% Si Single Crystal | 99.999% Si Single Crystal | 99.999% Si Single Crystal | 99.999% Si Single Crystal |

TABLE 10-continued

|  |  | Ref.Ex.1 | Ref.Ex.2 | Ref.Ex.3 | Ref.Ex.4 |
|---|---|---|---|---|---|
|  | Sputtering Atmosphere | 0.10 Pa | 0.10 Pa | 0.10 Pa | 0.10 Pa |
|  | Sputtering Power | 200 W | 200 W | 200 W | 200 W |
|  | Substrate Temperature | 20° C. | 20° C. | 20° C. | 20° C. |
|  | Pretreatment | Present | Present | Present | Present |
|  | Sputtering Time | 2 h | 2 h | 2 h | 2 h |
| Heat Treatment Conditions | Heat Treatment | Absent | Absent | Absent | Absent |
|  | Heat Treating Time | — | — | — | — |
| Identification of Crystallinity | Raman Peak at 480 cm$^{-1}$ | Present | Present | Present | Present |
|  | Raman Peak at 520 cm$^{-1}$ | Absent | Absent | Absent | Absent |
|  | Crystallinity | Amorphous | Amorphous | Amorphous | Amorphous |
| 1st Cycle | Discharge Capacity (mAh/g) | 3980 | 3978 | 3975 | 3980 |
|  | Charge-Discharge Efficiency (%) | 100 | 100 | 100 | 100 |
| 5th cycle | Discharge Capacity (mAh/g) | 3990 | 3981 | 3980 | 3990 |
|  | Charge-Discharge Efficiency (%) | 100 | 100 | 100 | 100 |
| 20th cycle | Discharge Capacity (mAh/g) | 3990 | 3980 | 3981 | 3990 |
|  | Charge-Discharge Efficiency (%) | 100 | 100 | 100 | 100 |

TABLE 11

|  |  | Ref.Ex.5 | Ref.Ex.6 | Ref.Ex.7 |
|---|---|---|---|---|
| Substrate | Substrate type | Sample 3 | Sample 3 | Sample 3 |
|  | Surface Roughness Ra | 0.18 | 0.18 | 0.18 |
|  | Substrate Thickness | 18 μm | 18 μm | 18 μm |
| Thin Film Forming Conditions | Thickness of Silicon Thin Film | 2 μm | 2 μm | 2 μm |
|  | Film-Forming Process | Sputtering | Sputtering | Sputtering |
|  | Sputtering Gas | Argon | Argon | Argon |
|  | Ar Flow Rate | 100 sccm | 100 sccm | 100 sccm |
|  | Target | 99.999% Si Single Crystal | 99.999% Si Single Crystal | 99.999% Si Single Crystal |
|  | Sputtering Atmosphere | 0.10 Pa | 1.0 Pa | 10 Pa |
|  | Sputtering Power | 200 W | 200 W | 200 W |
|  | Substrate Temperature | 50° C. | 20° C. | 20° C. |
|  | Pretreatment | Present | Present | Present |
|  | Sputtering Time | 2 h | 1.5 h | 2.5 h |
| Heat Treatment Conditions | Heat Treatment | Absent | Absent | Absent |
|  | Heat Treating Time | — | — | — |
| Identification of Crystallinity | Raman Peak at 480 cm$^{-1}$ | Present | Present | Present |
|  | Raman Peak at 520 cm$^{-1}$ | Absent | Absent | Absent |
|  | Crystallinity | Amorphous | Amorphous | Amorphous |
| 1st Cycle | Discharge Capacity(mAh/g) | 4060 | 3585 | 2500 |
|  | Charge-Discharge Efficiency (%) | 100 | 100 | 100 |
| 5th cycle | Discharge Capacity(mAh/g) | 4060 | 3592 | 2505 |
|  | Charge-Discharge Efficiency (%) | 100 | 100 | 100 |
| 20th cycle | Discharge Capacity(mAh/g) | 4060 | 3590 | 2505 |
|  | Charge-Discharge Efficiency (%) | 100 | 100 | 100 |

TABLE 12

|  |  | Ref.Comp.Ex.1 | Ref.Comp.Ex.2 |
|---|---|---|---|
| Substrate | Substrate type | Sample 3 | Sample 1 |
|  | Surface Roughness Ra | 0.18 | 0.037 |
|  | Substrate Thickness | 18 μm | 18 μm |
| Thin Film Forming Conditions | Thickness of Silicon Thin Film | 2 μm | 2 μm |
|  | Film-Forming Process | Sputtering | Sputtering |
|  | Sputtering Gas | Argon | Argon |
|  | Ar Flow Rate | 100 sccm | 100 sccm |
|  | Target | 99.999% Si Single Crystal | 99.999% Si Single Crystal |
|  | Sputtering Atmosphere | 0.10 Pa | 0.10 Pa |
|  | Sputtering Power | 200 W | 200 W |
|  | Substrate Temperature | 450° C. | 20° C. |
|  | Pretreatment | Present | Absent |
|  | Sputtering Time | 2 h | 2 h |
| Heat Treatment Conditions | Heat Treatment | Absent | 650° C. |
|  | Heat Treating Time | — | 1 h |
| Identification of Crystallinity | Raman Peak at 480 cm$^{-1}$ | Absent | Absent |
|  | Raman Peak at 520 cm$^{-1}$ | Present | Present |
|  | Crystallinity | Polycrystalline | Polycrystalline |
| 1st Cycle | Discharge Capacity(mAh/g) | 1250 | 1978 |
|  | Charge-Discharge Efficiency (%) | 81 | 83 |
| 5th cycle | Discharge Capacity(mAh/g) | 900 | 731 |
|  | Charge-Discharge Efficiency (%) | 75 | 75 |
| 20th cycle | Discharge Capacity(mAh/g) | 700 | 350 |
|  | Charge-Discharge Efficiency (%) | 69 | 59 |

As can be clearly seen from the results shown in Tables 10–12, the increased discharge capacities and improved charge-discharge cycle characteristics are obtained by utilizing the electrodes obtained via Reference Examples 1–7 that use the amorphous silicon thin film for the electrode active material in accordance with the present invention, relative to utilizing the electrodes obtained via Reference Comparative Examples 1–2 that use the polycrystalline silicon thin film for the electrode active material.

Reference Experiment 5

An amorphous silicon thin film (about 3 µm thick) was formed on an electrolytic copper foil (18 µm thick, surface roughness Ra=0.188 µm, mean spacing S=6 µm) by an RF sputtering technique to fabricate an electrode a-11. The thin film was deposited using single-crystal silicon as a target, at a sputtering gas (Ar) flow rate of 100 sccm, an ambient substrate temperature (not heated), a reaction pressure of 0.1 Pa, and 200 W RF power.

The resulting silicon thin film was analyzed by Raman spectroscopy which detected the presence of a peak around 480 $cm^{-1}$ and the absence of a peak around 520 $cm^{-1}$. This revealed an amorphous nature of the silicon thin film.

The electrode a-11 thus obtained was used to construct a battery A11 in the same manner as in the above Reference Experiment 1. The battery was subjected to a charge-discharge cycle test under the same conditions as in the above Reference Experiment 1 to measure a capacity retention rate on the 30th-cycle. The result is shown in Table 13. In Table 13, the result for the battery A1 using the electrode a1 in Reference Experiment 1 is also shown.

TABLE 13

| Battery | 30th-Cycle Capacity Retention Rate |
|---|---|
| A1 | 97% |
| A11 | 97% |

As apparent from the results shown in Table 13, the battery A11 using the sputter deposited amorphous silicon thin film for the active material also exhibits a good capacity retention rate comparable to that of the battery A1 using the microcrystalline silicon thin film for the active material.

Figure 51:
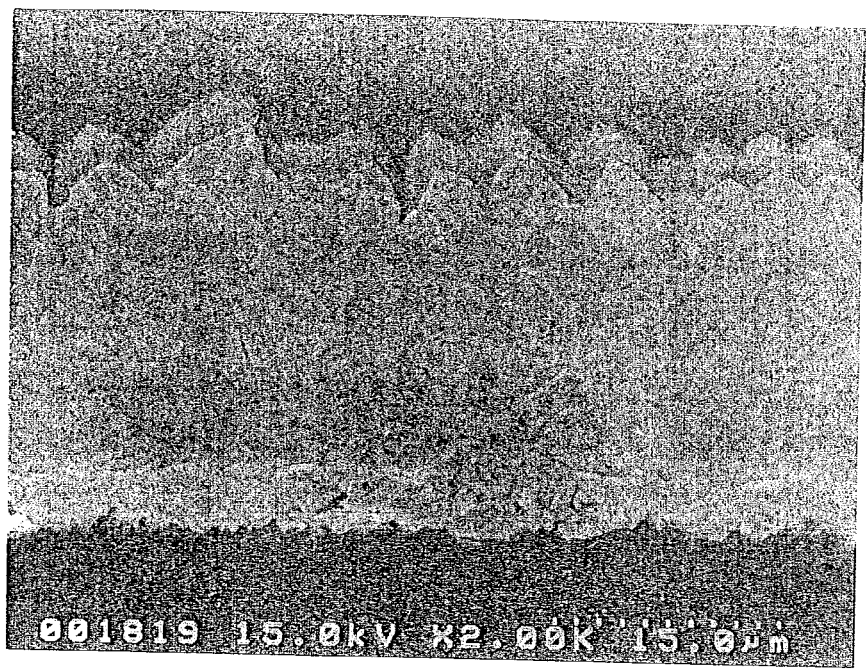
FIG. 51 is a photomicrograph (at a magnification of 2,000×) taken using a scanning electron microscope, showing a section of an electrode a-11 in Reference Example before charge and discharge.
Figure 52:
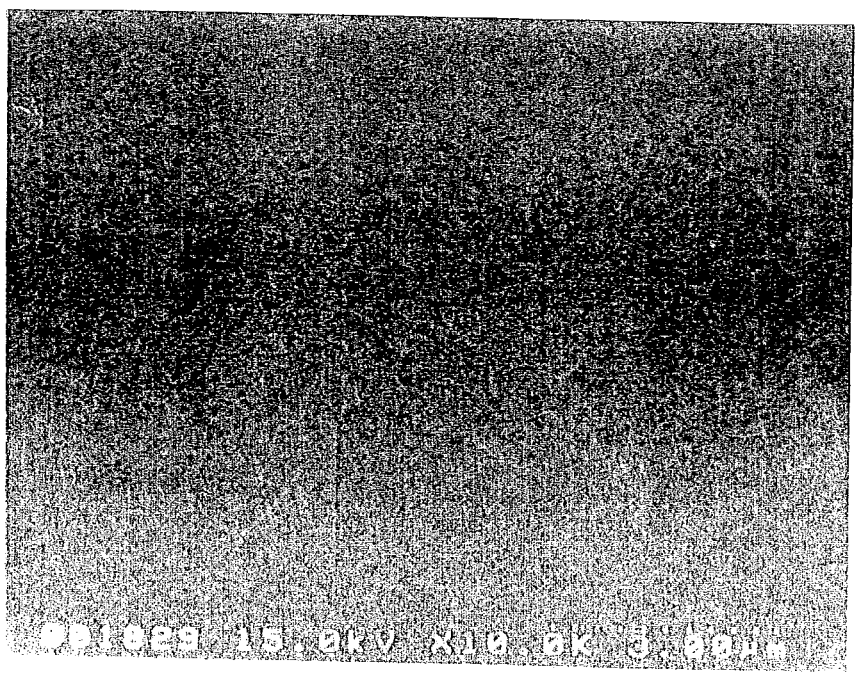
FIG. 52 is a photomicrograph (at a magnification of 10,000×) taken using a scanning electron microscope, showing a section of the electrode a-11 in Reference Example before charge and discharge.

The condition of the silicon thin film in the electrode a-11 was observed using an electron microscope. First, a section of the electrode a-11 in its state before charge and discharge was observed with a scanning electron microscope. FIGS. 51 and 52 are photomicrographs (secondary electron images) taken with a scanning electron microscope, each showing a section of the electrode a-11 before charge and discharge. FIGS. 51 and 52 are taken at magnifications of 2,000× and 10,000×, respectively. A sample was prepared by following the procedure used to prepare the samples shown in FIGS. 14 and 15, i.e., by embedding the electrode in a resin and then slicing the resin-embedded electrode.

In FIGS. 51 and 52, a portion that appears relatively light indicates the electrolytic copper foil. The deposited silicon thin film (about 3 µm thick) is found as a dark portion on the copper foil. As shown in FIGS. 51 and 52, irregularities are defined on a surface of the electrolytic copper foil. Particularly, projections have a generally conical shape. Similar irregularities with such conical projections are also formed on a surface of the silicon thin film deposited on the copper foil. Accordingly, the surface irregularities of the silicon thin film appear to conform in shape to those defined on the copper foil surface.

Figure 53:
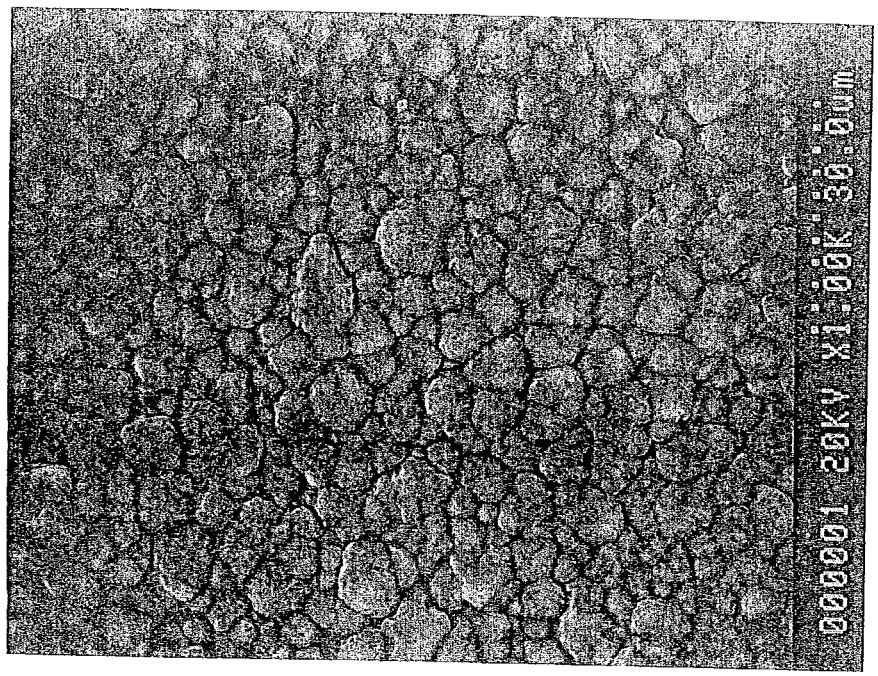
FIG. 53 is a photomicrograph (at a magnification of 1,000×) taken using a scanning electron microscope, showing a silicon thin film of the electrode a-11 in Reference Example before charge and discharge, when viewed from above.

FIG. 53 is a photomicrograph (secondary electron image) taken with a scanning electron microscope, showing a surface of the silicon thin film in the electrode a-11 when viewed at a magnification of 1,000×. As shown in FIG. 53, a number of projections is formed on the silicon thin film surface. As shown in FIGS. 51 and 52, these projections are formed in such a way to follow those defined on the copper foil surface.

Figure 54:
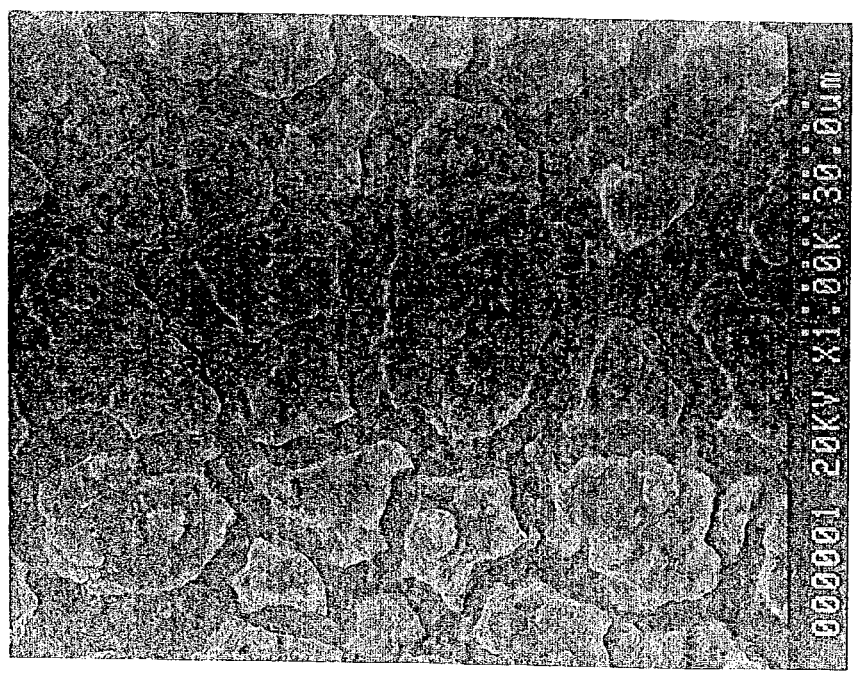
FIG. 54 is a photomicrograph (at a magnification of 1,000×) taken using a scanning electron microscope, showing a silicon thin film of the electrode a-11 in Reference Example after charges and discharges, when viewed from above.

FIG. 54 is a photomicrograph (reflection electron image) taken with a scanning electron microscope, showing a surface of the electrode a-11 removed from the battery A11 after 30 cycles in the charge-discharge test. FIG. 54 is a photograph taken at a magnification of 1,000×.

As shown in FIG. 54, gaps (spaces) are formed in the silicon thin film to extend in its thickness direction and these gaps (spaces) divide the silicon thin film into columns. In the silicon thin film shown in FIGS. 18–21, the gaps are formed in such a way as to define columnar portions each encompassing a single projection on the thin film. On the other hand, in the silicon thin film shown in FIG. 54, the gaps are formed in such a way as to define columnar portions each encompassing plural projections on the thin film. It is also found that the gaps (spaces) are wider in the silicon thin film shown in FIG. 54 than in the silicon thin film shown in FIGS. 18–21.

The battery A11 exhibits a good capacity retention in a manner similar to the battery A1. This is believed to demonstrate that the spaces provided in a way to surround the columnar portions serve to relax the stress caused by expansion and shrinkage of the active material so that charge-discharge cycling can be repeated without occurrence of separation of the active material from the current collector, even in the case where each columnar portion is defined to encompass plural projections on the thin film surface.

Reference Experiment 6

An about 2 µm thick, microcrystalline silicon thin film was formed on both a rolled copper foil (18 µm thick) and an electrolytic copper foil (18 µm thick) under the same thin film-forming conditions as used in the fabrication of electrode a1 in Reference Experiment 1. Then, a 17 mm diameter piece was punched out from each sample to provide an electrode c1 incorporating the silicon thin film formed on the rolled copper foil and an electrode c3 incorporating the silicon thin film formed on the electrolytic copper foil. Pieces identical to the electrodes c1 and c3 were heat treated at 400° C. for 3 hours to provide electrodes c2 and c4, respectively.

The procedure of Reference Experiment 1 was followed, except that the electrodes c1–c4 were used for the negative electrode, to construct rechargeable lithium batteries C1–C4. These batteries were measured for charge-discharge cycle life characteristics in the same manner as in Reference Experiment 1. Also, a hydrogen content, a ratio of Raman peak intensities (480 $cm^{-1}$/520 $cm^{-1}$) and a crystal grain size were measured for the silicon thin film of each electrode in the same manner as in Reference Experiment 1. The results are shown in Table 14.

TABLE 14

| Battery | 50th-Cycle Capacity Retention Rate | Hydrogen Content | Ratio of Peak Intensities (480 $cm^{-1}$/520 $cm^{-1}$) | Crystal Grain Size |
|---|---|---|---|---|
| C1 | 90% | 4% | 0.1 | 1 nm |
| C2 | 85% | 0.01% | 0.1 | 1 nm |
| C3 | 91% | 4% | 0.1 | 1 nm |
| C4 | 87% | 0.01% | 0.1 | 1 nm |

As demonstrated by the results shown in Table 14, the markedly high capacity retention rates are also obtained for the batteries C1–C4 with the about 2 μm thick microcrystalline silicon thin film.

The electrode c1 incorporating the microcrystalline silicon thin film formed on the rolled copper foil was sliced in its thickness direction to provide a sample which was subsequently observed with a transmission electron microscope.

Figure 55:
FIG. 55 is a photomicrograph (at a magnification of 500,000×) taken using a transmission electron microscope, showing an interface between a copper foil and a silicon thin film and its vicinities.
Figure 56:
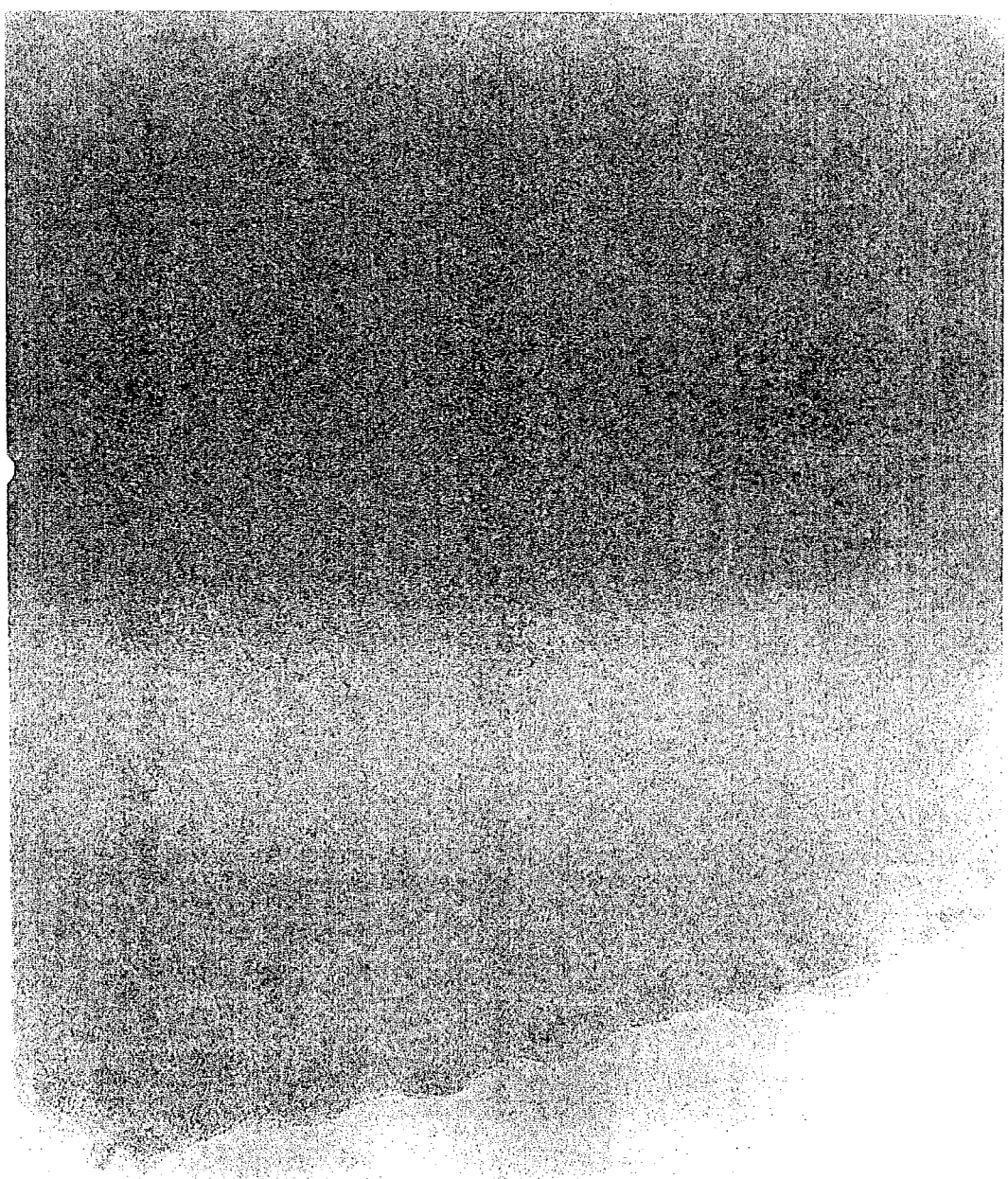
FIG. 56 is a photomicrograph (at a magnification of 1,000,000×) taken using a transmission electron microscope, showing an interface between a copper foil and a silicon thin film and its vicinities.

FIGS. 55 and 56 are photomicrographs taken with a transmission electron microscope, showing an interface between the copper foil and the silicon thin film and its vicinities in the electrode c1. FIGS. 55 and 56 are taken at magnifications of 500,000× and 1,000,000×. The copper foil is found in a lower portion and the silicon thin film in an upper portion of each photomicrograph.

In FIGS. 55 and 56, a lightened lower portion appears to be a copper foil portion. A portion located in the vicinity of the interface between the copper foil and silicon thin film appears darkened toward the above. This portion (about 30 nm–about 100 nm) seems to be a part of a mixed layer where diffusion of copper from the copper foil into silicon is particularly significant. In this mixed layer, copper (Cu) is probably alloyed with silicon (Si). Also in FIGS. 55 and 56, a particulate portion is observed in the vicinity of an interface between the seeming mixed layer and the copper foil. This particulate portion is found to define an irregular profile along the interface as a result of the diffusion of copper (Cu) into silicon (Si).

Figure 57:
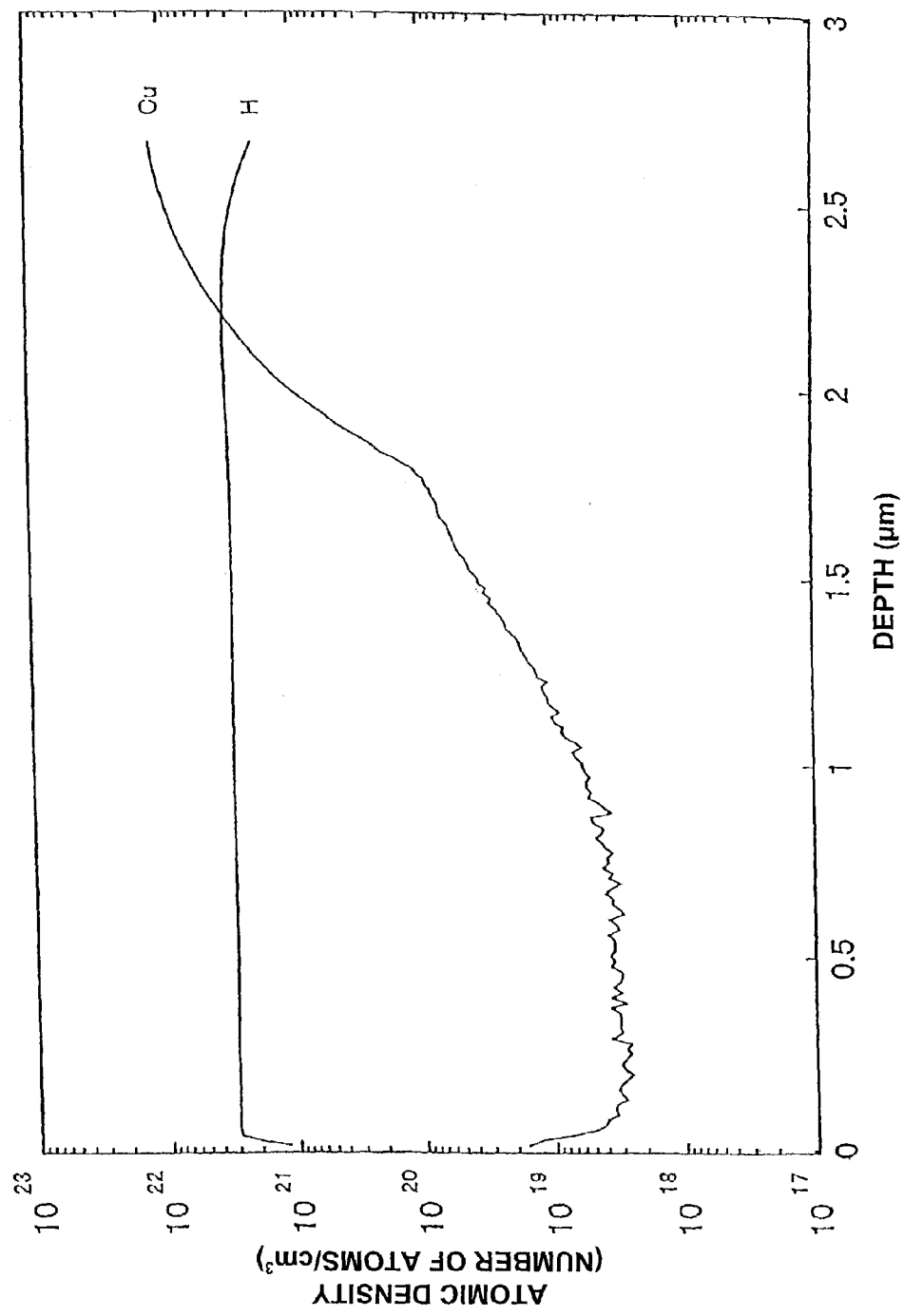
FIG. 57 is a graphical representation, illustrating concentration profiles of copper and hydrogen in a mixed layer in an electrode c1 along the depth of the layer.

Next, concentration profiles of constituent elements along the depth of the mixed layer were observed. For this purpose, the concentrations of copper ($^{63}Cu^+$) and hydrogen ($^1H^+$) were measured by SIMS using $O_2^+$ as a sputtering source. FIG. 57 shows a concentration profile of each constituent element. The abscissa indicates a depth (μm) and the ordinate indicates an atomic density (number of atoms/cm$^3$).

As shown in FIG. 57, the concentration of copper (Cu) in the mixed layer increases at a deeper location, i.e., at a location closer to the copper foil. If the mixed layer is defined as a layer in the silicon thin film that contains at least 1% (10 atoms/cm$^3$, if expressed in atomic density) of a current collector material, the mixed layer is found to exist in a thickness region which extends from a depth of about 1.9 μm to a depth of about 2.7 μm.

Figure 58:
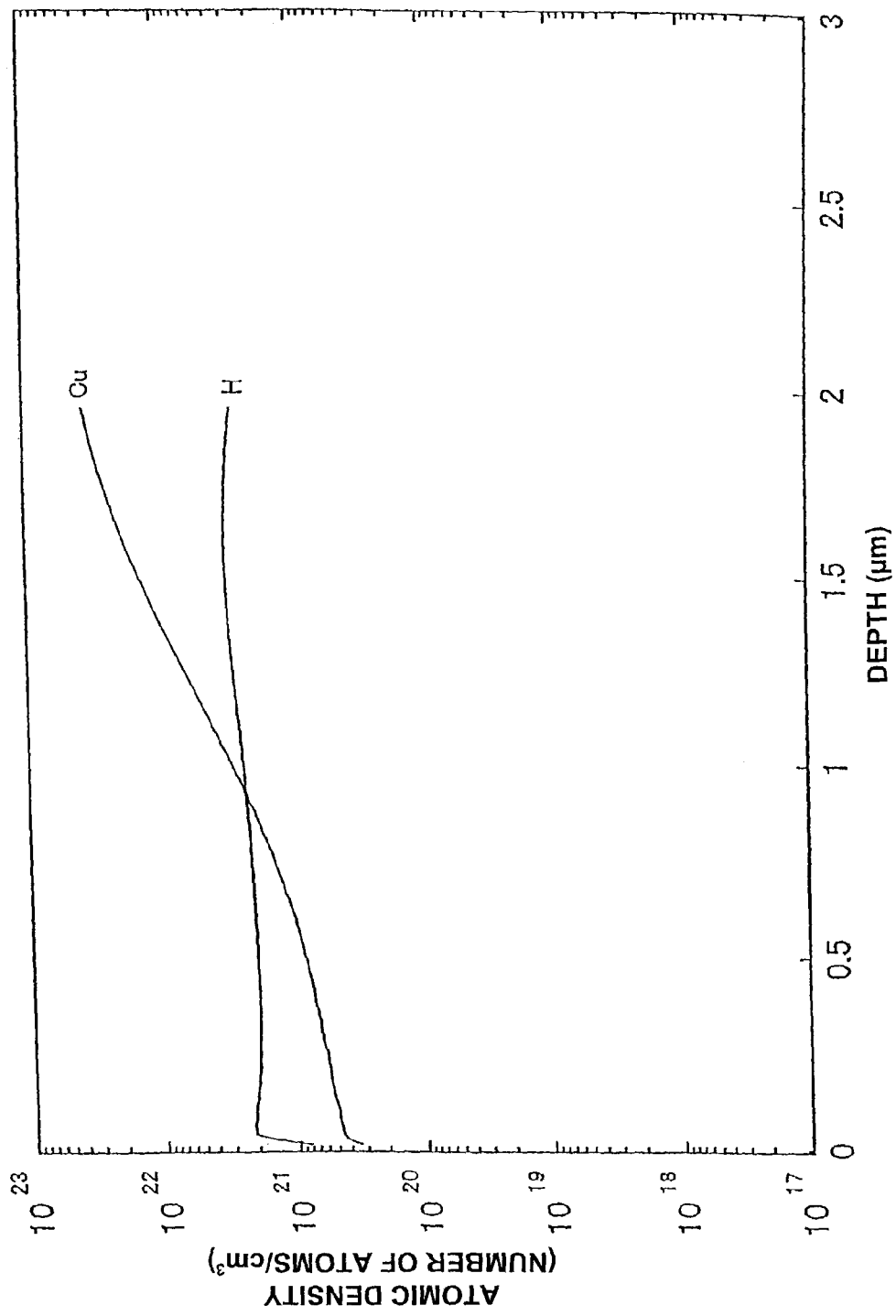
FIG. 58 is a graphical representation, illustrating concentration profiles of copper and hydrogen in a mixed layer in an electrode c3 along the depth of the layer.

Similarly, a concentration profile of each constituent element along the depth of the mixed layer were observed using SIMS for the electrode c3 incorporating the about 2 μm thick microcrystalline silicon thin film formed on the electrolytic copper foil. The results are shown in FIG. 58. As shown in FIG. 58, the atomic density of copper already exceeds $10^{20}$ atoms/cm$^3$ at the surface of the silicon thin film in the electrode c3. This clearly indicates that the copper diffused across the silicon thin film to its surface to render the silicon thin film into the form of mixed layer in its entirety. Also, the battery C3 using this electrode c3 exhibits good charge-discharge cycle characteristics. This demonstrates that the silicon thin film still serves as electrode active material, even if it is rendered into the form of mixed layer in its entirety.

As can be clearly seen from FIGS. 57 and 58, the copper concentration varies continuously across the silicon thin film. This accordingly demonstrates that copper exists in the silicon thin film not in the form of an intermetallic compound with silicon but in the form of a solid solution with silicon.

As discussed above, it is ascertained that the mixed layer where copper in the copper foil is mixed with silicon in the silicon thin film is formed at the interface between the copper foil and silicon thin film. The presence of this mixed layer is believed to improve adhesion of the silicon thin film to the copper foil, prevent separation of the silicon thin film from the copper foil as a substrate even if the silicon thin film is subjected to expansion and shrinkage on charge and discharge, and provide good charge-discharge cycle characteristics.

In the preceding Reference Experiments 2–6, the microcrystalline silicon thin film, amorphous silicon thin film or amorphous germanium thin film was formed on only one surface of the copper foil current collector to fabricate electrodes for a rechargeable lithium battery. However, any of those thin films of active material can alternatively be formed on opposite surfaces of the copper foil current collector in the similar manner to fabricate an electrode for a rechargeable lithium battery. In such a case, the provision of the thin films of active material on opposite surfaces of the current collector is believed to reduce a strain produced in the current collector by balancing stresses applied to the current collector from the opposite thin films of active material during a charge-discharge reaction. This is also believed to further decrease the possibility of the thin film to separate from the current collector and thereby further improve charge-discharge cycle characteristics of the battery.

UTILITY IN INDUSTRY

The electrode for a rechargeable lithium battery in accordance with the present invention can reduce a strain produced in the current collector during a charge-discharge reaction and improve charge-discharge cycle characteristics of the rechargeable lithium battery.

The invention claimed is:

1. An electrode for a rechargeable lithium battery which includes a plate-form current collector having opposite faces and a first thin film of active material capable of lithium storage and release deposited on a first of said opposite faces of the current collector and a second thin film of the same active material as the first thin film deposited on a second of said opposite faces of the current collector, characterized in that:

a constituent of said current collector is diffused into each thin film of active material, each thin film of active material has irregularities on its surface and is divided into columns by gaps formed therein, wherein said gaps extend in a thickness direction of each thin film from valleys of the irregularities on each thin film surface toward the current collector, said irregularities on the surface of each thin film conform in shape to irregularities on each face of the current collector, and said columns are at their bottoms adhered to the current collector.

2. The electrode for a rechargeable lithium battery as recited in claim 1, characterized in that a concentration of said current collector constituent in each thin film of active material is higher in the vicinity of the current collector and is lower at a location closer to the surface of each thin film of active material.

3. The electrode for a rechargeable lithium battery as recited in claim 1, characterized in that, in each thin film of active material, the diffused current collector constituent forms a solid solution with a component of each thin film of active material.

4. An electrode for a rechargeable lithium battery which includes a plate-form current collector having opposite faces and a first thin film of active material capable of lithium storage and release deposited on a first of said opposite faces of the current collector and a second thin film of the same active material as the first thin film deposited on a second of said opposite faces of the current collector, characterized in that a first interlayer is placed between the first of said opposite faces of the current collector and the first thin film of active material and a second interlayer is placed between the second of said opposite faces of the current collector and the second thin film of active material, each interlayer is composed of material capable of alloy formation with the each thin film of active material, the material of each interlayer being the same, a component of the first interlayer is diffused into the first thin film of active material and a component of the second interlayer is diffused into the second thin film of active material, each thin film of active material is divided into columns by gaps formed therein wherein said gaps extend in each thin film thickness direction from valleys of irregularities on each thin film surface, and said columns are at their bottoms adhered to the current collector.

5. The electrode for a rechargeable lithium battery as recited in claim 4, characterized in that said current collector comprises a foil made of a metal or an alloy that has a higher mechanical strength than material constituting said first and second interlayers.

6. The electrode for a rechargeable lithium battery as recited in claim 4, characterized in that a concentration of said first interlayer component in said first thin film of active material and of said second interlayer component in said second thin film of active material is higher in the vicinity of the interlayer and is lower at a location closer to the surface of the thin film of active material.

7. The electrode for a rechargeable lithium battery as recited in claim 4, characterized in that, in each thin film of active material, said diffused interlayer component forms a solid solution with a component of said thin film of active material.

8. An electrode for a rechargeable lithium battery which includes a plate-form current collector having opposite faces and a first thin film of active material capable of lithium storage and release deposited on a first of said opposite faces of the current collector and a second thin film of the same active material as the first thin film deposited on a second of said opposite faces of the current collector, characterized in that each thin film of active material is divided into columns by gaps formed therein as a result of its expansion and shrinkage, wherein said gaps extend in a thickness direction of each thin film from valleys of irregularities on each thin film surface and said columns are at their bottoms adhered to the current collector.

9. An electrode for a rechargeable lithium battery which includes a plate-form current collector having opposite faces and a first thin film of active material capable of lithium storage and release deposited on a first of said opposite faces of the current collector and a second thin film of the same active material as the first thin film deposited on a second of said opposite faces of the current collector, characterized in that each thin film of active material is divided into columns by gaps formed therein in a manner to extend in its thickness direction, said columns are at their bottoms adhered to the current collector, each thin film of active material before said gaps are formed therein has low-density regions connected to each other like a network in a planar direction and extending in the thickness direction toward the current collector, and the gaps are later formed in each thin film to extend in its thickness direction along said low-density regions.

10. The electrode for a rechargeable lithium battery as recited in claim 1, characterized in that said current collector comprises a metal foil.

11. The electrode for a rechargeable lithium battery as recited in claim 10, characterized in that said metal foil is a copper foil.

12. The electrode for a rechargeable lithium battery as recited in claim 11, characterized in that said copper foil is an electrolytic copper foil.

13. The electrode for a rechargeable lithium battery as recited in claim 1, characterized in that said opposite faces of the current collector have substantially the same surface roughness Ra.

14. The electrode for a rechargeable lithium battery as recited in claim 1, characterized in that said opposite faces of the current collector each has a surface roughness Ra of 0.01 μm or larger.

15. The electrode for a rechargeable lithium battery as recited in claim 1, characterized in that said opposite faces of the current collector each has a surface roughness Ra in the range of 0.01–1 μm.

16. The electrode for a rechargeable lithium battery as recited in claim 1, characterized in that each thin film of active material is a silicon or germanium thin film.

17. The electrode for a rechargeable lithium battery as recited in claim 16, characterized in that said silicon thin film is a microcrystalline or amorphous silicon thin film.

18. The electrode for a rechargeable lithium battery as recited in claim 16, characterized in that said germanium thin film is a microcrystalline or amorphous germanium thin film.

19. The electrode for a rechargeable lithium battery as recited in claim 1, characterized in that each thin film of active material is a silicon-germanium alloy thin film.

20. The electrode for a rechargeable lithium battery as recited in claim 19, characterized in that said silicon-germanium alloy thin film is a microcrystalline or amorphous silicon-germanium alloy thin film.

21. The electrode for a rechargeable lithium battery as recited in claim 1, characterized in that said thin films of active material are deposited on opposite faces of the current collector in amounts such that they undergo substantially the same degree of charge-discharge reaction with lithium per unit area when combined with other components of a rechargeable lithium battery and the battery is subjected to charge-discharge.

22. The electrode for a rechargeable lithium battery as recited in claim 1, characterized in that said thin films of active material are formed on opposite faces of the current collector to substantially the same thickness.

23. The electrode for a rechargeable lithium battery as recited in claim 1, characterized in that each thin film of active material is deposited by a CVD, sputtering, vapor evaporation, spraying or plating process.

24. The electrode for a rechargeable lithium battery as recited in claim 8, characterized in that a constituent of said current collector is diffused into each thin film of active material.

25. The electrode for a rechargeable lithium battery as recited in claim 24, characterized in that a concentration of said current collector constituent in each thin film of active material is higher in the vicinity of the current collector and is lower at a location closer to the surface of the thin film of active material.

26. The electrode for a rechargeable lithium battery as recited in claim 24, characterized in that, in each thin film of active material, the diffused current collector constituent forms a solid solution with a component of the thin film of active material.

27. The electrode for a rechargeable lithium battery as recited in claim 8, characterized in that a first interlayer is placed between the first of said opposite faces of the current collector and the first thin film of active material and a second interlayer is placed between the second of said opposite faces of the current collector and the second thin film of active material, and each interlayer is composed of material capable of alloy formation with the active material, the material of each interlayer being the same.

28. The electrode for a rechargeable lithium battery as recited in claim 27, characterized in that said current collector comprises a foil made of a metal or an alloy that has a higher mechanical strength than material constituting the interlayers.

29. The electrode for a rechargeable lithium battery as recited in claim 27, characterized in that a component of said first interlayer is diffused into said first thin film of active material and a component of said second interlayer is diffused into said second thin film of active material.

30. The electrode for a rechargeable lithium battery as recited in claim 29, characterized in that a concentration of said first interlayer component in said first thin film of active material and of said second interlayer component in said second thin film of active material is higher in the vicinity of the interlayer and is lower at a location closer to the surface of the thin film of active material.

31. The electrode for a rechargeable lithium battery as recited in claim 29, characterized in that said diffused interlayer component forms a solid solution with a component of each thin film of active material.

32. The electrode for a rechargeable lithium battery as recited in claim 1, characterized in that at least a half of thickness portion of each thin film is divided into columns by said gaps.

33. The electrode for a rechargeable lithium battery as recited in claim 1, characterized in that said gaps are formed as a result of expansion and shrinkage of each thin film of active material.

34. The electrode for a rechargeable lithium battery as recited in claim 1, characterized in that said gaps are formed by a charge-discharge reaction after said electrode is assembled into the rechargeable lithium battery and the battery is subjected to charge-discharge.

35. The electrode for a rechargeable lithium battery as recited in claim 1, characterized in that said gaps are formed by a charge-discharge reaction before said electrode is assembled into a battery.

36. The electrode for a rechargeable lithium battery as recited in claim 1, characterized in that projections of said irregularities on the current collector surface have a substantially conical shape.

37. The electrode for a rechargeable lithium battery as recited in claim 1, characterized in that said columns have a round top.

38. The electrode for a rechargeable lithium battery as recited in claim 1, characterized in that each thin film of active material, before said gaps are formed therein, has low-density regions connected to each other like a network in a planar direction and extending in the thickness direction toward the current collector, and the gaps are later formed in each thin film to extend in its thickness direction along said low-density regions.

39. The electrode for a rechargeable lithium battery as recited in claim 1, characterized in that each thin film of active material stores lithium via formation of an alloy with lithium.

40. The electrode for a rechargeable lithium battery as recited in claim 1, characterized in that each thin film of active material contains lithium.

41. A rechargeable lithium battery comprising the electrode for a rechargeable lithium battery as recited in claim 1.

42. A rechargeable lithium battery characterized as having an electrode structure wherein negative electrodes each comprising the electrode for a rechargeable lithium battery as recited in claim 1 are stacked alternately with positive electrodes each having positive active material provided on opposite faces of a second current collector, with a separator being placed between neighboring electrodes.

43. A rechargeable lithium battery characterized as having an electrode structure wherein a negative electrode comprising the electrode for a rechargeable lithium battery as recited in claim 1 and a positive electrode having positive active material provided on opposite faces of a second current collector are rolled up in a spirally wound configuration with a separator between them.

44. A rechargeable lithium battery including:
- a positive electrode having an opposing pair of layers of positive active material provided on inner faces of a U-shaped folded current collector,
- a negative electrode having layers of negative active material on opposite faces of a current collector and inserted in an inner space of the U-shaped positive electrode, and
- a separator disposed between the layer of positive active material and the layer of negative active material;
- characterized in that said negative electrode comprises the electrode for a rechargeable lithium battery as recited in claim 1.

* * * * *